United States Patent
Olafsson

(12) 
(10) Patent No.: US 6,704,399 B1
(45) Date of Patent: Mar. 9, 2004

(54) QUICK CONNECT PARAMETER EXCHANGE

(75) Inventor: Sverrir Olafsson, Reykjavik (IS)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/557,233

(22) Filed: Apr. 24, 2000

Related U.S. Application Data

(63) Continuation-in-part of application No. 09/416,482, filed on Oct. 12, 1999, which is a continuation-in-part of application No. 09/394,018, filed on Sep. 10, 1999, and a continuation-in-part of application No. 09/393,616, filed on Sep. 10, 1999, which is a continuation-in-part of application No. 09/361,842, filed on Jul. 27, 1999.

(60) Provisional application No. 60/167,572, filed on Nov. 26, 1999, and provisional application No. 60/128,874, filed on Apr. 12, 1999.

(51) Int. Cl.[7] .............................................. H04M 11/00
(52) U.S. Cl. ................................ 379/93.31; 379/93.32; 375/219; 375/222
(58) Field of Search .......................... 379/93.01, 93.05, 379/93.08, 93.31–93.35, 215.01; 375/222, 233, 377; 709/242, 227

(56) References Cited

U.S. PATENT DOCUMENTS

| | | | |
|---|---|---|---|
| 4,578,796 A | | 3/1986 | Charalambous et al. . 379/93.34 |
| 4,621,366 A | * | 11/1986 | Cain et al. .................. 375/222 |
| 4,852,151 A | | 7/1989 | Dittakavi et al. ......... 379/93.35 |
| 4,894,847 A | * | 1/1990 | Tjahjadi et al. ............. 375/222 |
| 5,109,483 A | * | 4/1992 | Baratz et al. ............... 709/227 |
| 5,127,051 A | | 6/1992 | Chan et al. .................. 375/222 |
| 5,131,025 A | | 7/1992 | Hamasaki |

(List continued on next page.)

FOREIGN PATENT DOCUMENTS

| | | |
|---|---|---|
| EP | 0 409 641 A3 | 1/1991 |
| EP | 0 409 641 A2 | 1/1991 |
| EP | 0 711 060 A1 | 5/1996 |
| EP | 0 409 641 B1 | 6/1996 |
| EP | 0 741 481 A2 | 11/1996 |
| WO | WO 0169548 A2 * 1/1986 | ........... H04L/11/16 |
| WO | WO 96 05684 A | 2/1996 |
| WO | WO 97/49228 | 12/1997 |
| WO | WO97/49228 * 12/1997 | ........... H04M/11/00 |
| WO | WO 99/27702 | 6/1999 |

OTHER PUBLICATIONS

"V.90" Sep. 1998, ITU–T Telecommunication Standardization Sector of ITU, the whole document.

Multitech "V.92 Q&A", Internet, Online, Sep. 5, 2000, Retrieved from the Internet: <URL:HTTP://WWW.MULTI-CH.COM/APPLICATIONS/DATA_FAX/V92.ASP>.

*Primary Examiner*—George Eng
(74) *Attorney, Agent, or Firm*—Farjami & Farjami LLP

(57) ABSTRACT

The startup, retrain, renegotiation quick connect or other processes of handshaking between communication systems involve the exchange of certain modulation, constellation, precoder, prefilter and other communication related information. The communication systems exchange one long information sequence including all the necessary communication information. Subsequently, the communication systems start transmitting short sequences, including an acknowledgement information portion. If one of the communication systems does not receive an acknowledgement within a predetermined time or event, that communication system may retransmit another long information sequence. After such retransmission, the retransmitting communication system may continue transmitting the long information sequences or may start transmitting the short sequences once again. Eventually, each of the communication systems should receive a long information sequence and acknowledge their receipt of such sequence.

90 Claims, 40 Drawing Sheets

U.S. PATENT DOCUMENTS

| | | | |
|---|---|---|---|
| 5,287,401 A | 2/1994 | Lin | 379/93.35 |
| 5,317,594 A | 5/1994 | Goldstein | 375/222 |
| 5,367,563 A | 11/1994 | Sainton | 379/93.29 |
| 5,513,251 A | 4/1996 | Rochkind et al. | 379/93.35 |
| 5,519,767 A | 5/1996 | O'Horo et al. | 379/215.01 |
| 5,550,908 A | 8/1996 | Cai et al. | 379/215.01 |
| 5,600,712 A * | 2/1997 | Hanson et al. | 379/93.05 |
| 5,668,861 A | 9/1997 | Watts | 379/215.01 |
| 5,751,796 A * | 5/1998 | Scott et al. | 379/93.31 |
| 5,757,890 A | 5/1998 | Venkatakrishnan | 379/93.13 |
| 5,764,736 A | 6/1998 | Shachar et al. | |
| 5,802,153 A * | 9/1998 | Sridhar et al. | 375/222 |
| 5,812,281 A * | 9/1998 | Mukai et al. | 358/442 |
| 5,862,474 A | 1/1999 | Kimball | 315/222 |
| 5,896,444 A | 4/1999 | Perlman et al. | 379/93.35 |
| 5,903,602 A | 5/1999 | Torkkel | 375/222 |
| 5,940,489 A | 8/1999 | Cohn et al. | 379/215.01 |
| 6,104,800 A | 8/2000 | Benson | |
| 6,263,016 B1 * | 7/2001 | Bellenger et al. | 375/222 |
| 6,452,963 B1 * | 9/2002 | Lee | 375/222 |

* cited by examiner

1700

| MP Bits LSB:MSB | Definition |
|---|---|
| 0:16 | Frame Sync: 11111111111111111 |
| 17 | Start bit: 0 |
| 18 | Type 1 |
| 19 | Reserved for ITU: This bit is set to 0 by the transmitting modem and is not interpreted by the receiving modem. |
| 20:23 | Maximum call modem to answer modem data signalling rate<br>Data rate = N* 2400 where N is a four-bit integer between 1 and 12. |
| 24:27 | Maximum answer modem to call modem data signalling rate<br>Data rate = N*2400 where N is a four-bit integer between 1 and 12. |
| 28 | Auxiliary channel select bit. Set to 1 if modem is capable of supporting and enables auxiliary channel. Auxiliary channel is used only if both modems set this bit to 1. |
| 29:30 | Trellis encoder select bits:<br>00: 16 State, 10: 32 State, 01: 64 State, 11: Reserved<br>Receiver requires remote-end transmitter to use selected trellis encoder. |
| 31 | Nonlinear encoder parameter select bit for the remote-end transmitter.<br>0: ⊖= 0, 1: ⊖ = 0.3125 |
| 32 | Constellation shaping select bit for the remote-end transmitter.<br>0: minimum, 1: expanded (see Table 10/V.34) |
| 33 | Acknowledge bit. 0= modem has not received MP from far end.<br>1= received MP from far end. |
| 34 | Start bit: 0 |
| 35:49 | Data signalling rate capability mask.<br>Bit 35:2400; bit 36:4800; bit 37:7200; ...; bit 46:28800; bits 47,48,49: Reserved for ITU (These bits are set to 0 by the transmitting modem and are not interpreted by the receiving modem.) Bits set to 1 indicate data signalling rates supported and enabled in both transmitter and receiver of modem. |
| 50 | Asymmetric data signalling rate enable. Set to 1 indicates modem capable of asymmetric data signalling rates. |
| 51 | Start bit:0 |
| 52:67 | Precoding coefficient h(1) real |

| | |
|---|---|
| 68 | Start bit: 0 |
| 69:84 | Precoding coefficient h(1) imaginary |
| 85 | Start bit: 0 |
| 86:101 | Precoding coefficient h(2) real |
| 102 | Start bit: 0 |
| 103:118 | Precoding coefficient h(2) imaginary |
| 119 | Start bit: 0 |
| 120:135 | Precoding coefficient h(3) real |
| 136 | Start bit: 0 |
| 137:152 | Precoding coefficient h(3) imaginary |
| 153 | Start bit: 0 |
| 154:169 | Reserved for ITU: These bits are set to 0 by the transmitting modem and are not interpreted by the receiving modem. |
| 170 | Start bit: 0 |
| 171:186 | CRC |
| 187 | Fill bit: 0 |

| CP bits LSB:MSB | Definition |
|---|---|
| 0:16 | Frame Sync: 11111111111111111 |
| 17 | Start bit: 0 |
| 18 | Reserved for ITU: This bit is set to 0 by the analogue modem and is not interpreted by the digital modem |
| 19 | 0 - indicates $CP_t$, 1 - indicates CP |
| 20:24 | Selected digital modem to analogue modem data signalling rate, an integer, drn, between 0 and 22. drn = 0 indicates cleardown.<br>Data signalling rate = (drn+20)*8000/6 in CP and (drn+8)*8000/6 in $CP_t$. |
| 25:29 | Reserved for ITU: These bits are set to 0 by the analogue modem and are not interpreted by the digital modem |
| 30 | Set to 1 indicates a silent period is requested. This may be used during rate renegotiation (§ 9.6) |
| 31:32 | $S_r$: The number of sign bits used as redundancy for spectral shaping |
| 33 | Acknowledge bit: 0 = modem has not received MP from far end, 1 = received MP from far end |
| 34 | Start bit: 0 |
| 35 | Codec type: 0 = $\mu$-law, 1 = A-law |
| 36:48 | Analogue modem to digital modem data signalling rate capability mask: Bit 36:4800;...; bit 47:31200; bit 48:33600. Bits set to 1 indicate data signalling rates supported and enabled in analogue modem transmitter |
| 49:50 | Id: Number of lookahead frames requested during spectral shaping. This shall be consistent with the capabilities of the digital modem indicated in $J_d$ |
| 51 | Start bit:0 |
| 52:67 | The RMS value of $TRN_{1d}$ at the transmitter output divided by the RMS value of $TRN_{1d}$ at the output to the codec's D/A convertor expressed in unsigned Q3.13 format (xxx.xxxxxxxxxxxxx) |
| 68 | Start bit: 0 |
| 69:76 | Parameter $a_1$ of the spectral shaping filter in signed Q1.6 format (sx.xxxxxx) |

| | |
|---|---|
| 77:84 | Parameter $a_2$ of the spectral shaping filter in signed Q1.6 format (sx.xxxxxx) |
| 85 | Start bit: 0 |
| 86:93 | Parabeter $b_1$ of the spectral shaping filter in signed Q1.6 format (sx.xxxxxx) |
| 94:101 | Parameter $b_2$ of the spectral shaping filter in signed Q1.6 format (sx.xxxxxx) |
| 102 | Start bit: 0 |
| 103:106 | An integer between 0 and 5 denoting the index of the constellation to be used in data frame interval 0 |
| 107:110 | An integer between 0 and 5 denoting the index of the constellation to be used in data frame interval 1 |
| 111:114 | An integer between 0 and 5 denoting the index of the constellation to be used in data frame interval 2 |
| 115:118 | An integer between 0 and 5 denoting the index of the constellation to be used in data frame interval 3 |
| 119 | Start bit: 0 |
| 120:123 | An integer between 0 and 5 denoting the index of the constellation to be used in data frame interval 4 |
| 124:125 | An integer between 0 and 5 denoting the index of the constellation to be used in data frame interval 5 |
| 128 | Set to 1 if the constellations at the transmitter differ from those at the output to the codec's D/A converter |
| 129:135 | Reserved for ITU: These bits are set to 0 by the analogue modem and are not interpreted by the digital modem |
| 136 | Start bit:0 |
| 137:152 | Constellation mask for $Uchord_1$ (Bit 137 corresponds to Ucode 0) |
| 153 | Start bit:0 |
| 154:169 | Constellation mask for $Uchord_2$ (Bit 154 corresponds to Ucode 16) |
| 170 | Start bit: 0 |
| 171:186 | Constellation mask for $Uchord_3$ (Bit 171 corresponds to Ucode 32) |
| 187 | Start bit: 0 |
| 188:203 | Constellation mask for $Uchord_4$ (Bit 188 corresponds to Ucode 48) |
| 204 | Start bit: 0 |
| 205:220 | Constellation mask for $Uchord_5$ (Bit 205 corresponds to Ucode 64) |

FIG. 18 (continued)

| | | |
|---|---|---|
| | 221 | Start bit: 0 |
| | 222:237 | Constellation mask for Uchord$_6$ (Bit 222 correpods to Ucode 80) |
| | 238 | Start bit: 0 |
| | 239:254 | Constellation mask for Uchord$_7$ (Bit 239 correpods to Ucode 96) |
| | 255 | Start bit: 0 |
| | 256:271 | Constellation mask for Uchord$_8$ (Bit 256 correpods to Ucode 112) |
| | 272:271γ | Possibly more constellation in same form formal as bits 136.271 |
| | 272+γ271+δ | Corresponding codec constellations in same format as bits 136:271 |
| | 272 +δ | Start bit: 0 |
| 1830 | 273.δ:288.δ | CRC |
| | 289.δ:291.δ | Fill bits:000 |

FIG. 18 (continued)

| CP, bits LSB:MSB | Definition |
|---|---|
| 0:16 | Frame Sync: 1111111111111111 |
| 17 | Start bit: 0 |
| 18:20 | CP, typ = 0, Full CP, shall be used for initial train, re-trains, and rate re-negotiations |
| 21:23 | Reserved for ITU: These bits are set to 0 by the digital modem and are not interpreted by the analogue modem |
| 24:28 | Selected analogue modem to digital modem data signalling rate, an integer, drn, between 0 and 21.<br>drn = 0 shall indicate cleardown.<br>Data signalling rate + (drn + 18)*(8000/6)<br>Range is [24000, 48000] in (8000/6) bit/sec increments |
| 29:30 | Trellis encoder select bits in analogue modem to digital modem direction:<br>0 = 16 state, 1 = 32 state, 2 = 64 state, 3 = Reserved for ITU<br>The digital modem receiver requires the analogue modem transmitter to use the selected trellis encoder |
| 31 | Set to 1 indicates a silent period is requested. This may be used during rate renegotiantion [9] |
| 32 | Reserved for ITU: These bits are set to 0 by the digital modem and are not interpreted by the analogue modem |
| 33 | Acknowledge bit: 0 = modem has not received CP from far end, 1 = received CP from far end |
| 34 | Start bit:0 |
| 35:50 | Analog modem to digital modem data signalling rate capability mask in 8000/6 increments:<br>Bit 35:24000;...;bit 36:29333: bit 37:30666;...;bit 50:44000<br>Bits set to 1 indicate data signalling rates supported and enabled in digital modem |
| 51 | Start bit: 0 |
| 52:54 | Analog modem to digital modem data signalling rate capability mask continuation:<br>Bit 52:45333; bit 53:46666; bit 54:48000<br>Bits set to 1 indicate data signaling rates supported and enabled in digital modem |

FIG. 19

| | |
|---|---|
| 55:57 | Reserved for ITU: These bits are set to 0 by the digital modem and are not interpreted by the analogue modem |
| 58 | Extend the length of $E_u$ sequence, 0 = don't extend, 1 = extended by 1 symbol Digital modem request for the analogue modem to transmit up to 1 extra symbol of $E_u$ sequence<br>Note: This bit shall be set to zero by digital modem during any rate re-negotiation and fast parameter exchange procedures |
| 59:67 | $LZ_1$:Number of tapes for feed-forward section of pre-coder. Up to 384 taps. |
| 68 | Start bit: 0 |
| 69:77 | $LP_1$: Number of taps for feed-forward section of pre-coder. Up to 384 taps. |
| 78:84 | Reserved for ITU: These bits are set to 0 by the digital modem and are not interpreted by the analogue modem |
| 85 | Start bit:0 |
| 86:94 | $LZ_2$: Number of taps for feed-forward section of pre-filter. Up to 384 taps. |
| 95:101 | Reserved for ITU: These bits are set to 0 by the digital modem and are not interpreted by the analogue modem |
| 102 | Start bit:0 |
| 103:111 | $LP_2$: Number of taps, for feed-forward section of pre-filter. Up to 384 taps. |
| 112:118 | Reserved for ITU: These bits are set to 0 by the digital modem and are not interpreted by the analogue modem |
| 119 | Start bit: 0 |
| 120:127 | Number of positive points in the $1_{st}$ constellation set. |
| 128:135 | Number of positive points in the $2_{nd}$ constellation set (possible zero) |
| 136 | Start bit: 0 |
| | Number of positive points in the $3_{rd}$ constellation set (possible zero) |
| | Number of positive points in the $4_{th}$ constellation set (possible zero) |
| 153 | Start bit: 0 |
| | Number of positive points in the $5_{th}$ constellation set (possible zero) |
| | Number of positive points in the $6_{th}$ constellation set (possible zero) |
| 170 | Start bit: 0 |
| 171:174 | An integer between 0 and 5 denoting the index of the constellation to be used in data frame interval 0 |
| 175:178 | An integer between 0 and 5 denoting the index of the constellation to be used in data frame interval 1 |
| 179:182 | An integer between 0 and 5 denoting the index of the constellation to be used in data frame interval 2 |
| 183:186 | An integer between 0 and 5 denoting the index of the constellation to be used in data frame interval 3 |
| 187 | Start bit: 0 |
| 188:191 | An integer between 0 and 5 denoting the index of the constellation to be used in data frame interval 4 |
| 192:195 | An integer between 0 and 5 denoting the index of the constellation to be used in data frame interval 5 |

FIG. 19 (continued)

| | | |
|---|---|---|
| | 196:203 | Modulus Encoder parameter $M_i, i = 0$ |
| | 204 | Start bit: 0 |
| | 205:212 | Modulus Encoder parameter $M_i, i = 1$ |
| | 213:220 | Modulus Encoder parameter $M_i, i = 2$ |
| | 221 | Start bit: 0 |
| | | Modulus Encoder parameter $M_i, i = 3$ |
| | | Modulus Encoder parameter $M_i, i = 4$ |
| | 238 | Start bit: 0 |
| | | Modulus Encoder parameter $M_i, i = 5$ |
| | | Modulus Encoder parameter $M_i, i = 6$ |
| | 255 | Start bit: 0 |
| | | Modulus Encoder parameter $M_i, i = 7$ |
| | | Modulus Encoder parameter $M_i, i = 8$ |
| | 272 | Start bit: 0 |
| | | Modulus Encoder parameter $M_i, i = 9$ |
| | | Modulus Encoder parameter $M_i, i = 10$ |
| | 289 | Start bit: 0 |
| | | Modulus Encoder parameter $M_i, i = 11$ |
| | | Reserved for ITU: These bits are set to 0 by the digital modem and not interpreted by the analogue modem. |
| | 306 | Start bit: 0 |
| | 307:322 | $G_{constellation}$ |
| | 323 | Start bit: 0 |
| | 324:339 | $1_{st}$ pre-coder feedback filter coefficient in Q2.14 (Sx.xxxx xxxx xxxx xx), $p_i(1)$ |
| | 340 | Start bit: 0 |
| | ... | ... |
| | ... | ... |
| 1920 | 324+17*LP$_i$ | Last pre-coder feedback filter coefficient in Q2.14 (Sx. xxxx xxxx xxxx xx) |
| | 325+17*LP$_i$ | Start bit: 0 |
| | | $1_{st}$ pre-filter feed-forward filter coefficient in Q1.15 (S.xxxxx xxxxx xxxxx), $z_i(0)$ |
| | | Start bit: 0 |
| | ... | ... |
| | ... | ... |
| | | Last pre-filter feed-forward filter coefficient in Q1.15 (S.xxxxx xxxxx xxxxx), $z_i(LZ_i-1)$ |
| | | Start bit: 0 |
| | | 1st pre-coder feed-forward filter coefficient in Q1.15 (S.xxxxx xxxxx xxxxx), $z_i(1)$ |
| | | Start bit: 0 |
| | ... | ... |
| | ... | ... |
| | | Last pre-filter feed-forward filter coefficient in Q1.15 (S.xxxxx xxxxx xxxxx), $z_i(LZ_i)$ |
| | | Start bit: 0 |

FIG. 19 (continued)

| | |
|---|---|
| | 1st pre-filter feedback filter coefficient in Q2.14(Sx. xxxx xxxx xxxx xx),p₂(1) |
| | Start bit:0 |
| ... | ... |
| | Last pre-filter feedback filter coefficient in Q2.14 (Sx. xxxx xxxx xxxx xx),p₂(LP₂) |
| | Start bit: 0 |
| ... | ... |
| | Linear value of last (largest magnitude) constellation point in the 1st constellation set |
| | Start bit: 0 |
| | Possibly more constellations in same format ( for any non-zero size constellation set). |
| | Start bit: 0 |
| 1930 | CRC |
| | Fill bits: 0s to extend the CP₂ sequence length to the next multiple of 6 symbols |

FIG. 19 (continued)

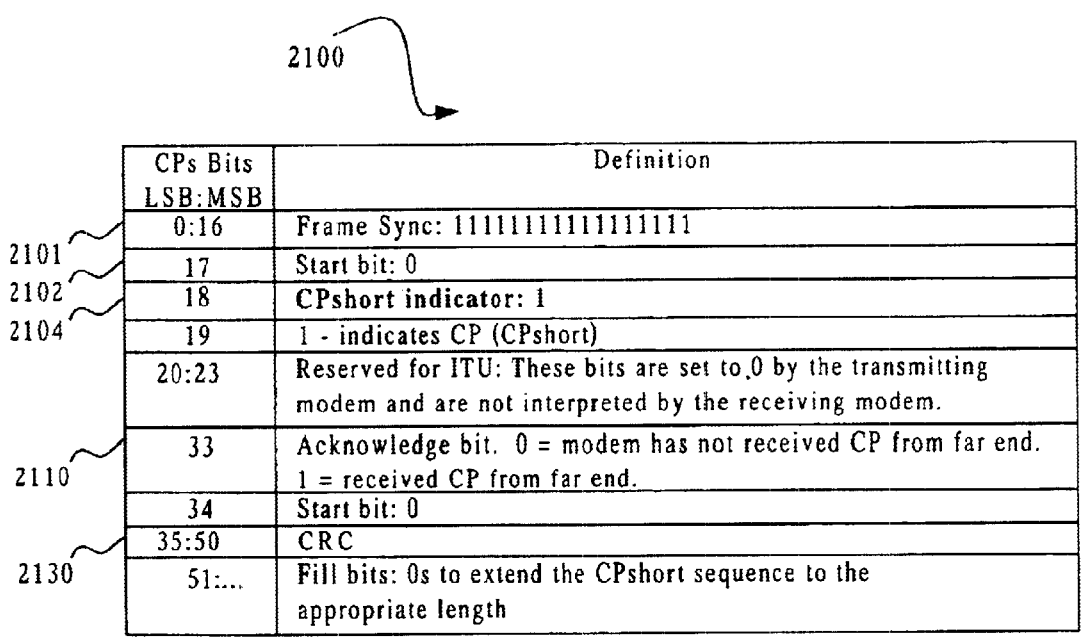

| CPs Bits LSB:MSB | Definition |
|---|---|
| 0:16 | Frame Sync: 1111111111111111 |
| 17 | Start bit: 0 |
| 18 | CPshort indicator: 1 |
| 19 | 1 - indicates CP (CPshort) |
| 20:23 | Reserved for ITU: These bits are set to 0 by the transmitting modem and are not interpreted by the receiving modem. |
| 33 | Acknowledge bit. 0 = modem has not received CP from far end. 1 = received CP from far end. |
| 34 | Start bit: 0 |
| 35:50 | CRC |
| 51:... | Fill bits: 0s to extend the CPshort sequence to the appropriate length |

FIG. 21

| CPas Bits LSB:MSB | Definition |
|---|---|
| 0:16 | Frame Sync: 11111111111111111 |
| 17 | Start bit: 0 |
| 18:20 | CPshort indicator: 1 |
| 21:23 | Reserved for ITU: These bits are set to 0 by the transmitting modem and are not interpreted by the receiving modem. |
| 24:28 | Selected analogue modem data signaling rate, an integer, drn, between 0 and 21. |
| 29:30 | Trellis encoder select bits in analogue modem to digital modem direction. |
| 31 | Set to 1 indicates a silent period is requested. |
| 32 | Reserved for ITU: These bits are set to 0 by the transmitting modem and are not interpreted be the reviewing modem. |
| 33 | Acknowledge bit. 0 = modem has not received CPa from far end. 1 = received CPa from far end. |
| 34 | Start bit: 0 |
| 35:50 | CRC |
| 51:... | Fill bits: 0s to extend the CPashort sequence to the appropriate length. |

FIG. 22

QUICK CONNECT PARAMETER EXCHANGE

RELATED APPLICATIONS

The present application is a Continuation-In-Part of U.S. application Ser. Nos. 09/416,482 and 09/393,616, filed Oct. 12, 1999 and Sep. 10, 1999, respectively, which are both Continuation-In-Part applications of U.S. application Ser. No. 09/394,018, filed Sep. 10, 1999, which is a Continuation-In-Part application of U.S. application Ser. No. 09/361,842, filed Jul. 27, 1999, which claims the benefit of U.S. provisional application serial No. 60/128,874, filed Apr. 12, 1999. The present application also claims the benefit of U.S. provisional applications serial No. 60/167,572, filed Nov. 26, 1999. All above-mentioned applications are hereby fully incorporated by reference in the present application.

FIELD OF THE INVENTION

The present invention relates generally to communication systems. More particularly, the present invention relates to speeding up the connect time between communication systems.

BACKGROUND OF THE INVENTION 56 kbps modems are now standardized in accordance with the ITU V.90 Recommendation. However, many 56 kbps modems, particularly end user modems, may only be compatible with legacy modes such as K56flex, V.34, V.FC, and V.32. Such legacy modems, and downwardly compatible V.90 modems, may have an undesirably long connect or initialization time between dial-up and full rate data mode. The startup time can be up to 30 seconds, which can be rather annoying and unattractive from the perspective of the end user, especially in light of other data communication protocols that appear to operate in an "always connected" manner.

V.90 modems that support legacy modem protocols typically perform the functions shown in Table 1 during initialization. The time periods associated with the operations set forth in Table 1 may vary from connection to connection depending upon various factors such as the server speed and channel conditions.

TABLE 1

Conventional V.90 Modem Startup

| PROTOCOL | OPERATION | TIME (seconds) |
| --- | --- | --- |
| — | Dialing | 1 |
| — | Call Establishment | 1 |
| V.8bis | Capabilities Exchange | 3.5 |
| V.8 | Capabilities Exchange | 3.5 |
| V.90 Phase 2 | Probing & Ranging | 1.5 |
| V.90 Phase 3 | Digital Impairment Learning; Initial APCM Training | 8.5 |
| V.90 Phase 4 | Final APCM Training; Set Power Levels; Constellation Transmission | 2.5 |
| V.42/V.42bis | Error Correction; Data Compression | 0.5 |
| — | Login | 0.55 |
| | | TOTAL = 22.5–27.0 |

The V.8bis operation includes a relatively long timeout period that encompasses much of the time period associated with the operation. This operation is described in detail in ITU-T Recommendation V.8bis (International Telecommunication Union, August 1996), the content of which is incorporated by reference herein. The V.8bis protocol is an extension of the V.8 protocol, as described in ITU-T Recommendation V.8 (International Telecommunication Union, February 1998), the content of which is incorporated by reference herein. In accordance with V.8bis and/or V.8, the two modem devices exchange their individual capabilities such that compatible protocols may be utilized during subsequent initialization and data communication procedures.

The various V.90 startup phases are utilized to determine the analog and digital channel characteristics, to train the modem equalizers, and to otherwise attempt to optimize the current communication session. The details of the V.90 startup phases and other aspects of a V.90 modem system may be found in ITU-T Recommendation V.90 (International Telecommunication Union, September 1998), the content of which is incorporated by reference herein. Although a portion of the V.90 startup segments shown in Table 1 are required without regard to the location or status of the client modem, many of the operations could be eliminated or shortened upon repeated connections associated with the same (or nearly identical) channel characteristics.

In a conventional V.90 modem system, error correction and data compression techniques are performed during the V.42/V.42bis stage. The specifics of V.42 are contained in ITU-T Recommendation V.42 (International Telecommunication Union, October 1996), the content of which is incorporated by reference herein. The specifics of V.42bis are contained in ITU-T Recommendation V.42bis (International Telecommunication Union, January 1990), the content of which is incorporated by reference herein. The V.42 operation is desirable such that the modem system can perform the login procedure in a substantially "error free" mode. The login procedure may be conducted with CHAP and PAP protocols; both are utilized for security purposes in the context of point-to-point protocol ("PPP") connections, e.g., a connection between a client computer and an internet service provider server. From the perspective of the V.90 modem devices, the login information is transmitted as data. Once the login procedure is performed, the dial-up connection is complete and data may be transmitted between the server and the host software associated with the client.

The widespread use of the internet as a daily research, entertainment, and communication tool has increased the deployment of 56 kbps modems. However, many channels can only support legacy modes such as V.34. Thus, although most newer modems (particularly those sold with new personal computers) are compatible with the V.90 Recommendation, many legacy modes are still in use. The long initialization period associated with V.90 modems that fall back into legacy modes may be annoying and undesirable in many applications and can be a serious hindrance where a user would like to establish an immediate connection after an unanticipated disconnect. In addition, even in the context of a connection between two V.90 modem devices, the long V.90 startup phases may test the mettle of an impatient end user. Accordingly, it would be highly desirable to reduce the initialization time normally associated with a conventional V.90 modem system.

A given modem communication session may be interrupted or disconnected for any number of reasons. For example, a call waiting signal may disrupt a modem connection to the extent that the modem call must either be reconnected or reinitialized. As another example, it may be possible to place a current modem connection on hold to enable the user to answer an incoming call in response to a call waiting signal or to enable the user to place an outgoing call without disconnecting the modem connection. Ideally, the modem connection could be re-established in an instantaneous manner. However, in a practical system, a retraining or reinitialization procedure must be carried out to ensure that the two end devices are properly synchronized and to ensure that the channel is adequately equalized. As discussed above, conventional V.90 modem systems may spend more than 20 seconds during such retraining and reinitialization. Accordingly, it would also be desirable to reduce the reconnection time between the same modem devices in response to a temporary disconnect or a temporary pause in the data communication.

One major time consuming portion of modem training and negotiation occurs during parameter exchanges, such as exchange of data signaling rate, preceding coefficient, spectral shaping, constellation information and etc. With reference to FIG. 5, it is shown that, for example, during V.90 negotiations, an analog pulse code modulation ("APCM") modem 580 transmits a constellation parameter ("CP") frame 510 to a digital pulse code modulation ("DPCM") modem 590 that, in-exchange, transmits a modulation parameter ("MP") frame 520 to the APCM modem 580. The MP frame 520 and the CP frame 510 are in synchronous form and include many bits of information and CRC information for error checking purposes (see FIGS. 17 and 18), as further described below.

As shown in FIG. 5, the APCM modem 580 continuously transmits CP frames 510 to the DPCM modem 590 until the APCM modem 580 receives a receipt acknowledgement from the DPCM modem 590 for one of the transmitted CP frames 510. Similarly, the DPCM modem 590 continuously transmits MP frames 520 to the APCM modem 580 until the DPCM modem 590 receives a receipt acknowledgement from the APCM modem 580 for one of the transmitted MP frames 520.

The receipt acknowledgement for the CP frame 510 is transmitted in the form of an MP frame 520, including each and every bit of information and having the acknowledgement bit 33 of the MP frame 520 set to a "1". The MP frame 520 having its acknowledgement bit 33 set to a "1" is denoted as MP' frame 522. Once the DPCM modem 590 receives a CP frame 510, the DPCM modem 590 starts transmitting the MP' frames 522 instead of the MP frames 520. This repeated transmission of MP' frames 522 continues until the DPCM modem 590 receives a receipt acknowledgement for the MP or MP' frames 520 or 522.

Similar to the DPCM modem 590, the receipt acknowledgement from the APCM modem 580 is transmitted in the form of a CP frame 510, including each and every bit of information and having the acknowledgement bit 33 of the CP frame 510 set to a "1". The CP frame 510 having its acknowledgement bit 33 set to a "1" is denoted as CP' frame 512. Once the APCM modem 580 receives an MP frame 520, the APCM modem 580 starts transmitting the CP' frames 512 instead of the CP frames 510. This repeated transmission of CP' frames 512 continues until the APCM modem 580 receives a receipt acknowledgement for the CP or CP' frames 510 or 512.

The repeated transmissions of these long CP, CP', MP and MP' frames, including many bits of information, are indeed a tremendous overhead. This problem, however, gets even more exuberated in the next generation of standards, such as the ITU V.92 Recommendation, as more parameters and bits of information must be exchanged between the modems. FIG. 19 shows an example of the V.92 constellation parameter frame for the APCM modem 580 referred to as CPa frame 1900. As seen, the CPa frame includes many more bits of information than the CP and MP frames 1800 and 1900 (see FIGS. 17, 18 and 19), such as the constellation information with high resolution as well as precoder and prefilter coefficients. The CPa frame 1900 further includes variable length parameters, such as parameter 1920, that can potentially add many more bits of information to the CPa frame 1900.

Concerns have been raised that because of the acknowledgement mechanism introduced in the ITU Recommendation V.34 and re-used in the ITU Recommendation V.90, the startup time may be unduly increased for the ITU Recommendation V.92, due to these long sequences. For example, during a V.92 PCM upstream startup, a significant amount of information needs to be exchanged between the DPCM modem 590 and the APCM modems 580. In particular, the DPCM modem 590 needs to transmit very long sequences, including constellation information with high resolution as well as precoder and prefilter coefficients in the CPa frames.

Accordingly, there is an intense need in the art to eliminate the tremendous overhead of repeatedly transmitting these very long sequences, including many parameters and bits of information, thereby reducing the training and negotiation time and achieving a quick connect.

SUMMARY OF THE INVENTION

The present invention provides techniques to shorten the startup and reconnection times associated with a data communication system that employs a modem. The quick reconnect technique leverages the known channel characteristics of a previous connection to reduce the reinitialization period associated with subsequent attempts to reconnect the same two modem devices. In accordance with one illustrative embodiment, the techniques of the present invention are utilized to reduce the reconnection time for a communication session that follows an upper layer protocol, e.g., PPP. Although not limited to any specific modem application, the quick startup and reconnect procedures may be used to eliminate portions of the initialization protocols or processes normally employed by a V.90 modem, e.g., V.8bis, V.8, digital impairment learning, initial training, probing and ranging, or the like. In addition, the quick startup and reconnect techniques may perform certain operations at a different time or in a different order in comparison to a conventional modem startup technique.

The above and other aspects of the present invention may be carried out in one form by a method for reducing the reconnection time associated with a data transmission system having a first device configured to communicate with a second device over a communication channel. The illustrative method involves establishing a communication session between the first device and the second device over the communication channel, obtaining a number of operating parameters for the data transmission system, where the operating parameters are associated with the communication channel, and storing at least one of the operating parameters at the second device. After a temporary pause in the communication session, the operating parameters are recalled at the second device.

According to one aspect of the present invention, during the startup, retrain, renegotiation, quick connect or other handshaking processes between the communication systems, the communication systems exchange a number of parameters such as modulation, constellation, precoder, prefilter and other communication related information. The communication systems exchange one long information sequence including all necessary parameters or communication information. Subsequently, the communication systems start transmitting short sequences, including an acknowledgement information portion, but not all the other parameters or information embedded in the long sequences. Once each communication system receives a short sequence with the acknowledgment information indicating receipt of the long information sequence, the communication systems may move on to the next stage of the handshaking process. The use of short information sequences substantially shortens the handshaking process and eliminates the delay and overhead introduced by continuous transmissions and retransmissions of the long information sequences.

In yet another aspect of the present invention, if one of the communication systems does not receive an acknowledgement sequence within a predetermined time or event, that communication system may retransmit another long information sequence. Subsequently, the retransmitting communication system may continue transmitting the long information sequences or may start transmitting the short sequences once again.

These and other aspects of the present invention will become apparent with further reference to the drawings and specification, which follow.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

FIG. 17 illustrates the definition of bits in an example modulation parameter (MP) frame;

FIG. 18 illustrates the definition of bits in an example constellation parameter (CP) frame;

FIG. 19 illustrates the definition of bits in an example constellation parameter for analog modem (CPa) frame;

FIG. 21 illustrates the definition of bits in an example short constellation parameter (CPs) frame;

FIG. 22 illustrates the definition of bits in an example short constellation parameter for analog modem (CPas) frame;

DETAILED DESCRIPTION OF A PREFERRED EMBODIMENT

The present invention may be described herein in terms of functional block components and various processing steps. It should be appreciated that such functional blocks may be realized by any number of hardware components configured to perform the specified functions. For example, the present invention may employ various integrated circuit components, e.g., memory elements, digital signal processing elements, logic elements, look-up tables, and the like, which may carry out a variety of functions under the control of one or more microprocessors or other control devices. In addition, those skilled in the art will appreciate that the present invention may be practiced in any number of data communication contexts and that the modem system described herein is merely one illustrative application for the invention. Further, it should be noted that the present invention may employ any number of conventional techniques for data transmission, signaling, signal processing and conditioning, and the like. Such general techniques that may be known to those skilled in the art are not described in detail herein.

It should be appreciated that the particular implementations shown and described herein are merely exemplary and are not intended to limit the scope of the present invention in any way. Indeed, for the sake of brevity, conventional encoding and decoding, timing recovery, automatic gain control ("AGC"), synchronization, training, and other functional aspects of the data communication system (and components of the individual operating components of the system) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

Figure 1:
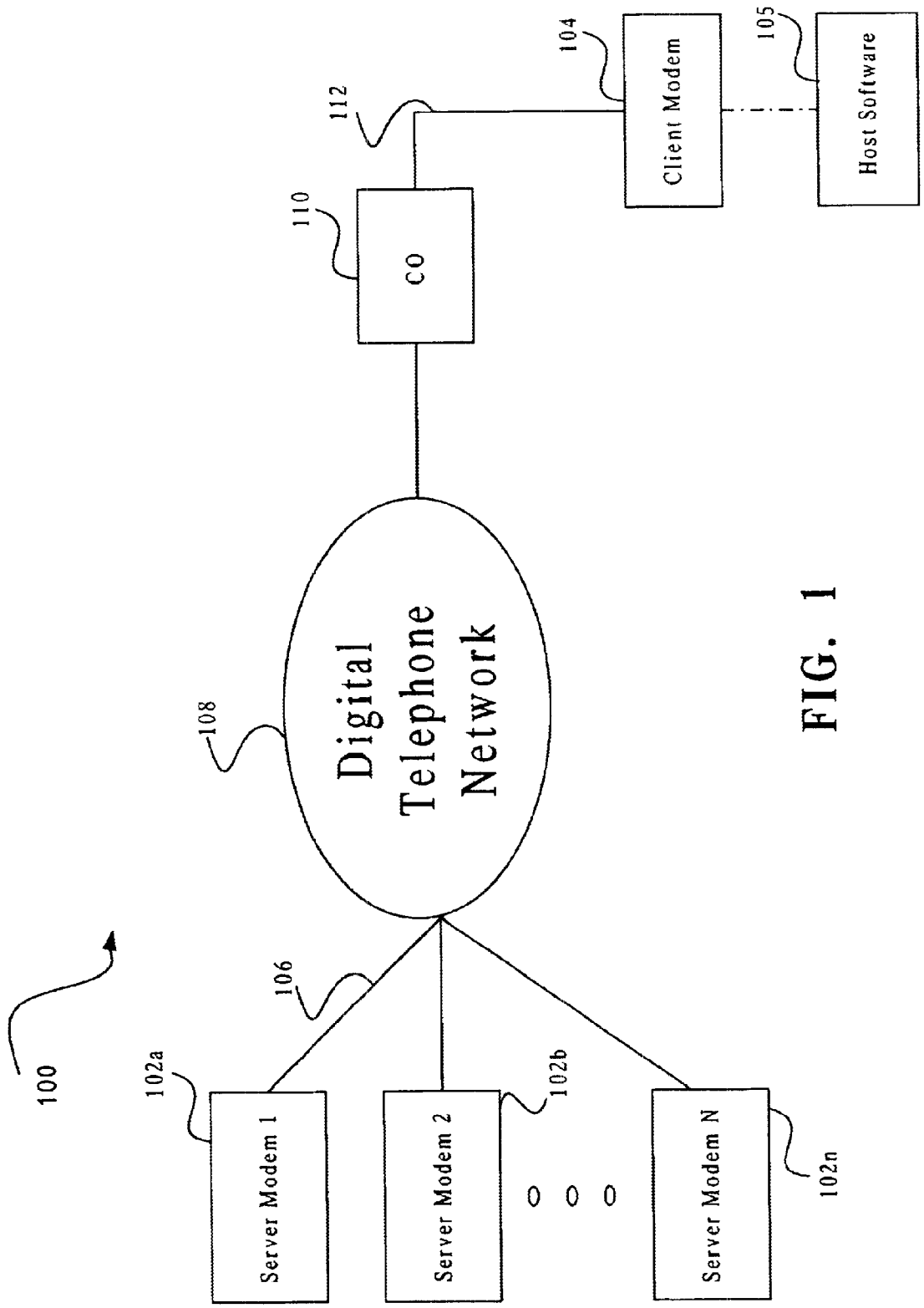
FIG. 1 is a block diagram depicting a general modem system environment capable of supporting point-to-point protocol ("PPP") connections.

FIG. 1 is a block diagram depicting a general modem system 100 in which the techniques of the present invention may be practiced. For purposes of this description, modem system 100 is assumed to be capable of supporting connections associated with an upper layer protocol, e.g., point-to-point protocol ("PPP") connections. PPP connections are typically associated with internet communications between, e.g., an individual end user and an internet service provider. In this respect, modem system 100 includes a plurality of server modems (identified by reference numbers 102a, 102b, and 102n) and a client modem 104. Server modems 102 may each be associated with an internet service provider or any suitable data source. Client modem 104 may be associated with a suitable data source, e.g., a personal computer capable of running host software 105. For purposes of this description, host software 105 may be an operating system such as MICROSOFT WINDOWS, or any application program capable of functioning in conjunction with modem system 100. Although not shown in FIG. 1, client modem 104 may be integrated with the personal computer.

In the context of this description, modem system 100 may employ 56 kbps modems that are compatible with the V.90 Recommendation, legacy 56 kbps protocols, the V.34 Recommendation, or the like. Although the present invention is described herein in the context of a V.90 modem system, the techniques can be equivalently applied in a V.34 modem system or in any number of legacy modem systems. V.90 or 56 kbps modem devices are suitable for use in modem system 100 where a given server modem 102 utilizes a digital connection 106 to the digital telephone network 108. The client modem 104 is connected to a local central office 110 via an analog local loop 112. Thus, the communication channel established between client modem 104 and any server modem 102 is digital up to the central office 110. Thereafter, the digital signals are converted to an analog signal for transmission over the local loop 112.

If an end user desires to establish an internet connection, host software 105 may perform any number of operations in response to a user command. For example, host software 105 may prompt client modem 104 to dial the telephone number associated with server modem 102a (which, for this example, is the server modem associated with the user's internet service provider). Server modem 102a and client modem 104 perform a handshaking routine that initializes the equalizers, echo cancelers, transmit power levels, data rate, and possibly other operational parameters associated with the current communication channel. In addition, host software 105 may cause client modem 104 to transmit and receive authentication data that enables the user to log onto the internet via the service provider. As mentioned above, the authentication data may be exchanged between server modem 102a and client modem 104 in accordance with the known CHAP or PAP techniques. In an alternate embodiment that employs a non-PPP upper layer protocol, a suitable login procedure may be conducted instead of the CHAP or PAP procedures.

As discussed previously, the dial-up connection time (and reconnection time) associated with conventional modem systems may be undesirably long. The present invention takes advantage of the repeated use of a communication channel between modem devices, e.g., the communication channel that is established between server modem 102a and client modem 104. Assuming that client modem 104 is associated with a desktop personal computer resident at a specific location, the connection to any given server modem 102 will necessarily be established over the same analog communication channel. In other words, client modem 104 will always establish an analog channel between the user premises and central office 110. Disregarding slight variations in the analog channel due to temperature and other environmental effects, the initialization of client modem 104 (with respect to the analog channel) will remain substantially constant from connection to connection.

Figure 2:
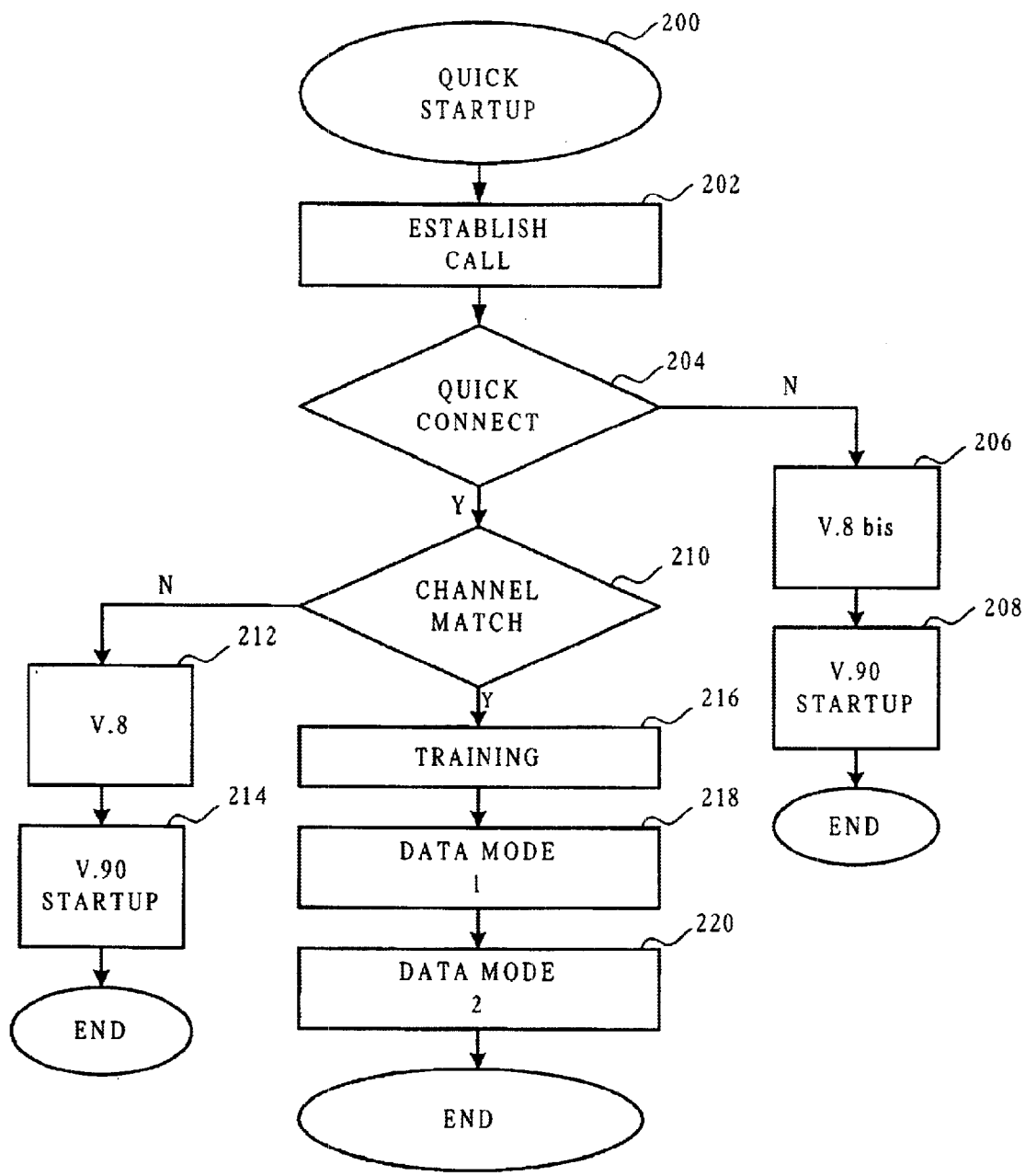
FIG. 2 is a flow diagram of a general quick startup process according to the present invention.

FIG. 2 is a flow diagram of a general quick startup process 200 that may be performed by a data communication system such as modem system 100. In a practical system, process 200 may be cooperatively performed by server modem 102, client modem 104, host software 105, and/or any functional component of modem system 100. In addition, process 200 may be realized in the context of an overall initialization procedure that follows any number of conventional modem protocols.

Quick startup process 200 may begin with a task 202, which relates to the establishment of a call between client modem 104 and a server modem 102. In the context of this example, client modem 104 is considered to be the calling device. Accordingly, host software 105 and/or client modem 104 dials the telephone number associated with, e.g., server modem 102b. Assuming that server modem 102b is capable of making an additional connection, it will go off hook and generate a suitable answer tone in a conventional manner. When both modem devices are off hook and communicating with each other, a communication channel is established via digital connection 106, telephone network 108, central office 110, and analog local loop 112. The dialing, ringing, and answering procedures utilized during task 202 may follow conventional protocols.

Following task 202, a query task 204 may be performed by modem system 100 to ascertain whether a quick connect protocol is supported. Query task 204 may be necessary to enable different server modems and different client modems to be interoperable and compatible. For example, server modem 102b may be a V.90 modem device that supports the quick connect features of the present invention, while client modem 104 may be a legacy 56 kbps modem device that does not support the quick connect features. Portions of query task 204 may be performed by server modem 102b or client modem 104. An illustrative technique for performing query task 204 is described in detail below. Task 204 may be equivalently performed when client modem 104 initiates the call or when server modem 102 initiates the call.

If query task 204 determines that the quick connect protocol is not supported by both modem devices, then a task 206 may follow. Task 206 prompts modem system 100 to begin a conventional initialization routine. For example, in the context of a V.34 or V.90 modem system, task 206 may begin a capabilities exchange protocol such as V.8bis. Alternatively, some modem systems may only implement the V.8 capabilities exchange protocol. Older legacy modem systems may skip the V.8 and V.8bis procedures altogether and perform an appropriate initialization routine according to the legacy mode. Following task 206, modem system 100 may conduct a known startup procedure in accordance with an applicable modem specification. For example, if modem system 100 supports V.90, then task 208 may be associated with conventional V.90 equalizer training, echo canceler training, constellation design, power level verification, and other startup operations. If tasks 206 and 208 are performed, then the startup time associated with the communication session is essentially the same as the startup time for a conventional V.90 connection.

If query task 204 determines that the quick connect protocol is fully supported, then a query task 210 may also be performed. Query task 210 tests whether the characteristics of the established communication channel are similar to corresponding characteristics of a previously established communication channel. Briefly, query task 210 compares one or more attributes of a received sequence to stored attributes of a previously received sequence associated with the previously established channel. The received signal conveys information regarding the characteristics of the communication channel. In particular, the received signal conveys information relative to analog local loop 112.

In the illustrative embodiment described herein, where one modem device is connected digitally to the digital telephone network 108, analog local loop 112 affects signals in a substantially consistent manner from connection to connection. Although the analog characteristics will be similar for repeated connections to the same server modem 102, slight variations in temperature, humidity, other environmental changes, physical changes in the system hardware, and other operational parameters contribute to random fluctuations in the current channel characteristics used for comparison purposes. Nonetheless, the comparison procedure performed during query task 210 is preferably designed to accommodate such fluctuations. For purposes of this description, "similar" characteristics means that query task 210 will assume that the current channel matches a previous channel notwithstanding normal variations due to the uncontrollable and unpredictable factors mentioned above.

If query task 210 determines that the parameters of the current communication channel do not match the parameters of a previous communication channel, then a task 212 may be performed. Task 212, like task 206, prompts modem system 100 to begin a conventional initialization routine. In a preferred embodiment, if modem system 100 verifies that the quick connect protocol is fully supported (query task 204), then most, if not all, of the V.8bis procedure may be skipped. Accordingly, the V.8 capabilities exchange protocol may be prompted by task 212. Thereafter, a task 214 may be performed to cause modem system 100 to enter the conventional V.90 startup procedure. Task 214 is similar to task 208 described above. If tasks 212 and 214 are performed, then the startup time associated with the communication session may be reduced by approximately three seconds, which is the typical time period required to conduct the V.8bis procedures. Accordingly, even if query task 210 determines that the current channel is not similar to a previous channel, quick startup process 200 reduces the overall initialization time of modem system 100.

If query task 210 finds that the current channel characteristics "match" the stored characteristics of a previously established channel, then a task 216 may be performed. An abbreviated training procedure is conducted during task 216. As described in more detail below, modem system 100 leverages the known characteristics of the current channel such that the modem devices can be immediately trained. For example, although the specific timing phase of digital impairments (e.g., robbed bit signaling) may be unknown, the types of digital impairments will be consistent for repeated connections. Thus, in the context of a V.90 modem system, the lengthy digital impairment learning procedure need not be fully implemented. In addition, the initial training of equalizers and echo cancelers, and the initial determination of PCM codec transmit levels and data rates need not be performed.

A task 218 may be performed to enable modem system 100 to operate at an initial data rate. It should be appreciated that portions of the training associated with task 216 may be performed at the initial data rate associated with task 218. Modem system 100 is able to quickly operate at the initial data rate by recalling the initialization parameters associated with the previously stored channel. During task 218, modem system 100 may perform final training of the equalizers and echo cancelers, exchange modulation parameters, and exchange constellation signal points for use during the full rate data mode. In accordance with the present invention, PPP data may be transmitted during task 218 in connection with one or more final training sequences. For example, the PPP data may be associated with the exchange of log-in authentication information, e.g., CHAP or PAP information. In view of the transmission of data during task 218, this portion of quick startup process 200 may be considered to be a first data mode or a data phase one.

Following task 218, quick startup process 200 causes modem system 100 to operate at a final data rate (task 220). In the context of this embodiment, this portion of process 200 may be considered to be a second data mode or a data phase two. The transition between the initial and final data rates preferably occurs in a seamless manner; modem system 100 employs a suitable signal timing or synchronization technique to enable such a data rate transition. During the full data mode, modem system 100 utilizes the signal point constellation exchanged during task 218. Once modem system enters the final data mode, quick startup process 200 ends.

Figure 3:
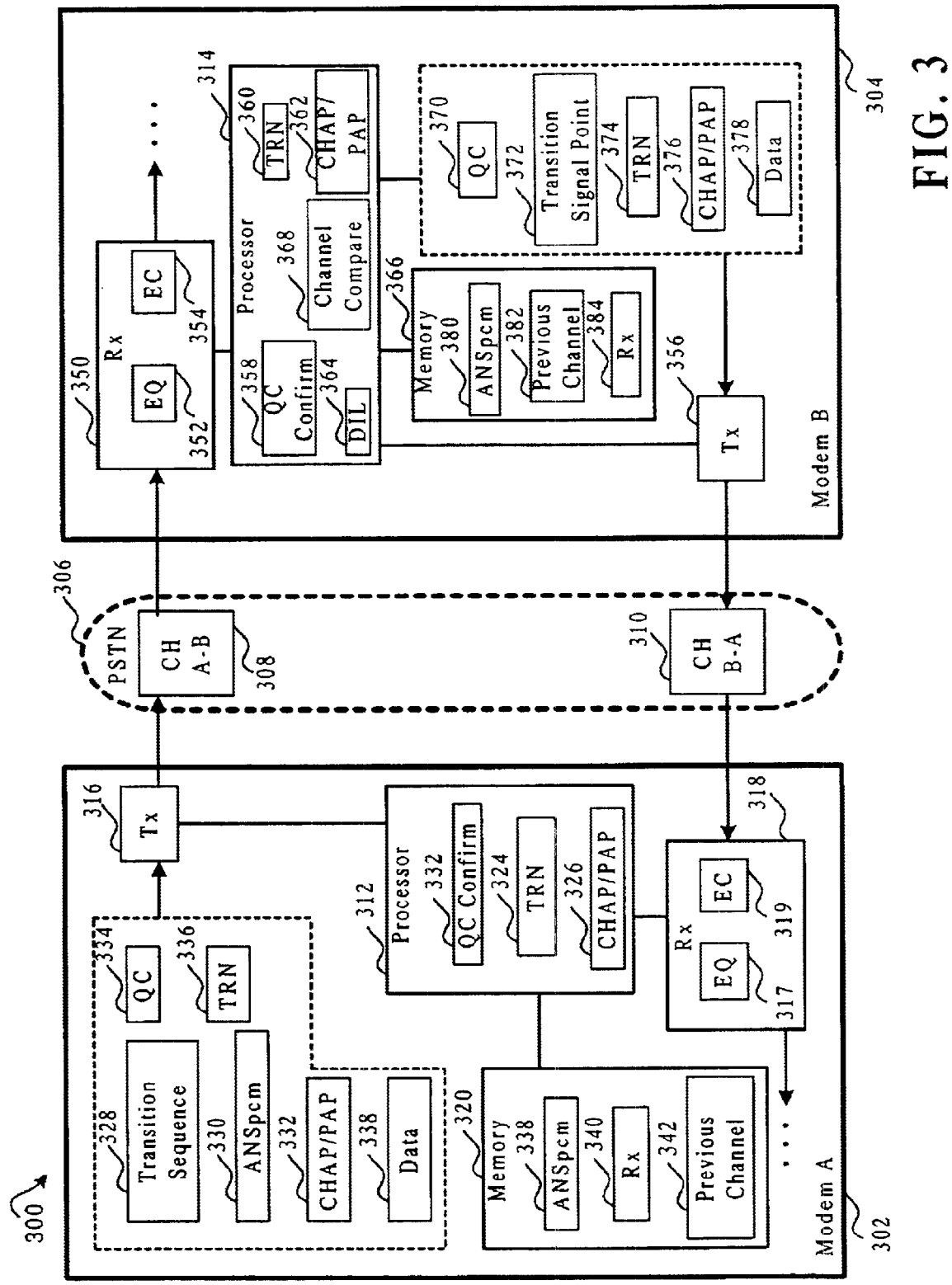
FIG. 3 is a block diagram depicting an illustrative modem system configured in accordance with the present invention.

FIG. 3 is a block diagram depicting an illustrative modem system 300 configured in accordance with the present invention. Modem system 300 is preferably configured to carry out quick startup process 200 and other processes described herein. By way of example, modem system 300 is described herein in the context of a 56 kbps or V.90 system (or a system substantially similar to a V.90 system). However, it should be appreciated that the particular implementation shown in FIG. 3 is not intended to limit the scope of the present invention in any way.

Generally, modem system 300 includes a first modem, e.g., modem 302, and a second modem, e.g., modem 304. In the context of this description, modem 302 is considered to be a server modem and modem 304 is considered to be a client modem (see FIG. 1). It should be appreciated that modems 302 and 304 may be similarly configured such that both can function in either a transmit or receive mode. Modems 302 and 304 are generally configured in accordance with known principles to communicate over a telecommunication network, such as the public switched telephone network ("PSTN") 306, via at least one communication channel (e.g., channels 308 and 310). For purposes of this description, modem 302 is connected digitally to PSTN 306 while modem 304 is connected to PSTN via a central office (not shown) and an analog local loop, as described above in connection with FIG. 1. For the sake of clarity, FIG. 3 does not show the various encoder, decoder, and other functional elements that would typically be present in a practical modem system.

Modem 302 may include a processor element 312, while modem 304 may include a processor element 314. In addition to the specific operations described herein, processors 312 and 314 are suitably configured to carry out various tasks associated with the operation of modem system 300. Indeed, modem system 300 may incorporate any number of processors, control elements, and memory elements as necessary to support its functionality. Such processor, control, and memory elements may suitably interact with other functional components of modems 302 and 304 to thereby access and manipulate data or monitor and regulate the operation of modem system 300.

Processor 312 may be operatively associated with a quick connect confirmation routine, which is illustrated as a functional block 322. Quick connect confirmation routine 322 may be employed during query task 204 (see FIG. 2). Processor 312 is also operatively associated with a number of training routines 324. Training routines 324 may be utilized for initial and/or final training of modem system 300. Training routines 324 may be employed during task 216, as described above. Processor 312 may also operate in conjunction with a dial-up authentication scheme 326, e.g., information exchanging in accordance with PAP or CHAP. The CHAP/PAP functionality may be alternatively (or additionally) realized in one or more software applications maintained by the server corresponding to modem 302. These illustrative operations are not intended to limit the applicability of processing element 312, which is preferably configured to support any number of additional operations.

Modem 302 includes a transmitter 316, which is configured to transmit encoded symbols in accordance with conventional data transmission techniques. Such symbols may represent data, training sequences, synchronization signals, control signals, information exchange sequences, and any suitable communication signal utilized by modem system 300. Modem 302 also includes a receiver 318, which may be configured in accordance with any number of known modem technologies. Receiver 318 is configured to receive communication signals from modem 304; such signals may include encoded information bits, control signals, information exchange sequences, training sequences, and the like. Receiver 318 may include or be functionally associated with an equalizer structure 317 and an echo canceler structure 319. The configuration and operation of equalizer structure 317 and echo canceler structure 319 may be consistent with any number of conventional techniques, e.g., adaptive filtering algorithms.

Modem 302 is preferably configured to generate, process, and transmit different data and signals associated with the operation of modem system 300. Such data, signals, and sequences may be suitably stored, formatted, and produced by any number of microprocessor-controlled components. For illustrative purposes, FIG. 3 depicts a number of blocks related to different operational features of modem system 300; such operational features may have specific data sequences, control signals, or the like, associated therewith. Although a practical system may process and transmit any amount of additional or alternative data, the particular embodiment described herein functions in cooperation with at least the following types of data: a transition sequence 328, an answer signal point sequence 330, authentication information 332, a quick connect identifier 334, training information 336, and user data 338. This data, and the handling of the data by modem system 300, is described in detail below.

Modem 302 also includes a suitable amount of memory 320 necessary to support its operation. Memory element 320 may be a random access memory, a read only memory, or a combination thereof. Memory element 320 may be configured to store information utilized by modem system 300 in connection with one or more processes related to the present invention. For example, memory element 320 may be configured to store a suitable answer signal point sequence 338. Memory 320 may store specific signal points, transmit levels, a pattern utilized to format a sequence for transmission, or the like. In the preferred embodiment, answer signal point sequence 338 corresponds to sequence 330 (described above). Memory element 320 may also be configured to store a number of parameters related to the training of receiver 318. These receiver parameters, which are depicted as block 340, may be associated with the initialization of equalizer structure 317 and/or echo canceler structure 319. As a practical matter, memory element 320 may store information related to the analog and/or digital characteristics, e.g., filter tap coefficients, of equalizer structure 317 and echo canceler structure 319, and transmit codec level estimates.

In accordance with a preferred embodiment of the present invention, memory element 320 is also capable of storing a number of parameters, attributes, and/or characteristics of a previously established channel (illustrated as a previous channel block 342). The previous channel parameters 342 may be stored at any suitable time during a communication session or periodically updated during a session. Indeed, modem 302 and modem 304 may both be configured to save the current channel parameters to anticipate a temporary interruption, delay, or disconnection associated with the current communication session (whether such interruption, delay, or disconnection is intentional or unintentional). As described in more detail below, in response to a temporary disconnection or pause in the modem data transmission mode, modem 302 can be placed "on hold" until the communication session is to be reinitiated. At that time, modems 302 and 304 may access the stored channel parameters rather than conduct a lengthy retrain procedure.

Modem 304 includes a receiver 350, which is operatively associated with an equalizer structure 352 and an echo canceler structure 354. Receiver 350 is configured to receive communication signals from modem 302. Modem 304 also includes a transmitter 356 configured to transmit communication signals to modem 302. These components of modem 304 may be similar to the corresponding components of modem 302. Thus, for the sake of brevity, the description of features and functions that are common to modems 302 and 304 will not be repeated in this description of modem 304.

Processor 314 may be operatively associated with a quick connect confirmation routine 358, one or more training routines 360, and a dial-up authentication scheme 362. These processing functions are similar to the corresponding functions described above in connection with processor 312. In addition to these features, processor 314 may be operatively associated with a digital impairment learning routine 364. Digital impairment learning routine 364 may be compatible with the digital impairment learning procedure carried out by conventional V.90 modems. Routine 364 may be utilized to enable modem 304 to analyze a digital impairment learning sequence transmitted by modem 302 and to determine the types of digital impairments present in the communication channel and any timing phases associated with such digital impairments. Routine 364 may interact with a memory element 366 such that modem 304 can store the digital impairment profile associated with a given communication channel. Routine 364 may enable modem 304 to select appropriate signal points (or a signal point) that function to illuminate or highlight robbed bit signaling present in the channel. For example, if modem 304 determines that the network forces robbed bits (typically the least significant bit of a symbol) to zeros, then a signal point having a least significant bit of one may be selected such that the robbed bit signaling phases can be easily detected.

Processor 314 may also be configured to conduct a channel comparison routine 368, which may be performed during task 210 described above in connection with FIG. 2. Channel comparison routine 368 preferably determines whether the characteristics of the current communication channel are similar to stored characteristics associated with a previously established communication channel. In the context of this description, the current channel is a repeated connection of the previously established channel, and a number of stored characteristics may be resident in memory element 366. Routine 368 is described in more detail below.

As with processor 312, the illustrative operations set forth herein are not intended to limit the applicability of processing element 314, which is preferably configured to support any number of additional operations.

Like modem 302, modem 304 is configured to generate, process, and transmit different data and signals associated with the operation of modem system 300. Such data, signals, and sequences may be suitably stored, formatted, and produced by any number of microprocessor-controlled components. Although a practical system may process and transmit any amount of additional or alternative data, transmitter section 356 is illustrated in conjunction with the following types of data: a quick connect identifier 370, a transition sequence signal point identifier 372, training information 374, authentication information 376, and user data 378. This data, and the handling of the data by modem system 300, is described in detail below.

As mentioned above, modem 304 includes a suitable amount of memory 366 necessary to support its operation. Memory element 366 is similar to memory element 320. In the preferred embodiment, memory element 366 is configured to store an answer signal point sequence 380 that is related to the corresponding answer signal point sequence 338 utilized by modem 302. In this embodiment, the same answer signal point sequence is predetermined and known at both modems 302 and 304. Memory element 366 may also store a number of parameters, attributes, and/or characteristics of a previously established channel (illustrated as a previous channel block 382). The previous channel parameters 382 may be stored at any suitable time during a communication session or periodically updated during a session. Like memory element 320, memory element 366 may also be configured to store a number of parameters 384 related to the training of receiver 350. These stored receiver parameters 384 are preferably accessed by modem 304 to effectively reduce the startup latency typically experienced with conventional V.90 modem systems.

A number of features of the present invention contribute to the reduction in conventional V.90 modem startup and/or reconnect times, e.g., the elimination or abbreviation of the V.8bis procedure, the elimination or abbreviation of the initial training procedure, and the exchanging of login authentication data earlier in the initialization process (rather than waiting until the full data rate is achieved). In one embodiment, the login authentication data is exchanged while the modem system is in an initially trained mode associated with an intermediate data rate. Any one of these (and other) features of the present invention may be implemented in modem system 300.

Figure 4:
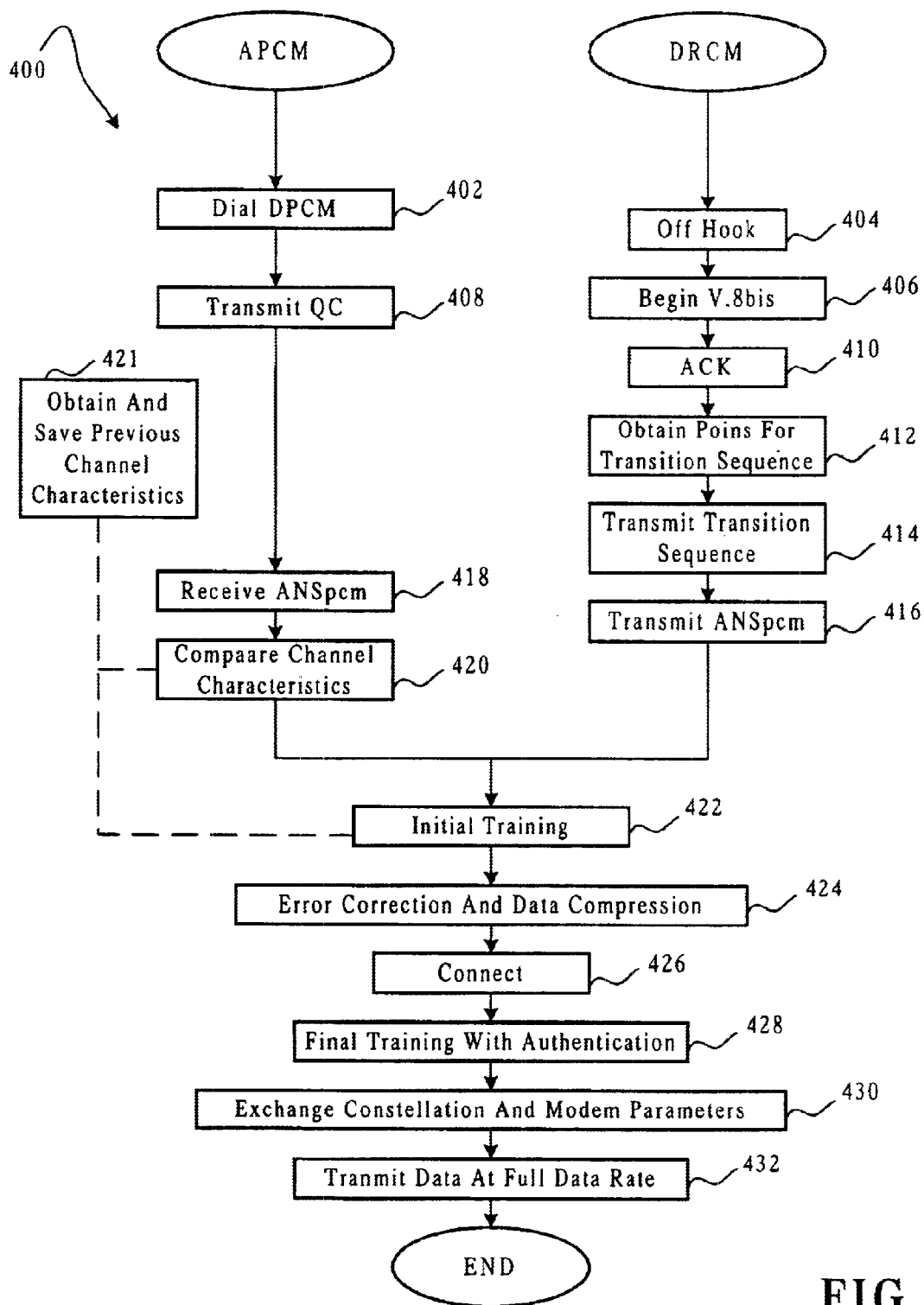
FIG. 4 is a flow diagram illustrating portions of a quick startup process performed by two modem devices.
Figure 5:
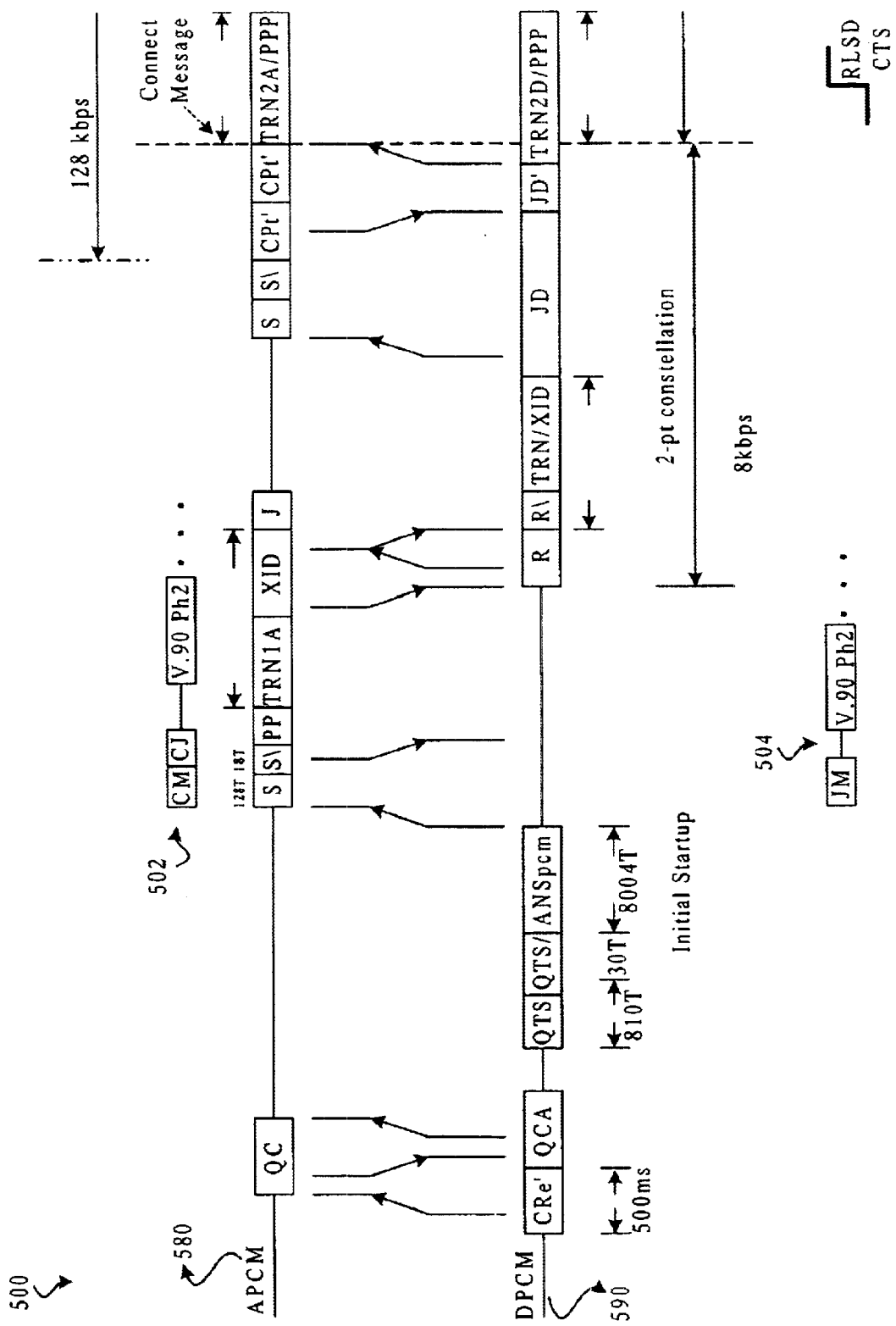
FIG. 5 is a timing diagram corresponding to a quick startup process performed by two modem devices.
Figure 5:
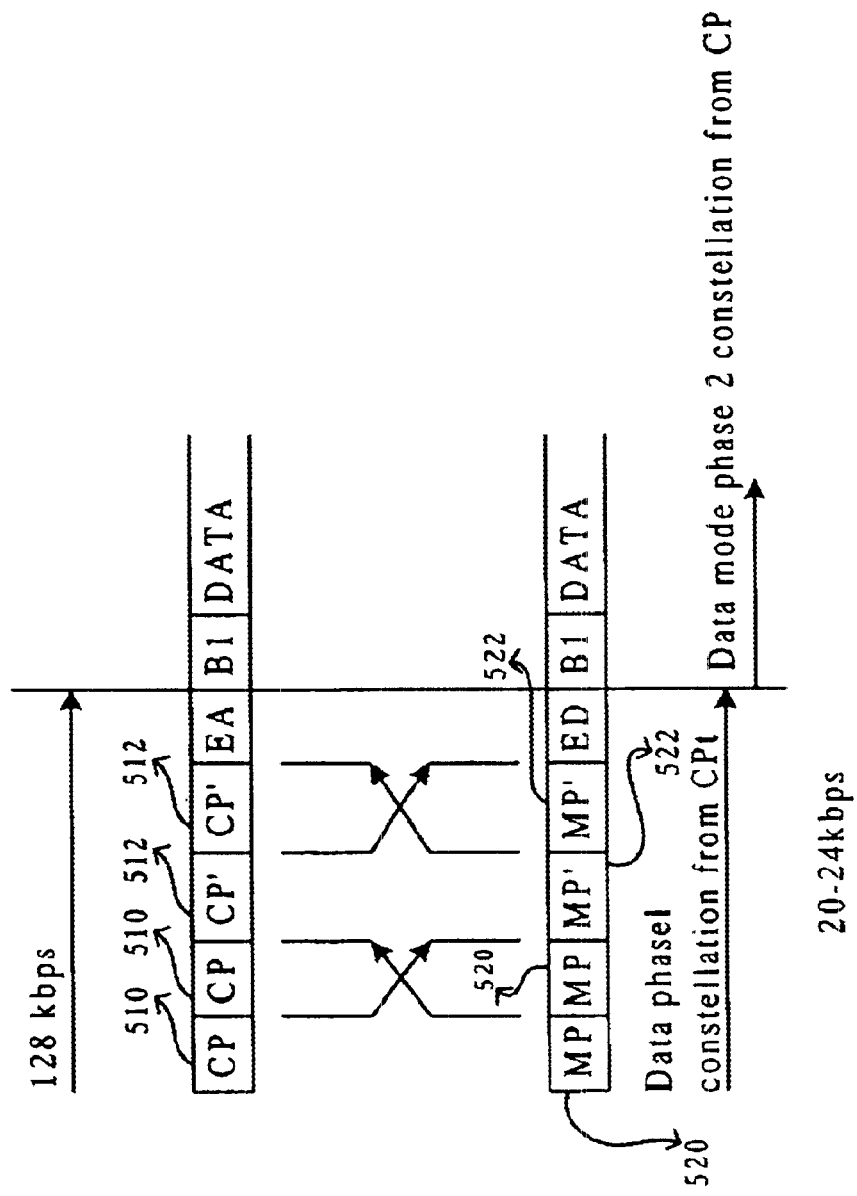

FIG. 4 is a flow diagram illustrating portions of a quick startup process 400 performed by two modem devices, and FIG. 5 is a timing diagram 500 corresponding to an illustrative quick startup process performed by two modem devices. Timing diagram 500 includes acronyms and abbreviations that are often used in the context of V.8, V.8bis, V.34, V.90, and other data communication protocols. The use of such terminology herein is intended to illustrate the concepts of the present invention in the context of one practical embodiment. However, the present invention may be employed in any suitable context, and the specific signals, number of sequences, timing of the sequences, data rates, and interaction between the two modem devices shown in FIG. 5 are not intended to limit the scope of the invention in any way.

Quick startup process 400 is depicted in a manner that indicates tasks associated with a client modem, e.g., APCM, and a server modem, e.g., DPCM. Similarly, timing diagram 500 shows the general sequencing of signals transmitted by an APCM and a DPCM. In FIG. 5, the arrows between the two major sequences represent responses or interactions between the APCM and the DPCM.

Quick startup process 400 may begin with a task 402, which causes the APCM to dial the telephone number associated with the DPCM. As described above, the call will be established over local loop 112, central office 110, and digital telephone network 108 (see FIG. 1). In response to the initial ring tone, the DPCM may be placed in an off hook state (task 404), i.e., the DPCM will answer the call. Of course, the APCM and the DPCM may be configured to place, answer, and process calls in accordance with conventional telephony protocols. Following task 404, a task 406 may be performed to initialize a capabilities exchange protocol such as V.8 or V.8bis. In the embodiment described herein, a capabilities request signal (represented by CRe in FIG. 5) may be transmitted during task 406. The CRe signal may function to inform the APCM that the DPCM supports the quick connect procedure. The CRe signal may be a modified version of the conventional V.8bis signaling tones, e.g., the V.8bis tones may be amplitude modulated. Alternatively, the frequency associated with a signaling tone may be jittered in a periodic manner or a low-level wideband signal may be added to a tone. In this manner, legacy modem systems will recognize the CRe signal as the normal V.8bis CRe signal.

In response to the establishment of a call associated with the current communication channel, the APCM may perform a task 408 to suitably transmit a quick connect identifier (QC) to the DPCM. In the practical embodiment described herein, the transmission of the quick connect identifier may be prompted in response to the detection of the CRe signal by the APCM. The QC signal is preferably designed such that legacy modems and modems that do not support the quick connect protocol are not adversely affected by the QC signal, i.e., the QC signal should be ignored by non-compatible devices. (If the APCM does not support the quick connect techniques described herein, then it will not generate the QC signal and the startup will proceed in a conventional manner, as described above in connection with FIG. 2). In a preferred embodiment, the QC signal also conveys a signal point identifier that identifies signal points (or one point) for use by the DPCM in a transition sequence (represented by QTS and QTS\ in FIG. 5), where the signal points function to highlight, illuminate, or make apparent the digital impairments present in the communication channel. Thus, the QC signal sequence performs a dual function.

Assuming that the DPCM also supports the quick connect methodology, it preferably performs a task 410 in response to the reception of the QC signal. In connection with task 410, the DPCM transmits a quick connect acknowledgment (represented by the QCA signal in FIG. 5). As described above in connection with FIG. 2, if the DPCM does not acknowledge the QC signal, or if the APCM somehow fails to receive the QCA signal, then the modem system will proceed with a conventional startup procedure. The format, configuration, and processing of the QC and QCA signals may be carried out by the respective portions of the individual modems, as described above in connection with modem system 300 (see FIG. 3).

If the DPCM and the APCM both support the quick connect technique, then any number of initialization routines may be eliminated, modified, or abbreviated, depending upon the specific application. For example, in the context of a V.90 compatible modem system, the transmission of the QC signal may inherently indicate that the APCM is V.90 compliant. Similarly, the transmission of the QCA signal may inherently indicate that the DPCM is also V.90 compliant. Consequently, the modem system may eliminate portions or the entirety of the normal capabilities exchange protocol or protocols, such as V.8 and/or V.8bis. This feature by itself can reduce the startup latency by as much as five seconds (for a typical connection).

It should be appreciated that the quick connect identification and verification scheme described above in connection with task 402 through task 410 can be equivalently applied when the DPCM initiates the call to the APCM. Such a situation may arise when, in response to an initial call or request from the APCM, the DPCM calls the APCM to establish the communication channel. In this situation, the APCM will transmit the CRe signal, the DPCM will transmit the QC signal, and the APCM will transmit the QCA signal. In contrast to the above description where the APCM initiates the call, the APCM may transmit an additional signal or sequence to suitably identify the transition sequence signal points to the DPCM (rather than embedding the signal points in the CRe or QCA sequences).

Following task 410, the DPCM may perform a task 412 to obtain the signal points (or point) for use in a transition (or synchronization) sequence. As discussed above, the QC signal preferably conveys information that identifies signal points that make the presence of robbed bit signaling easily detectable by the APCM. The determination of the particular signal points may be carried out by the APCM, as described above in connection with the digital impairment learning procedure 364 (see FIG. 3). This determination may be based on past analyses of the digital impairments associated with a previous connection over the same channel. Task 412 may be performed by processor 312 after the APCM receives the QC signal.

In response to task 412, a task 414 may be performed such that a suitable transition sequence is transmitted by the DPCM. In an exemplary embodiment, the transition sequence includes positive and negative values of the signal points obtained in task 412. Accordingly, the DPCM may utilize the signal points selected by the APCM and a suitable sign pattern (which may be predetermined) to generate the transition sequence. The transition sequence is configured and formatted such that the APCM, upon detecting the transmission sequence, can synchronize itself to the subsequent signal or sequence transmitted by the DPCM. In this manner, the APCM receiver can obtain its timing from the transition sequence. The transmission sequence may be of any predetermined length and have any predetermined sign pattern. For example, in the embodiment depicted in FIG. 5, the transition sequence is represented by the quick timing sequence (QTS) and QTS\ signals, where QTS represents a specific signal point sequence and QTS\ is the same sequence having opposite signs. In FIG. 5, the QTS sequence is repeated for 810 symbols while the QTS\ sequence is repeated for 30 symbols.

In accordance with one practical embodiment of the present invention, the QTS sequence is formatted such that the period of the QTS root sequence and the period of the robbed bit signaling ("RBS") associated with the network connection have no common denominator (other than one). For example, one suitable QTS root sequence is 0, +A, −A, +A, −A (where A represents a signal point that highlights the presence of RBS. Thus, for the embodiment illustrated in FIG. 5, this QTS root sequence, which has a period of five, is repeated 162 times while the QTS\ sequence includes six repetitions of the root QTS sequence with inverted signs.

For the above example, where the RBS period is assumed to be six, the received transition sequence may be subjected to a 30-point discrete Fourier transform ("DFT") to obtain the tining phase of the DPCM. In addition, the presence of RBS will be revealed at certain discrete frequencies associated with the DFT result. In this manner, timing and RBS information can be extracted from the received transition sequence. In addition, the timing phase information is obtained independently from the RBS information.

The DPCM is preferably configured to transmit a specific signal point sequence during a task 416. The signal point sequence may be considered to be a modified answer tone, as that term is understood by those familiar with modem protocols. In FIG. 5, this signal point sequence is represented by the ANSpcm signal. As depicted in FIG. 3, a predetermined ANSpcm sequence 338 may be stored in memory element 320 for transmission by transmitter section 316. In a practical embodiment, the DPCM transmits the ANSpcm signal following the transition sequence. This may be desirable to enable the APCM to anticipate the signal point sequence once it detects the transition sequence. In other words, the detection of the transition sequence by the APCM will indicate that the signal point sequence will follow.

In a preferred embodiment, the ANSpcm signal comprises a sequence of pulse code modulation signal points or a sequence of signal points associated with pulse code modulation signal points. For example, the ANSpcm signal may be formatted as a sequence of mu-law or A-law codewords or a sequence of universal codewords (U-codes). The APCM and the DPCM are preferably configured such that the ANSpcm signal is predetermined and known prior to the initiation of quick startup process 400. In an alternate embodiment, a number of different ANSpcm signals may be suitably stored in lookup tables or the ANSpcm signal may be designed by one of the modem devices and communicated in a suitable manner to the other modem device prior to task 416. For example, the ANSpcm signal may be designed such that the presence of RBS can be easily detected by the APCM by analyzing the received ANSpcm signal. In such an embodiment, it may not be necessary for the transition sequence (QTS and QTS\) to identify or highlight the RBS.

In the context of V.8, the answer tone is generated as an amplitude modulated 2100 Hz tone. In contrast, the present invention utilizes the ANSpcm signal to generate a tone (e.g., a 2100 Hz tone) in a digital manner using pulse code modulation signal points. In other words, the ANSpcm signal is a digital representation of an analog signal. The ANSpcm signal is preferably constructed with known pulse code modulation points such that the ANSpcm signal may be used for purposes other than a mere answer tone. In a preferred embodiment, the ANSpcm signal includes many of the available pulse code modulation points associated with the particular telephone network. This aspect of the ANSpcm signal is desirable such that the ANSpcm signal may be used to determine or identify the characteristics of the current communication channel, particularly digital pads. The use of a large number of the possible codewords ensures that the ANSpcm signal will detect digital pads that may merge two input levels into one output level. The ANSpcm signal is also configured to provide a tone suitable for disabling the network echo cancelers and disabling the network echo suppressors.

If the ANSpcm signal is defined using look-up tables, a practical implementation may be difficult where multiple transmit levels are contemplated or required. For example, ITU-T Recommendation V.90 allows the DPCM to specify 32 different transmit levels. Storing a separate table for each transmit level may thus lead to excessive memory requirements. Accordingly, in an alternate embodiment, a procedure may be defined for mapping a plurality of codewords associated with one transmit level into a corresponding plurality of codewords associated with the other transmit levels. For example, given a table of PCM codewords defining the ANSpcm signal for a level of −0.5 dBm0, the procedure may involve mapping each individual PCM codeword to its corresponding PCM level, scaling that level according to the desired transmit level reduction, quantizing the resulting level back to the closest PCM level, and converting to the corresponding PCM codeword. Thus a corresponding ANSpcm signal can be constructed using the same mechanism in both the DPCM transmitter and the APCM receiver, hence producing the identical sequence of PCM codewords on each side. Note that, in accordance with this embodiment, the quantizing rule should be exact in dealing with "ties" in the quantization, i.e., if two PCM levels are equidistant from the scaled level. For example, the rule may dictate that, in case of a tie, the PCM level closer to zero is selected.

In accordance with yet another embodiment, the overall method of defining the ANSpcm signal could be based on a predetermined algorithm that generates the sequence of PCM codewords representing the ANSpcm signal. For example, the signal could be defined as a collection of tones, 2100 Hz being the strongest, where the tones have predefined amplitudes and initial phases. The sum of the tones would then be scaled according to the desired transmit level, and the resulting signal would be quantized to the closest PCM level, again using an exact quantizing rule in case of a tie. However, this method would also employ an exact definition of either the sine or cosine function, as well as how many bits were accumulated in summing the tones, to ensure that the calculations proceed in a consistent manner at both ends such that the ANSpcm signal can be properly detected.

As described above, the APCM anticipates the transmission of the ANSpcm signal. The digital impairments and analog characteristics associated with the communication channel will affect the ANSpcm signal as it is transmitted from the DPCM to the APCM. A task 418 may be performed by the APCM to obtain a received sequence that is related to the ANSpcm signal point sequence. The APCM may then perform a task 420 to compare a number of attributes of the received sequence with a number of stored attributes of a previously received sequence associated with a previously established communication channel. In an illustrative embodiment, the previously received sequence is a digital impairment learning ("DIL") sequence, which is a line probing sequence. In this respect, task 420 determines whether a characteristic of the current channel is similar to a corresponding characteristic of a previously established channel. In a preferred embodiment, the channel characteristics compared in task 420 are related to the digital impairments in the channel. In other words, task 420 validates a current digital impairment channel profile with a stored digital impairment channel profile. Task 420 may be performed by a suitable processor element of the APCM (see FIG. 3.).

During task 420, any measurable characteristic of the points/levels, any measurable characteristic of the received sequence as a whole, and/or any measurable signal or quantity associated with the points/levels may be analyzed by the APCM. For example, any number of individual points or levels contained in the received sequence may be compared to corresponding points or levels stored at APCM (the stored points or levels may be associated with a prior DIL procedure). If the received points/levels "match" the stored points/levels or if the differences between the received and stored points/levels are within a certain threshold, then the APCM may assume that the current channel attributes match the stored channel attributes (see query task 210 in FIG. 2).

The APCM may perform a procedure 421 to suitably obtain and save a number of attributes or characteristics of a previously established connection to the current channel. As described above, procedure 421 may cause the APCM to store the characteristics of the points/levels contained in a received DIL sequence. These past values are thereafter used during task 420. In this respect, procedure 421 may update the previous values with new DIL values after the comparison in task 420 is completed, e.g., in response to a subsequent DIL procedure associated with the current connection.

As described above in connection with FIG. 2, if task 420 determines that the channel characteristics do not sufficiently match, then the modem system may revert to a conventional V.90 startup procedure. FIG. 5 illustrates that the APCM may fall back into the V.8 protocol and transmit a conventional V.8 call menu (CM) message to the DPCM. The conventional V.8 startup for the APCM then follows along a sequence 502. In response to the CM message, the DPCM generates a conventional V.8 joint menu (JM) message and proceeds in accordance with the conventional V.8 initialization (indicated by a sequence 504). For the sake of illustration, quick startup process 400 assumes that task 420 determines that the current communication channel is similar to a previously established communication channel.

If the APCM validates the current channel characteristics with a previous channel, then it may trigger a quick startup routine to further reduce the initialization time associated with the modem system. Alternatively, the DPCM may be configured to trigger the quick startup routine. Accordingly, a task 422 may be performed, during which the modem system is initially trained. (For the sake of clarity and brevity, portions of task 422 and portions of the subsequent tasks may be performed by both the APCM and the DPCM; quick startup process 400 depicts such combined functionality in the context of single process tasks). Task 422 may cause the APCM and the DPCM to be initialized in response to a number of stored parameters associated with the previously established communication channel. As mentioned above, the stored parameters may be related to the initialization or training of the equalizers, echo cancelers, transmit power levels, initial signal point constellations, or the like. Task 422 may operate in conjunction with procedure 421, which preferably functions to obtain and store the initialization parameters associated with the previous connection. In this respect, procedure 421 may be suitably designed to periodically save such parameters during the normal data mode of the previous connection, after a renegotiation process, or in response to any condition or event associated with the previous communication session. Procedure 421 may also be configured such that erroneous settings or initialization parameters are not inadvertently saved.

In the context of a typical V.90 connection, task 422 may be related to a two-point training phase. Using the previous parameters, the modem system may be able to skip or abbreviate the conventional V.90 Phase 2 probing and ranging procedure and to skip or abbreviate the conventional V.90 Phase 3 digital impairment learning and initial training procedures. As shown in FIG. 5, the APCM and the DPCM may each transmit training sequences (represented by the TRN1 signals) during task 422. These training signals may be utilized to adaptively adjust the equalizer and echo canceler filter taps and to otherwise facilitate training of the modem system. Thus, one of the most time consuming procedures of a V.90 startup (the training of the APCM equalizer) can be performed in an efficient manner that allows ample time for fine tuning and training.

In addition to the initial training that occurs during task 422, a task 424 may be performed. During task 424, the modem system may conduct error correction and/or data compression protocols. In a conventional V.90 modem system, the V.42 Recommendation is followed for purposes of error correction and the V.42bis Recommendation is followed for purposes of data compression. For example, in a normal V.90 operating mode associated with a PPP connection, the V.42 and V.42bis procedures are performed after final training and before the CHAP/PAP authentication procedure. V.42 and V.42bis are performed prior to the CHAP/PAP procedure because the CHAP/PAP procedure is better suited to an "error free" channel. In contrast to conventional V.90 systems, task 424 may perform V.42bis during Phase 3 of the V.90 startup. The shifting of V.42bis forward in the startup process contributes to the reduction in connection time. In FIG. 5, the XID signal represents a modified version of the conventional V.42 XID signal. For example, the XID signal may utilize a subset of the XID parameters used to negotiate compression and the like. Portions of the V.42bis procedure may also be conducted in connection with various modified signal sequences shown in FIG. 5. For example, the CPt signal may represent the conventional V.90 CPt signal combined with one or more V.42bis signals.

In the preferred embodiment, the V.42bis procedures are performed to provide a substantially "error free" channel. Following task 424, a CONNECT message is issued to the host software. The CONNECT message indicates that the modem system is ready to transmit data at an initial data rate at this time. The CONNECT message may be formatted, generated, and transmitted in accordance with known techniques.

In response to the CONNECT message, the host software begins a "simultaneous" upper layer protocol login procedure, e.g., a CHAP or PAP procedure (task 428). Task 428 may be initiated automatically by the host software or in response to a user entry. The CHAP/PAP data transmission occurs in conjunction with a final training process. In the preferred embodiment, the APCM and the DPCM transmit the CHAP/PAP authentication data as scrambled digital data over the communication channel. The scrambling of the authentication data enables the modem devices to perform final training on the authentication data. In a conventional V.90 modem system, the final training signals are formatted as scrambled "ones". The scrambled ones carry no information; the final training signal is merely utilized as a spectrally white source. The present invention leverages the final training signals to carry user data while the modem devices complete the training process. Although CHAP/PAP data is one preferred form of user data, the present invention is not limited to the transmission or exchange of authentication data. In addition, the particular scrambling algorithm may vary from application to application.

In FIG. 5, the dual function signals are represented by the TRN2A/PPP and TRN2D/PPP signals. In this respect, the receiver sections in the modem devices may be trained at an initial data rate during a first time period, e.g., during a data phase one, such that they may seamlessly transfer to operating at a final data rate during a subsequent time period, e.g., during a data phase two. Furthermore, the PPP log-in procedure can be performed at the initial data rate during the first time period rather than after the modem system has been fully initialized.

During the initial data rate period, a task 430 may be performed to enable the APCM and the DPCM to exchange constellation parameters and modulation parameters (represented by the CP and MP signals in FIG. 5) in a suitable manner. Task 430 may be performed in a conventional V.90 manner. These parameters may be utilized by the modem devices during the subsequent data mode. After the training and authentication procedures are completed, the modem system preferably transitions to a full data rate in a seamless manner. A task 432 may be performed to conduct data transmission at the full data rate. This period may be referred to as the data phase two. Once the modem system enters the full data mode, quick startup process 400 ends.

In contrast to the conventional V.90 modem startup summarized in Table 1, a modem system according to the present invention may experience a reduced startup latency, as set forth in Table 2 below. Notably, the startup time summarized in Table 2 is approximately half of the startup time summarized in Table 1. The considerable reduction in startup latency would be desirable in many situations, particularly in the context of a PPP dial-up internet connection using V.90 or legacy 56 kbps modem systems.

TABLE 2

Quick V.90 Modem Startup

| PROTOCOL | OPERATION | TIME (seconds) |
| --- | --- | --- |
| — | Dialing | 1 |
| — | Call Establishment | 1 |
| V.8bis (abbreviated) | Capabilities Exchange | 1 |
| — | Modified Answer Tone | 1 |
| V.90 Phase 3 + V.42/V.42bis | Initial APCM Training; Error Correction: Data Compression | 2.5 |
| V.90 Phase 4 + Login | Final APCM Training; Set Power Levels; Constellation Transmission; Username & Password | 2–5 |
|  |  | TOTAL = 8.5–11.5 |

The techniques of the present invention may be implemented in other contexts to reduce the reinitialization time associated with reconnects after a line corrupting event or a channel interruption. For example, many telephone customers subscribe to call waiting, caller identification, and other telephony services. However, such services may be disabled or nonfunctional if the telephone line is being utilized for a modem connection. If call waiting is not disabled during a modem connection, then the signal tones may interrupt the modem connection. If the user decides to answer the waiting line, then the off-hook and on-hook flash may cause the modem system to retrain its receivers or prompt a full reconnect procedure.

Rather than perform a time consuming reconnect or retrain procedure, a modem system may be configured to utilize stored analog and digital impairment information, equalizer settings, power levels, echo canceler settings, constellations, and the like. Such stored information can be used to immediately reset the modem system parameters if the channel connection is interrupted by a call waiting procedure, by an off-hook condition at an extension telephone device, by a caller identification request, or by any channel corruption event, whether such event is planned or unintentional. In this scenario, both the client modem and the server modem may store the relevant system attributes, modem operating parameters, channel characteristics, and/or network characteristics.

In one practical example, in response to a call waiting tone, the client modem may signal the server to enter a standby mode. The server modem can then switch into an FSK mode to suitably detect the Class 2 caller identification information while the server idles. If the user wants to answer the second call, then the client modem may periodically transmit standby signals or heartbeat tones to the server to instruct the server to continue holding. When the second call ends and the user desires to commence the data call, the client modem would commence a quick reconnect handshaking protocol (described below). On the other hand, if the user wants to terminate the first call, then a clear down message may be sent (alternatively, the periodic hold signal may end).

The quick reconnect handshake causes the modem devices to recall the saved parameters and attributes of the "held" channel and the saved operating parameters associated with the modem devices, as described briefly above in connection with previous channel parameters 342 and 382. With this technique, the modem system can be reconnected in a matter of seconds. Thus, the data mode user will not suffer the long reconnect penalty after handling an incoming call waiting or caller identification signal. The data mode user, using call waiting in this fashion, would be capable of accepting intermittent interruptions without noticeable delays associated with the modem connection.

This feature may be utilized to simulate an "always connected" mode with conventional PPP modem connections. For example, pertinent channel compensation information may be periodically saved for a given connection between a client modem and a server modem. The client user may answer incoming second line calls while pausing the data mode as described above. In addition, the data mode may be gracefully terminated if the client user initiates an outgoing voice call. After the voice call terminates, the client modem may re-dial or otherwise re-contact the server modem and establish a quick connection using the stored parameters.

Figure 6:
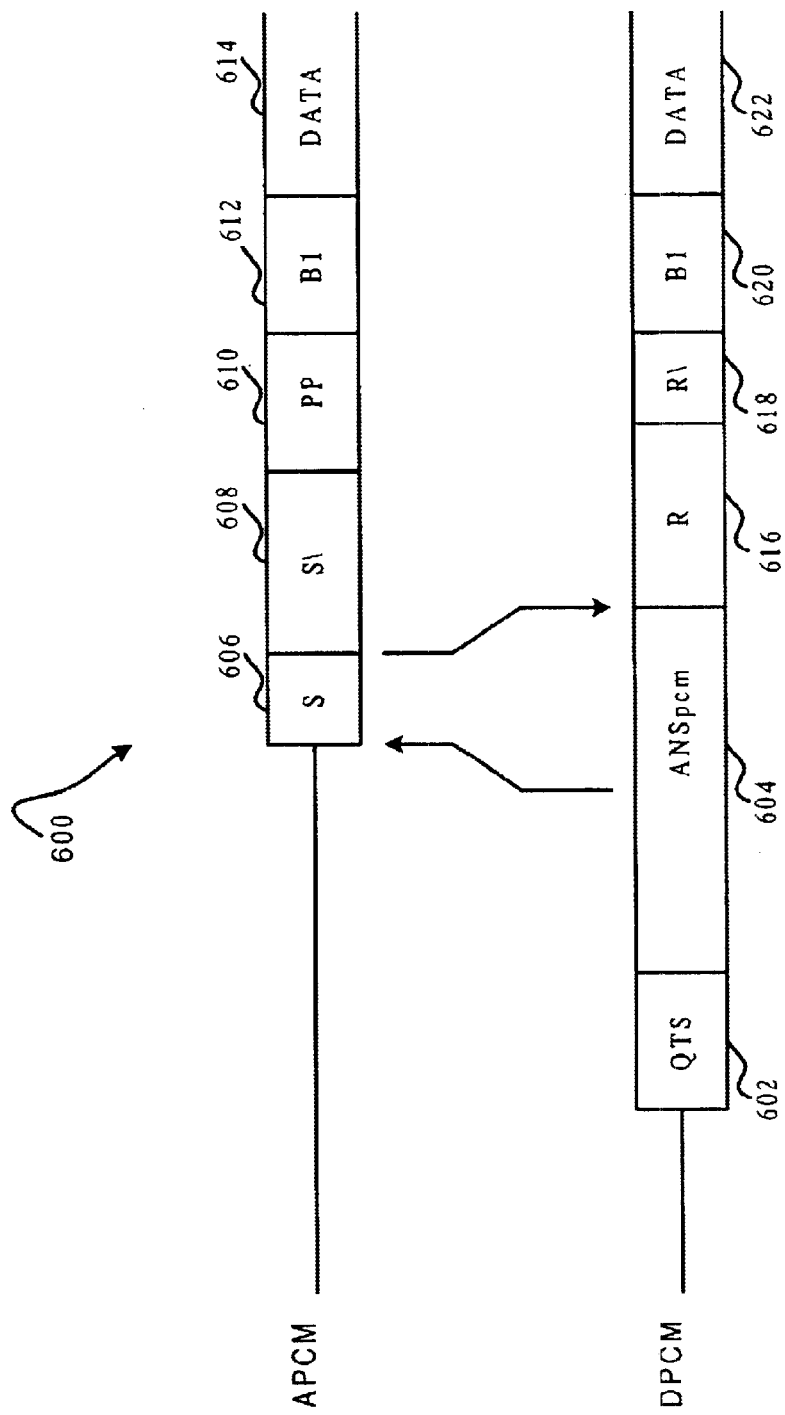
FIG. 6 is a timing diagram corresponding to a quick reconnect process performed by two modem devices.
Figure 7:
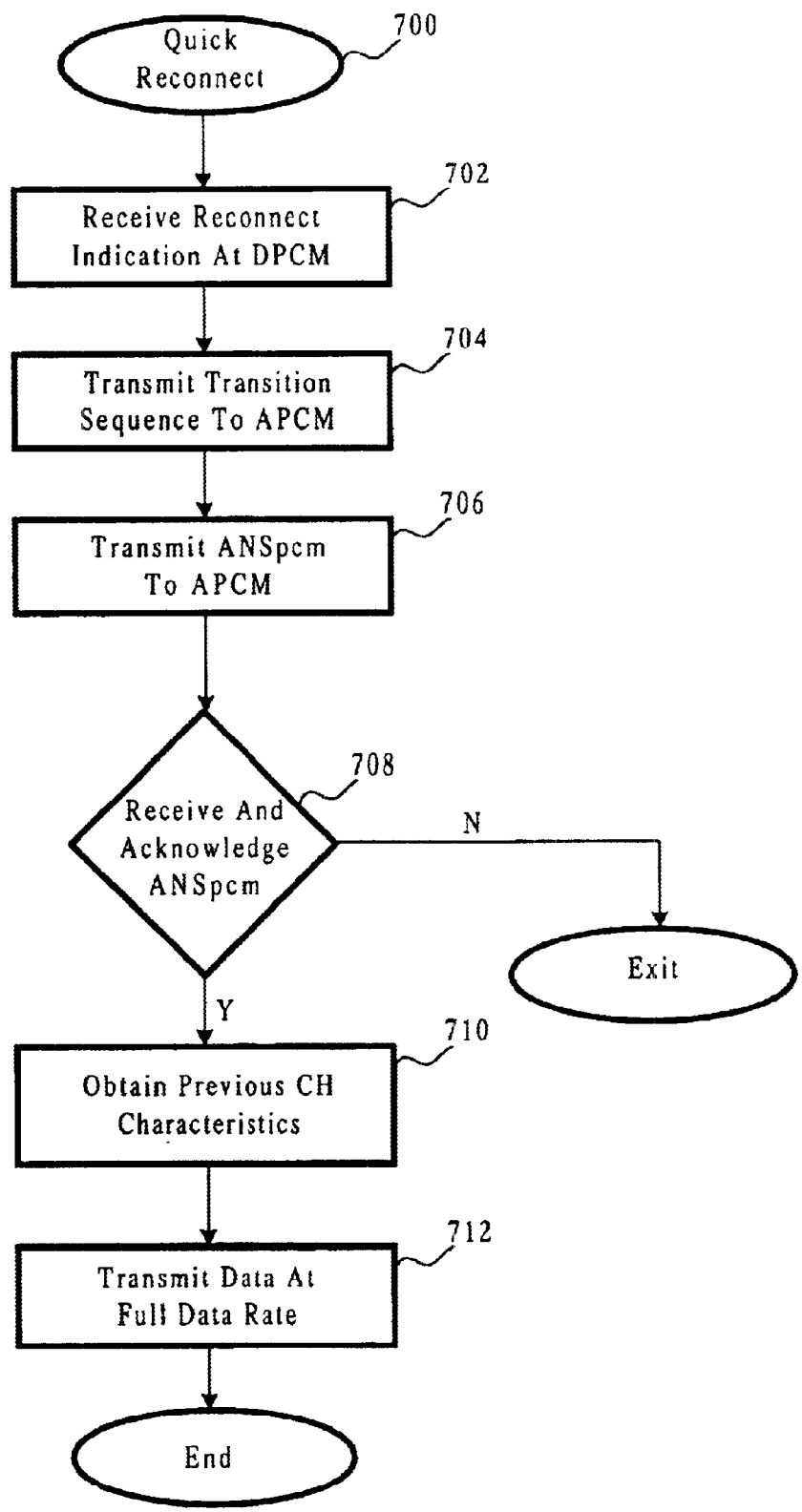
FIG. 7 is a flow diagram illustrating a quick reconnect process performed by two modem devices.

FIG. 7 is a flow diagram illustrating portions of a quick reconnect process 700 performed by two modem devices, and FIG. 6 is a timing diagram 600 corresponding to an illustrative quick reconnect process performed by two modem devices. Timing diagram 600 may include acronyms and abbreviations that are often used in the context of conventional data communication protocols. The use of such terminology herein is intended to illustrate the concepts of the present invention in the context of one practical embodiment. However, the present invention may be employed in any suitable context, and the specific signals, number of sequences, timing of the sequences, data rates, and interaction between the two modem devices shown in FIG. 6 are not intended to limit the scope of the invention in any way.

Quick reconnect process 700 may be performed by a modem system after such modem system has established a communication session and, typically, after the modem system has entered a full-rate data mode. For purposes of this description, it may be assumed that the modem system is configured as described above (or is configured in an appropriate manner to support the various process tasks described below). It may be assumed that the two modem devices that perform process 700 are compatible with the quick reconnect techniques described herein. Thus, process 700 need not perform any verification or signaling to determine whether the quick reconnect procedure can be carried out.

Although not a requirement of quick reconnect process 700, the modem system may have been initialized in accordance with the quick startup techniques set forth above. Accordingly, process 700 assumes that both modem devices have stored any number of appropriate channel characteristics, receiver parameters, and other information relevant to the initialization, training, and synchronization of the modem system. As described above, such information may be suitably saved during a startup procedure or periodically during a suitable data mode. Process 700 may be utilized to enable the current modem connection to be quickly re-established following a temporary pause in the modem data mode or any interrupting event. In this context, a practical system can maintain a communication link or connection between the modem devices while allowing a user of the client modem device to temporarily pause the modem connection (or the modem data communication mode). During the temporary holding period, the user may be able to answer another incoming call in response to a call waiting signal, initiate a new outgoing call, or the like, while the client side modem device idles.

Quick reconnect process 700 may begin with a task 702, during which a reconnect indication is received by the DPCM (e.g., modem 302 shown in FIG. 3). The reconnect indication may be generated in response to a request (e.g., a user-initiated request) to terminate a temporary pause in the modem communication session. For example, a suitable reconnect signal may be generated by the APCM (e.g., modem 304) in response to a hook flash initiated by the user of the APCM or in response to an instruction generated by application software associated with the APCM. Alternatively, the APCM or a data access arrangement (DAA) associated with the APCM may generate a reconnect signal in response to a change in line current related to the on-hook status of telephone set. Such line-in-use detection techniques are generally known to those skilled in the art. The reconnect indication informs the DPCM that the user desires to re-establish the current modem connection, which has been placed on temporary hold. In a practical embodiment, the DPCM receives the reconnect indication and initiates a task 704 in response to the reconnect indication.

During task 704, the DPCM transmits a suitable reply signal that preferably informs the APCM that the quick reconnect procedure is supported. In the illustrative embodiment described herein, such a reply signal may include a suitable transition sequence as described above. Accordingly, quick reconnect process may perform a task 704, which may be similar to task 414 described above in connection with FIG. 4. For example, task 704 may cause the DPCM to transmit the QTS signal to enable the APCM to again determine the timing phase of the DPCM (the QTS signal is identified by reference number 602 in FIG. 6). In addition, the retransmission of the QTS signal enables the APCM to obtain RBS characteristics of the data communication network (if necessary or desirable to do so).

It should be noted that, for many practical modem connections, the network connection (and the associated effects of digital pads and RBS) will remain consistent during the modem hold period. Of course, there may be some situations where the network connection is cleared down during the modem hold period to conserve network resources. In such situations, particularly if the same network connection is not re-established, the digital impairment profile of the network may not remain consistent. Furthermore, even if the network characteristics do not change, the APCM may lose its RBS synchronization if the modem connection is put on hold (particularly if the APCM does not receive a signal from the DPCM during the holding period). In this respect, even if the APCM can properly resynchronize itself to the network clock after a holding period, the specific RBS phases may still be unknown. Accordingly, quick reconnect process 700 is preferably arranged to contemplate that the network connection and the RBS timing has changed.

The reply signal may also include a suitable signal point sequence that follows the transition sequence. Accordingly, following task 704, the DPCM may perform a task 706 to suitably transmit a signal point sequence to the APCM. As described above in connection with task 416, the signal point sequence may be considered to be a modified answer tone, e.g., the ANSpcm signal (identified by reference number 604 in FIG. 6). The ANSpcm signal 604 may be configured as described above, e.g., the ANSpcm signal 604 may be suitably formatted to enable the APCM to determine or identify the characteristics of the current communication channel or network, particularly digital pads and/or other digital impairments. The ANSpcm signal 604 is also configured to provide a tone suitable for disabling the network echo cancelers and disabling the network echo suppressors.

In a practical embodiment, the APCM anticipates the transmission of the ANSpcm signal 604. For example, the APCM may be configured to condition its receiver to receive the ANSpcm signal 604 after it transmits the reconnect indication to the DPCM. Accordingly, quick reconnect process 700 may include a query task 708, which preferably determines whether the ANSpcm signal 604 has been received by the APCM and/or whether the DPCM receives a suitable acknowledgment that the APCM received the ANSpcm signal 604. If not, then process 700 may exit and the modem system may proceed with a traditional reconnection routine. If query task 708 determines that the ANSpcm signal 706 was properly received, then the APCM may process the received signal as described above to enable the APCM to determine the digital impairments associated with the re-established channel.

A task 710 is preferably performed to cause both modem devices to recall and obtain the characteristics and parameters associated with the previous channel connection, i.e., the channel before the modem connection was placed on temporary hold. Task 710 may cause the DPCM to access previous channel information 342 and may cause the APCM to access previous channel information 384. As described above, this information may include one or more parameters related to: the current channel conditions (as previously determined), any number of settings associated with the modem receivers, characteristics of the communication network, or the like. Task 710 enables the modem system to quickly retrieve these stored parameters and reset the modem devices in an appropriate manner in lieu of an independent reassessment of the channel and in lieu of a full retraining process. Task 710 may be performed by the DPCM once it receives the reconnect identifier from the APCM, while task 710 may be performed by the APCM before it receives the ANSpcm signal 604. If task 710 is performed by the APCM, the APCM equalizers are initialized according to the previous channel information 384 such that the ANSpcm signal 604 can be properly received and analyzed.

The DPCM may reacquire its timing synchronization in accordance with any number of techniques, such as the conventional V.34 half-duplex primary channel resynchronization procedure set forth in ITU-T Recommendation V.34 (International Telecommunication Union, September 1994), which is incorporated by reference herein. In other words, as shown in FIG. 6, the APCM may be configured to transmit a PP signal 610 to enable the DPCM receiver to synchronize its timing recovery and carrier recovery. The S and S\ preamble signals (reference numbers 606 and 608, respectively) may be used to initialize an automatic gain control element or the like. The B1 signal 612 may be considered to be a preamble sequence that may be employed to initialize the DPCM scrambler, trellis coder, and the like. These signals and sequences are set forth in detail in the V.34 Recommendation and will not be described in detail herein.

Concurrently, the DPCM may transmit an R signal 616 followed by an R\ signal 618 and a B1 signal 620. These sequences also serve as suitable preamble sequences that enable the APCM to prepare for the data mode. These signals and sequences are set forth in detail in the V.90 Recommendation and will not be described in detail herein.

In response to the resynchronization sequences, the modem system enters the data mode and the system can begin transmitting data at the full data rate (task 712). In other words, the data transmission mode is re-established without completely clearing down the previous connection. The data mode is identified by sequences 614 and 620 in FIG. 6. Notably, in contrast to quick startup process 400, quick reconnect process 700 need not perform a comparison of the channel characteristics (see task 420), an initial training procedure (see task 422), an error correction and data compression procedure (see task 424), a final training procedure (see task 428), an authentication exchange (see task 428), or an exchange of constellation and modem parameters (see task 430). With respect to the PAP/CHAP authentication information, the modem system may be suitably configured to maintain the PPP/TCP/IP protocol layer during the hold period such that the PPP authentication data need not be retransmitted. Accordingly, the modem system may re-establish its modem connection without wasting time performing several traditional initialization tasks. In a typical practical system, the quick reconnect process can be employed to reestablish the data mode in less than 1.5 seconds.

An alternate version of the quick reconnect procedure may employ a timing diagram similar to timing diagram 500 (see FIG. 5). However, in such an embodiment, several of the signal segments described above in connection with timing diagram 500 can be reduced in length, thus reducing the conventional reconnect time. For example, the various TRN training sequences and the parameter exchange signals may be shortened considerably because they need not convey essential information. For practical implementation reasons, it may be desirable to keep the general sequence structure intact in this manner (instead of eliminating segments from timing diagram 500). Indeed, from a software implementation standpoint, segment lengths can be adjusted in a relatively straightforward manner, while the removal of entire segments from an existing protocol may be a time consuming and arduous task. Although the reconnect time for such an alternate embodiment may be longer than that described above in connection with timing diagram 600 (e.g., up to 2.5 seconds), it is still significantly less than the time required to perform a conventional reinitialization procedure.

As mentioned previously, call waiting and related telephony features can be troublesome when the line is being used for a modem connection. In response to a call waiting alert signal, the modem connection is often disrupted without the modem devices being aware of the cause of the disruption. The call waiting alert signal may cause the modem devices to disconnect or to enter a lengthy retraining mode. Furthermore, in many scenarios the consumer is unable to take advantage of the call waiting service itself. Generally, the present invention addresses this problem in the following ways: (1) by allowing either modem device to request an immediate clear down in response to a call waiting alert; (2) by allowing a first modem device to request the second modem device to go on-hold, and allowing the second modem device to grant or deny the request; and (3) by allowing either modem device to request a quick reconnect procedure (as described above). With this signaling technique in place, the modem connection can either be cleared down, put on hold, or quickly reconnected in response to an alert signal, e.g., a call waiting alert. Similarly, if the modem connection is put on-hold, then the same signaling mechanism can be employed to reconnect the modem session after the holding period.

Assuming that both end devices (e.g., the DPCM and the APCM in a V.90 system) are compatible with the modem-on-hold feature, an appropriate signaling scheme is utilized to enable the end devices to switch operating modes as necessary. Although the signaling scheme and various processes are described herein in the context of a modem system having an APCM at the client end and a DPCM at the server or central site end, the present invention is not so limited. For example, the techniques described herein may be equivalently applied in the context of a communication session between two client modem devices or in the context of a V.34 modem system.

Figure 16:
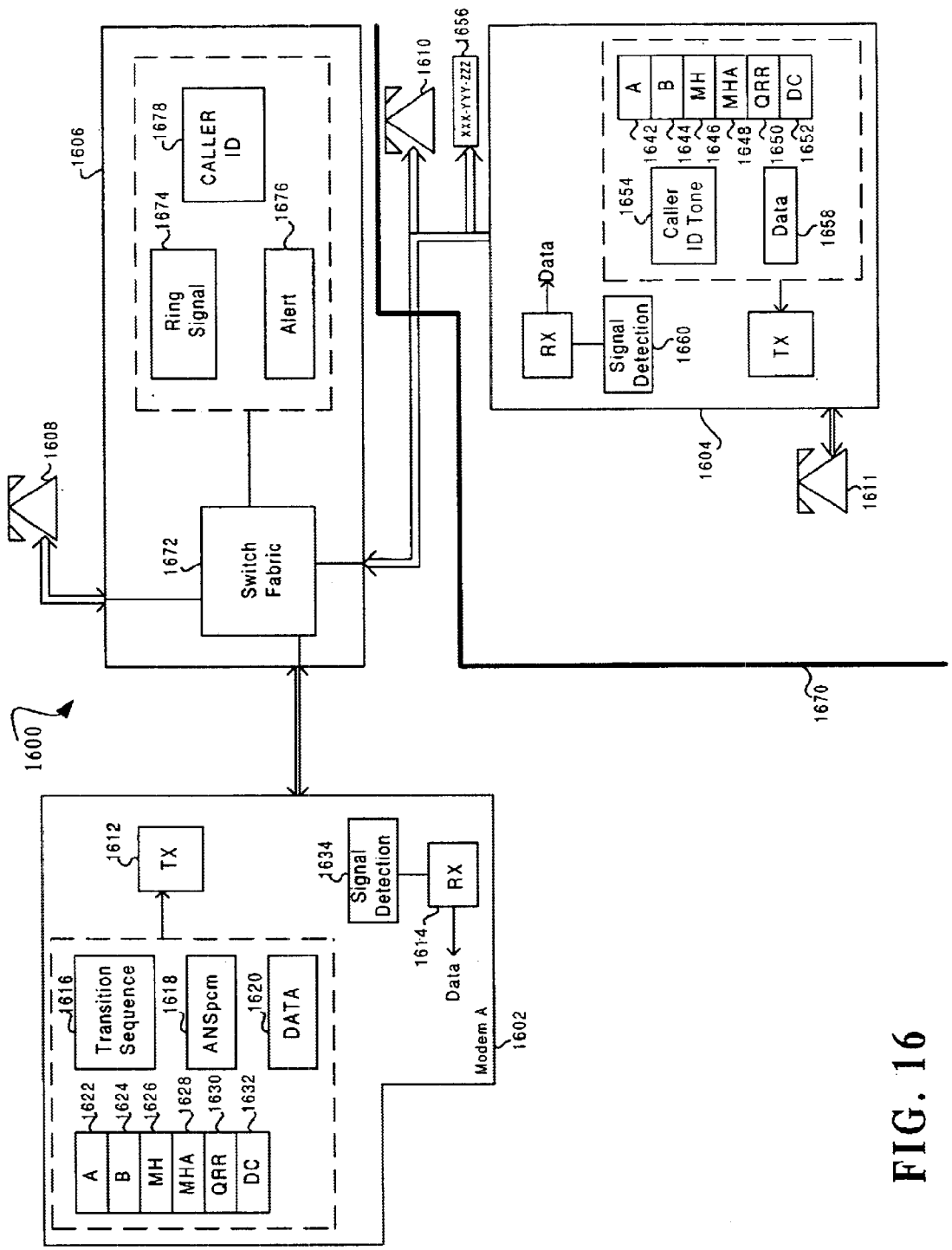
FIG. 16 is a block diagram of a modem system environment in which various aspects of the present invention may be incorporated.

FIG. 16 is a schematic representation of an exemplary environment in which a modem system 1600 may operate. Modem system 1600 generally includes a first modem device 1602, which may be associated with a central site, and a second modem device 1604, which may be resident at a customer site 1670. In the context of a typical V.90 system, first modem device 1602 may be the DPCM and second modem device 1604 may be the APCM. DPCM 1602 is coupled to a central office 1606 via a digital link and APCM 1604 is coupled to central office 1606 via an analog link, e.g., the local loop. It should be appreciated that modem system 1600 may include additional elements and functionality associated with the quick startup routine and/or the quick reconnect procedure described above.

FIG. 16 also depicts a calling device 1608 (which is capable of placing an incoming call to the customer site), a parallel answer device 1610 located at the customer site, and a series answer device 1611 located at the customer site. As shown in FIG. 16, parallel answer device 1610 is connected such that it receives the same calls as APCM 1604 in a concurrent manner. In contrast, series answer device 1611 is connected such that APCM 1604 routes calls to it; APCM 1604 may control or regulate the call traffic to and from series answer device 1611 in a conventional manner. A call may be established between calling device 1608 and answer devices 1610 and 1611 via central office 1606, and a modem connection may be established between DPCM 1602 and APCM 1604 via central office 1606.

Generally, the modem system is configured to support a signaling mechanism that responds to call waiting and other situations that may call for an interruption in the modem connection. For example, APCM 1604 may transmit a suitably formatted signal to initiate a modem-on-hold state, DPCM 1602 may transmit a different signal to acknowledge the modem-on-hold request, APCM 1604 may transmit yet another signal to request that a quick reconnect procedure (as described above) be initiated, and either modem device may transmit a signal that represents a clear down request. For the sake of clarity and brevity, FIG. 16 depicts APCM 1604 and DPCM 1602 in a manner that relates to the example processes described herein. In practical embodiments, each of the modem devices may be capable of functioning as a transmit or receive modem, and each of the modem devices may be capable of originating the various signals described herein.

DPCM 1602 includes a transmitter section 1612 and a receiver section 1614, both of which may be configured in accordance with conventional technologies and in accordance with the above description of modem system 300 (see FIG. 3). DPCM 1602 is capable of transmitting a number of signals, sequences, and tones during initialization procedures, the data mode, the hold mode, and transition modes. As described above, DPCM 1602 may be configured to transmit a suitable transition sequence 1616 and a characteristic signal point sequence (such as the ANSpcm signal 1618) associated with a quick startup routine or a quick reconnect procedure. During the data mode, DPCM 1602 transmits data 1620 in accordance with a suitable data transmission scheme.

DPCM 1602 is also capable of transmitting a number of signals that may be received by APCM 1604 and/or by central office 1606. For example, DPCM 1602 is capable of transmitting an "A" tone 1622 and a "B" tone 1624 as described herein. In one practical embodiment, "A" tone 1622 is a 2400 Hz tone and "B" tone 1624 is a 1200 Hz tone (as set forth in ITU-T Recommendation V.34). Of course, the modem devices may generate and process any suitable tones or signals in lieu of (or in addition to) these predefined tones. DPCM 1602 is also configured to transmit a number of additional signals associated with the initiating of a modem-on-hold mode, the reconnection of a modem session after a holding period, and the clearing down of a modem connection. For example, DPCM 1602 may be capable of transmitting a modem hold request 1626, a modem hold acknowledgment 1628, a quick reconnect request 1630, and a disconnect signal 1632 (referred to herein as "modem status signals"). The format and function of these signals are described in more detail below.

DPCM 1602 may also include a signal detection element 1634, which may employ any number of known techniques to detect, analyze, and interpret control signals, requests, and tones transmitted by APCM 1604 and/or by central office 1606. For example, signal detection element 1634 may utilize a conventional tone detector and/or a conventional V.34 or V.90 differential phase-shift keying (DPSK) receiver configured to detect and distinguish the different signals described herein.

For purposes of the signaling scheme described herein, APCM 1604 is preferably configured in a manner similar to DPCM 1602. In other words, APCM 1604 is capable of transmitting an "A" tone 1642, a "B" tone 1644, a modem hold request 1646, a modem hold acknowledgment 1648, a quick reconnect request 1650, and a disconnect signal 1652. In addition, APCM 1604 may be configured to generate a caller ID tone 1654 that informs central office 1606 that the customer site supports a caller ID feature (as depicted by the caller ID component 1656). In accordance with current standards, caller ID tone 1654 is a DTMF "D" tone having a length of approximately 55–65 milliseconds. Of course, APCM 1604 transmits data 1658 during the data mode.

As described above in connection with DPCM 1602, APCM 1604 preferably includes a signaling detection element 1660 that enables APCM 1604 to receive, detect, and analyze the various signaling tones and sequences transmitted by DPCM 1602. In this manner, both APCM 1604 and DPCM 1602 are capable of receiving the signals and are capable of switching operating modes in response to the particular signal or signals that are received.

Central office 1606 is configured in a conventional manner to perform circuit switching associated with modem, voice, and facsimile calls. Central office 1606 may support any number of customer sites and central office 1606 may be operatively coupled to any number of other central offices, central site modems, or the like. As described briefly above, APCM 1604, answer device 1610, and caller ID component 1656 may reside at customer site 1670. Accordingly, APCM 1604, answer device 1610, and caller ID component 1656 are all supported by central office 1606.

Central office 1606 includes a suitable switching fabric 1672 for routing calls between the appropriate parties. For example, switching fabric 1672 may switch to a first state to establish a modem connection between DPCM 1602 and APCM 1604 and to a second state to establish a voice connection between calling device 1608 and answer device 1610. Furthermore, switch fabric 1672 may be capable of temporarily interrupting a connection to impress control signals, data, or tones onto the current circuit or line. In this respect, central office 1606 may transmit a number of ring signals 1674, alert signals 1676, caller ID data 1678, and other information depending upon the particular situation. For example, in accordance with current methodologies, central office 1606 may temporarily interrupt a voice call and transmit a call waiting alert signal 1676 to the customer site 1670. If the customer accepts the incoming call, then switch fabric 1672 may be reconfigured to route the incoming call the customer site 1670 while the original call is placed on hold. As described in more detail below, a similar routine may be employed to place modem calls on hold.

As mentioned previously, the signaling scheme preferably employs Phase 2 signaling tones that are also used by conventional V.34 and V.90 modem systems. In addition, the signaling scheme uses DPSK transmission techniques, which allows the signaling to integrate in a seamless manner with V.34 and V.90 retraining procedures. The signals are configured such that they can be detected by either a V.34/V.90 DPSK receiver or by a relatively simple tone detector. In one practical embodiment, modem hold requests, modem hold acknowledgments, quick reconnect requests, and disconnect signals are preceded by a period (e.g., at least 50 milliseconds) of either tone A or tone B. This technique leverages the use of the A and B tones, which are employed by conventional V.34 and V.90 modem systems, and takes advantage of the modulation scheme that is already in use by the modem system. Thus, because DPCM 1602 will typically be conditioned to receive DPSK signals, the signaling mechanism is easy to implement.

The modem status signals that follow the A or B tones are preferably transmitted as DPSK signals based on a repeated bit pattern. In the preferred embodiment, a modem status signal is a DPSK signal associated with eight repetitions of a four-bit pattern, where different patterns correspond to different modem status signals. The use of a four-bit pattern is desirable to enable the use of a simple tone detector for signaling detection elements 1634 and 1660; shorter bit patterns result in a fewer number of frequency components associated with the DPSK signal. Consequently, the signal detection scheme need not employ a complex processing routine that analyzes a large number of frequencies for spectral content. Illustrative bit patterns for the different modem status signals are set forth in Table 3 below.

TABLE 3

Modem Status Signals

| Modem Status Signal | Signal Abbreviation | DPSK Pattern |
|---|---|---|
| Disconnect Signal | DC | 0101 |
| Modem Hold Request | MH | 0011 |
| Modem Hold Acknowledge | MHA | 0001 |
| Quick Reconnect Request | QRR | 0111 |

The particular bit patterns are preferably selected such that the resultant DPSK signal is distinguishable over DPSK signals that are "reserved" for use in the context of other data communication protocols. For example, a DPSK pattern of all zeros is equivalent to the A or B tones, and a DPSK pattern of all ones is equivalent to the V.34 INFOMARK signal. In addition, the particular bit patterns may be suitably selected such that the resultant DPSK signal is easy to detect by a tone detector. For the example bit patterns set forth in Table 3, the modem status signals will have the frequency content listed in Tables 4 and 5 below, where the frequencies are in Hertz, an "X" indicates spectral content greater than a threshold level, and a slash indicates spectral content that is lower than the threshold level. For the example DPSK bit patterns shown in Table 3, a lower spectral energy component is at least 8 dB down from a higher spectral energy component at the same frequency. Consequently, the different modem status signals can be distinguished notwithstanding the existence of some shared frequency components.

TABLE 4

Frequency Components for Modem Status Signals (APCM)

|  | 900 | 975 | 1050 | 1125 | 1200 | 1275 | 1350 | 1425 | 1500 |
|---|---|---|---|---|---|---|---|---|---|
| DC |  |  | X |  |  |  | X |  |  |
| MH | X |  | X |  | X |  | X |  | X |
| MHA |  | — |  | X |  | X |  | — |  |
| QRR |  | X |  | — |  | — |  | X |  |

TABLE 5

Frequency Components for Modem Status Signals (DPCM)

| | 2100 | 2175 | 2250 | 2325 | 2400 | 2475 | 2550 | 2625 | 2700 |
|---|---|---|---|---|---|---|---|---|---|
| DC |  |  | X |  |  | X |  |  |  |
| MH | X |  | X | X |  | X |  | X |  |
| MHA |  | — |  | X | X |  |  | — |  |
| QRR |  | X |  | — | — |  |  |  | X |

The different frequency ranges employed by the APCM and DPCM are related to an exemplary application where different carriers are used by the two modem devices. For example, in a conventional V.90 system, the DPCM uses signaling near 2400 Hz (tone "B" and the DPSK carrier), while the APCM uses signaling near 1200 Hz. This feature was derived from the conventional V.34 scheme where the calling modem uses signaling near 1200 Hz and the answer modem uses signaling near 2400 Hz. Consequently, the two spectral patterns are the same but for the shift between 1200 Hz and 2400 Hz. This methodology ensures that the end devices can properly detect the signals even where both ends are transmitting the same type of signal.

In a practical system, the modem status signal detection need not detect the entire "spectral fingerprint" for the given signals. Rather, signal detection elements 1634 and 1660 may be configured to detect and analyze a distinctive number of the spectral components for purposes of indicating a match. For example, as shown in Table 4, if a signal contains relatively high spectral energy at 1050 Hz and 1350 Hz, then the signal may be a disconnect signal or a modem hold request. Accordingly, the signal detection routine will continue to analyze the signal for spectral content at 900 Hz, 1200 Hz, and/or 1500 Hz and make the appropriate decision.

Figure 8:
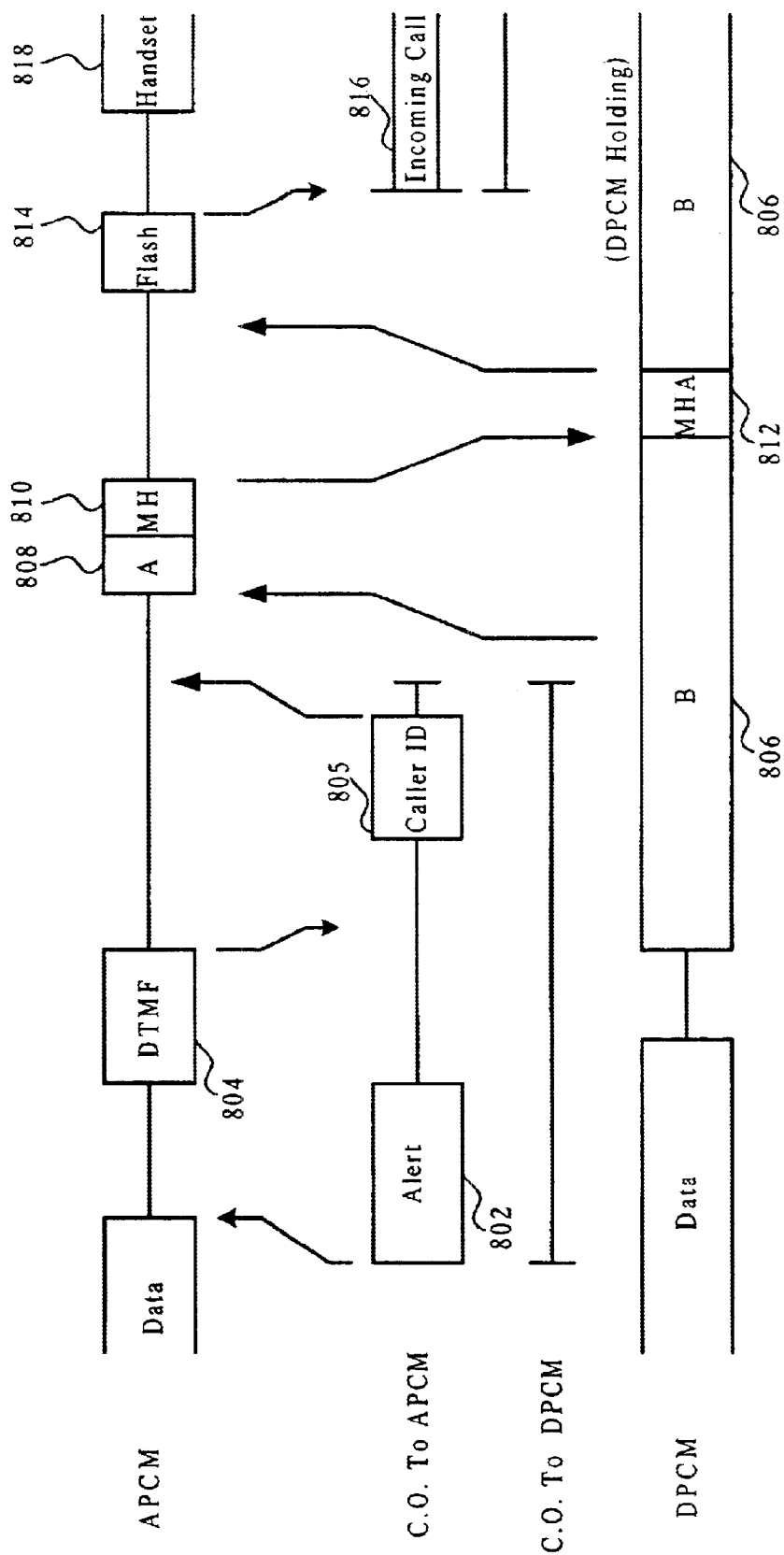
FIGS. 8–15 are timing diagrams corresponding to different modem-on-hold, reconnect, and clear down situations.

FIG. 8 is a timing diagram that depicts the situation where a current modem connection is interrupted by a call waiting indication and the modem connection is placed on hold while the incoming call is answered by the client end. FIG. 8 is applicable regardless of whether customer site 1670 employs parallel answer device 1610 or series answer device 1611. The progression of signals, sequences, tones, commands, and the like are shown with respect to an APCM, a DPCM, and a central office (the central office may be associated with signals to the APCM and signals to the DPCM). For convenience, the process associated with FIG. 8 is described herein in the context of modem system 1600.

During the data mode, central office 1606 temporarily interrupts the modem connection and sends an alert signal 802 to APCM 1604. The alert signal may be a conventional call waiting alert and it may include a component that is audible to humans (e.g., an audio tone) and a component that is detectable by data communication devices or machines. In accordance with most call waiting protocols, the alert signal components are transmitted in series. In response to alert signal 802, APCM 1604 may send a DTMF tone 804 to request caller ID information from central office 1606. As described above, tone 804 may be a short burst of a DTMF "D" tone having a duration of about 55–65 milliseconds. Assuming that central office 1606 receives and recognizes DTMF tone 804, it will format and transmit the caller ID data 805 back to the customer site 1670. As shown in FIG. 16, the caller ID data 805 (represented by reference number 1678 in FIG. 16) may be received and processed in a suitable manner for display or analysis by caller ID component 1656.

In response to the switching out of APCM 1604 by central office 1606, DPCM 1602 begins a retrain procedure by transmitting an appropriate signal, e.g., a "B" tone 806. In a practical application, the "B" tone 806 is usually transmitted while the caller ID request 804 and caller ID data 805 is being received, processed, and transmitted by central office 1606. The "B" tone 806 is continuously transmitted while DPCM 1602 waits for APCM 1604 to reply with an "A" tone 808. APCM 1604 may transmit the "A" tone 808 if it receives the "B" tone 806 from DPCM 1604. As mentioned above, the "A" tone 808 is preferably transmitted for at least a minimum duration, e.g., 50 milliseconds, to give DPCM 1602 the opportunity to receive it. If DPCM 1602 does not receive an "A" tone 808 within a specific time period, then it may eventually disconnect itself.

Assuming that the user of APCM 1604 desires to answer the incoming call, then a modem hold request 810 is transmitted following the "A" tone 808. Modem hold request 810 may be prompted automatically by a suitable device resident at the customer site 1670 or it may be prompted in response to a user command. Modem hold request 810, which may be formatted as described above, is preferably transmitted for at least a minimum period of time. In one practical embodiment, modem hold request 810 is transmitted for approximately 53 milliseconds (all of the modem status signals described herein may have a similar minimum duration). In contrast to a conventional V.34 or V.90 modem system, an actual retraining procedure is not performed upon receipt of the "A" tone 808 by DPCM 1602. Rather, in response to modem hold request 810, DPCM 1602 may transmit a modem hold acknowledgment 812 for a minimum period of time, e.g., approximately 53 milliseconds.

After DPCM 1602 transmits modem hold acknowledgment 812, it preferably continues to transmit the "B" tone 806 while it maintains a hold state. In response to modem hold acknowledgment 812, APCM 1604 may generate a suitable flash signal 814 to instruct central office 1606 to switch out the modem connection and to switch in the incoming call 816. In addition, the handset (or other suitable answer device) begins to receive the incoming call; APCM 1604 may be configured to route the incoming signal to parallel answer device 1610 or serial answer device 1611 in an appropriate manner. In addition, APCM 1604 may be placed in an idle or "on-hook" state while the handset is connected (during period 818). Accordingly, the user at customer site 1670 may proceed with the incoming call 816 while DPCM 1602 remains on hold. The modem connection may be re-established by way of a quick modem reconnect procedure (described below).

Figure 9:
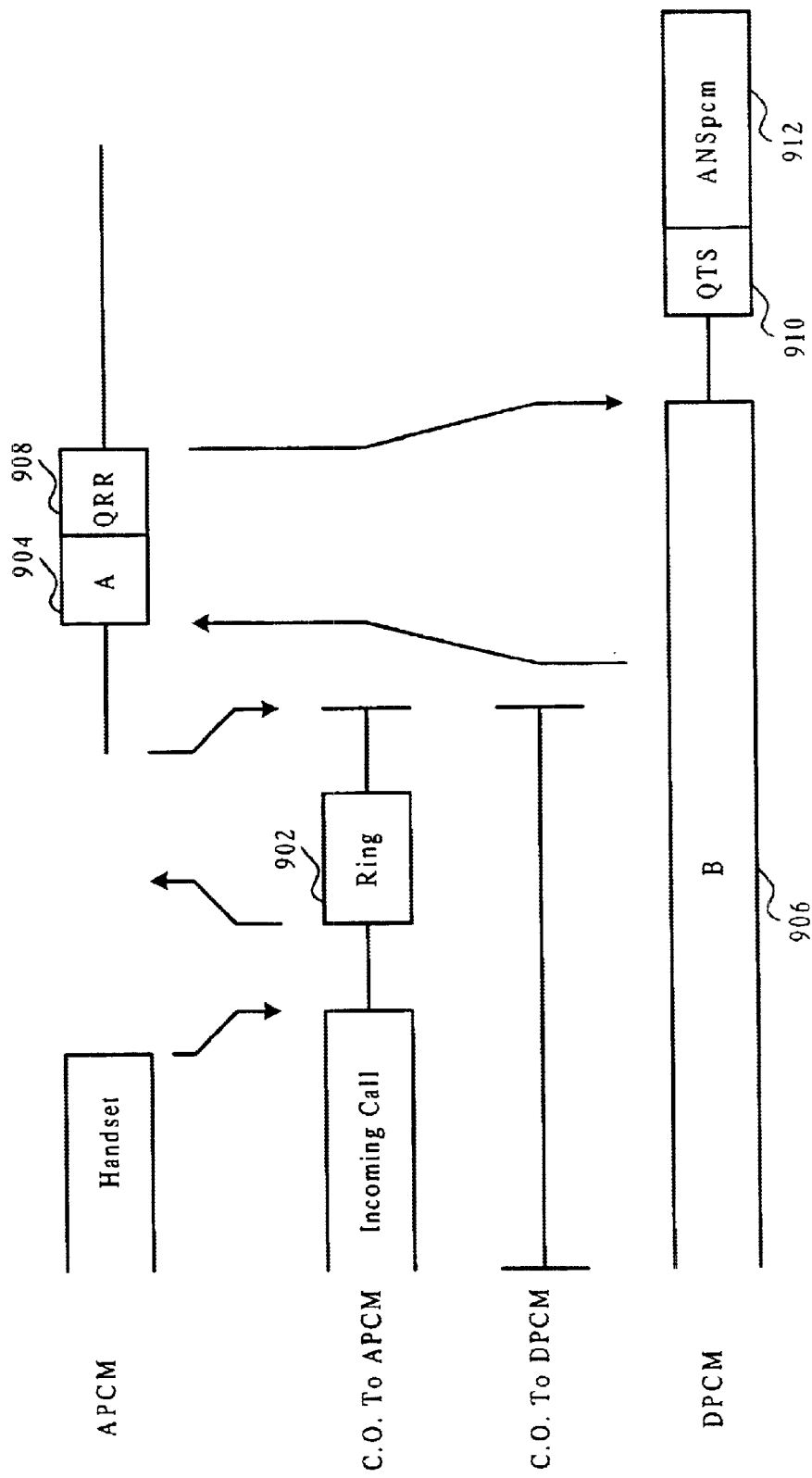

FIG. 9 is a timing diagram that depicts a situation where DPCM 1602 is to be reconnected in response to the termination of the incoming call. The process shown in FIG. 9 assumes that: (1) DPCM 1602 is in a hold state; (2) answer device 1610 is connected in parallel with APCM 1604; and (3) answer device 1610 terminates the incoming call, e.g., answer device 1610 is placed "on-hook" before calling device 1608 is placed "on-hook". For purposes of this description, the parallel connection means that APCM 1604 and answer device 1610 receive the same signals from central office 1606 in a concurrent manner.

In response to the termination of the incoming call, central office 1606 will detect the "hang up" in a conventional manner, e.g., using well known line detection techniques. Eventually, central office 1606 switches out or disconnects the incoming call, switches in DPCM 1602, and generates a suitable signal, e.g., a ring signal 902. Ring signal 902 serves to alert the user at customer site 1670 that the original call is still holding and is ready to be reconnected. In response to ring signal 902, APCM 1604 is placed "off-hook" such that it can again receive signals from central office 1606. Thus, ring signal 902 may inform APCM 1604 that the incoming call has been cleared and/or that APCM 1604 may proceed with a modem reconnect procedure. As described above in connection with FIG. 8, APCM 1604 generates an "A" tone 904 (for at least 50 milliseconds) in response to the detection of a "B" tone 906. Following the "A" tone 904, APCM 1604 may transmit a quick reconnect request 908 to initiate a quick reconnect procedure (as described above in the context of FIGS. 6 and 7. Accordingly, in response to the detection of quick reconnect request 908, DPCM 1602 preferably transmits a QTS signal 910 followed by an ANSpcm sequence 912. The characteristics, format, and function of QTS signal 910 and ANSpcm sequence 912 are as described above. Assuming that both modem devices support the quick reconnect feature described above, the held modem connection may be re-established in a relatively short period of time.

Figure 10:
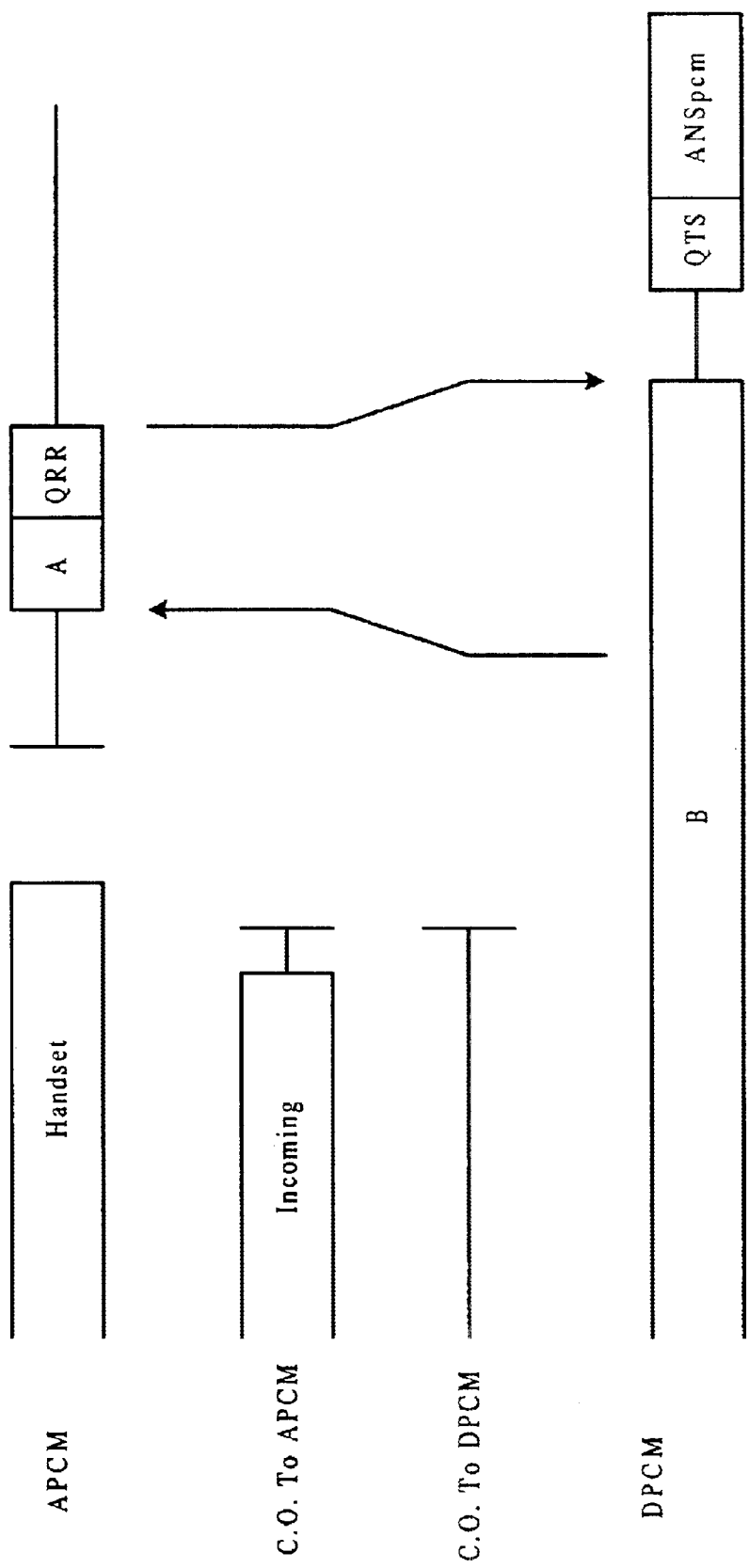

FIG. 10 is a timing diagram that depicts the situation where the incoming call is terminated before parallel answer device 1610 is placed "on-hook". In this scenario, when the termination of the incoming call is initiated by the calling device 1608, central office 1606 will reconnect the customer site 1670 to the original call (which is a modem connection in this example). Consequently, the "B" tone transmitted by DPCM 1602 will again be made available at APCM 1604. Regardless of whether APCM 1604 is currently in an "on-hook" or an "off-hook" state, it preferably detects that DPCM 1602 has been reconnected. It should be appreciated that APCM 1604 may employ any number of known techniques (which can vary depending upon the specific implementation) to detect the reconnection. For example, DPCM 1602 may detect the "B" tone from DPCM 1602, it may automatically react after a predetermined timeout period, or it may utilize line-in-use techniques to sense the termination of the incoming call. Once the two modem devices have resumed communicating with one another, the quick reconnect routine proceeds as described above in connection with FIG. 9.

With respect to the situation depicted in FIG. 10, it may be necessary to have APCM 1604 respond within certain time periods to ensure that central office 1606 does not consider the reconnect attempt to be a hook flash or a disconnect. For example, in a preferred embodiment, APCM 1604 is configured to respond to the termination of the incoming call within 200 milliseconds such that central office 1606 does not interpret the delay as a conference call request (which may cause DPCM 1602 to be placed on hold) or a disconnection (which may cause a clear down of the connection). The particular time periods may be selected in accordance with any suitable telecommunication recommendation, standard, or operating protocol, such as the BELLCORE Technical Reference GR-506-CORE (related to general telecommunication signaling) and the BELLCORE Technical Reference TR-NWT-000575. The contents of these references is incorporated by reference herein.

Figure 11:
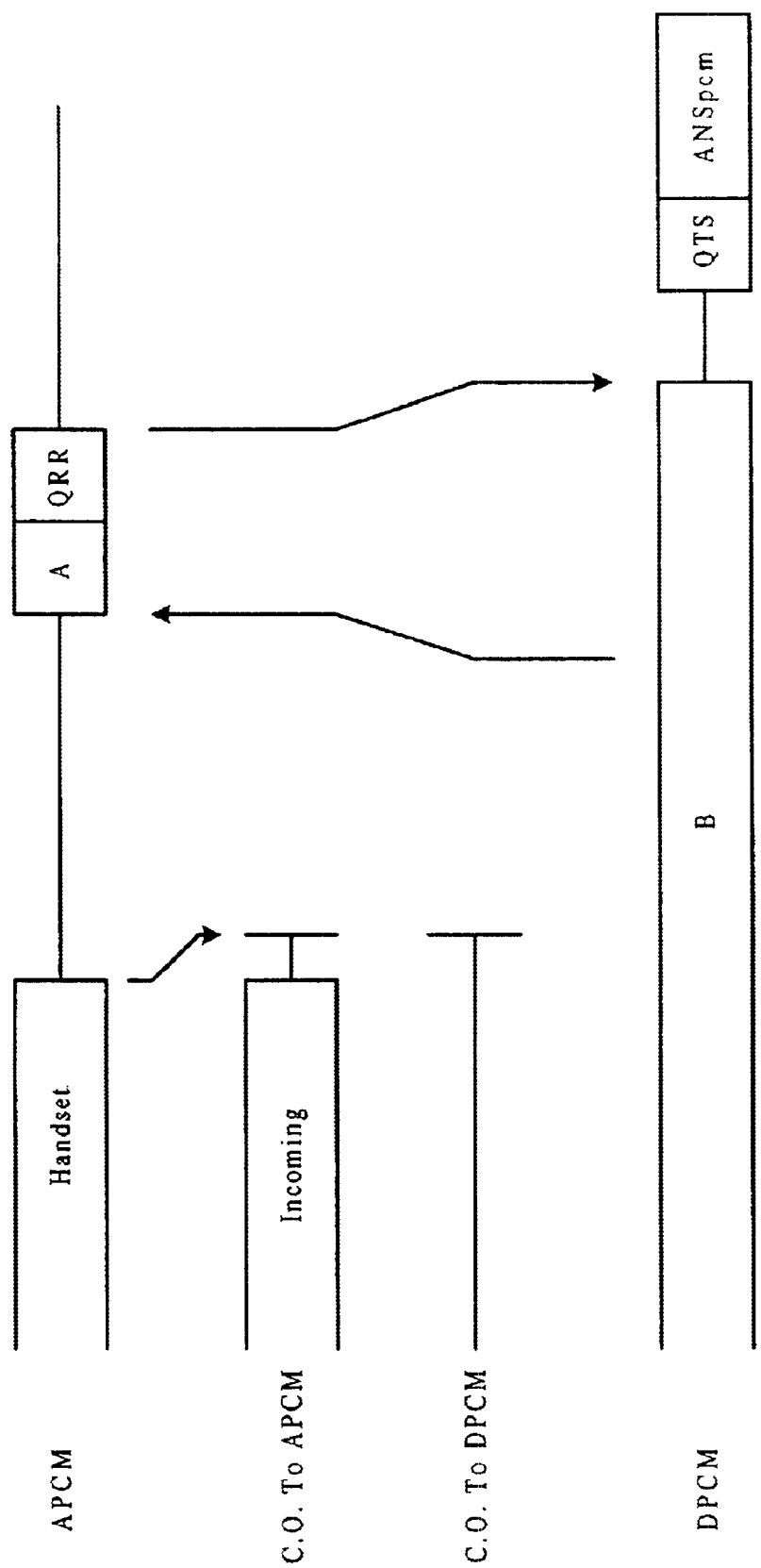

In general, any of the procedures utilized in the context of a system using parallel answer device 1610 may also be used in the context of a system using series answer device 1611. However, the converse may not always be true. For example, FIG. 11 is a timing diagram that depicts the situation where the incoming call is terminated by series answer device 1611. As described above, a communication line at customer site 1670 initially provides APCM 1604 with a signal from central office 1606, and APCM 1604 routes the signal to answer device 1610. In most practical applications, APCM 1604 will remain "off-hook" even if it is merely routing the call to series answer device 1611. Accordingly, APCM 1604 is capable of monitoring the line for the presence of a "B" tone or a suitable signal associated with DPCM 1602. In this scenario, if the incoming call is terminated (by calling device 1608 or by series answer device 1611), APCM 1604 is capable of receiving signals from central office 1606. Furthermore, central office 1606 responds to the detection of the call termination by switching DPCM 1602 to communicate with the customer site 1670. Thus, if the "B" tone is detected by APCM 1604, it can immediately decouple the series answer device 1611. Once the two modem devices resume the communication session, the quick reconnect routine proceeds as described above in connection with FIG. 9.

Figure 12:
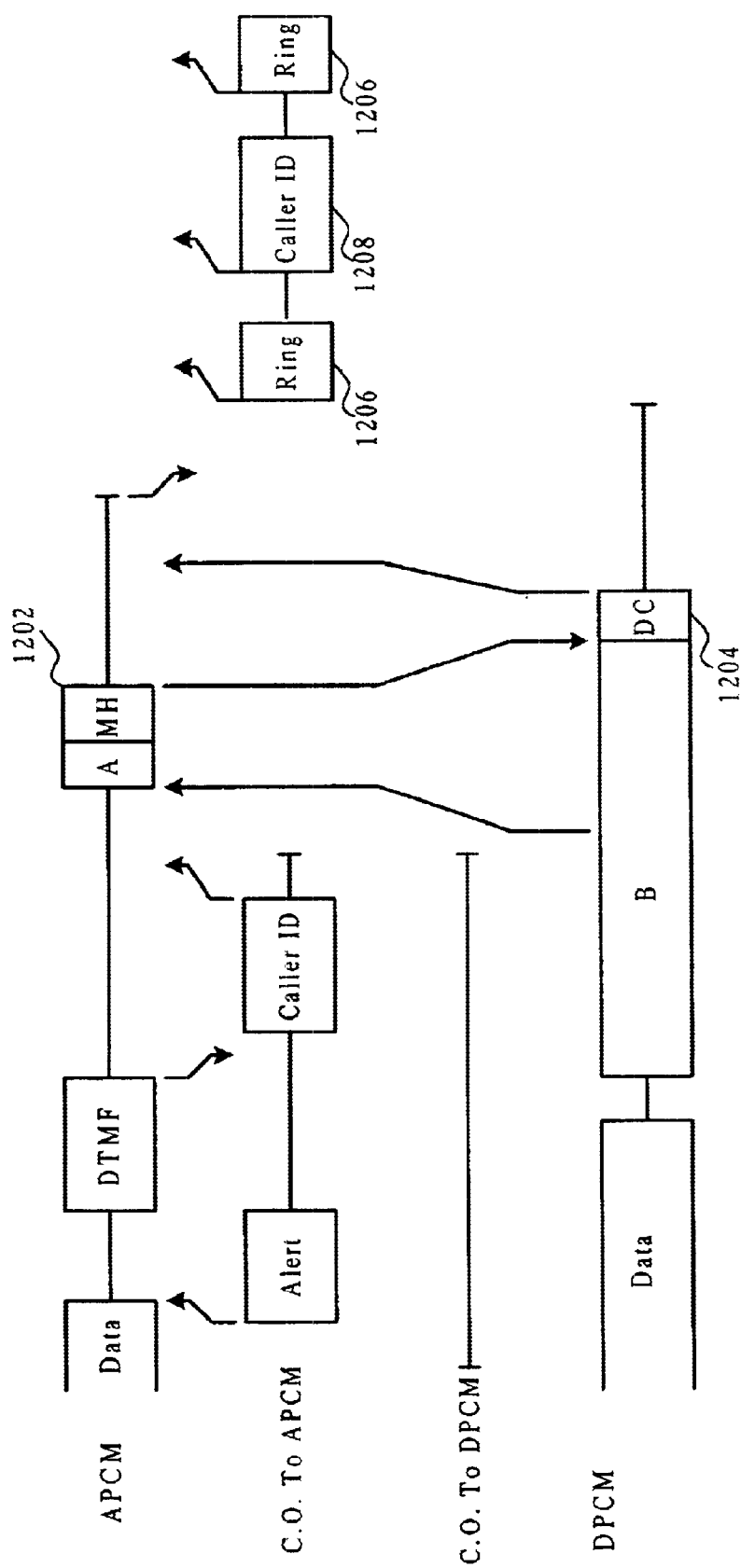

FIG. 12 is a timing diagram that depicts the situation where DPCM 1602 responds to a modem hold request with a clear down instruction (FIG. 12 is applicable to a system that uses either serial answer device 1611 or parallel answer device 1610). Up to the point where a modem hold request 1202 is transmitted from APCM 1604 to DPCM 1602, the process is similar to that described above in connection with FIG. 8. In contrast to the scenario where DPCM 1602 acknowledges modem hold request 1202, the situation depicted in FIG. 12 calls for the transmission of a disconnect signal 1204 from DPCM 1602. DPCM 1602 may transmit disconnect signal 1204 after contemplating or considering any number of operating parameters, e.g., the current call traffic, the functional capabilities of DPCM 1602, the channel characteristics, or the like.

After DPCM 1602 transmits disconnect signal 1204, it idles or waits without transmitting any meaningful signals. In response to disconnect signal 1204, APCM 1604 clears down the modem connection in an appropriate manner. If central office 1606 does not detect activity from APCM 1604 after a suitable timeout period, e.g., 1550 milliseconds, then it may assume that APCM 1604 has been disconnected. Thereafter, central office 1606 switches out DPCM 1602 and generates ring signals 1206 and caller ID data 1208 to customer site 1670 such that the incoming call can be answered. DPCM 1602 may clear down its modem connection after a suitable timeout period, e.g., two seconds, during which it receives no signals from APCM 1604. Accordingly, DPCM 1604 will typically hang up once central office 1606 begins generating ring signal 1206. As described above, prior to clear down, APCM 1604 and/or DPCM 1602 may save any number of relevant operational parameters to facilitate a quick startup for subsequent connections.

Figure 13:
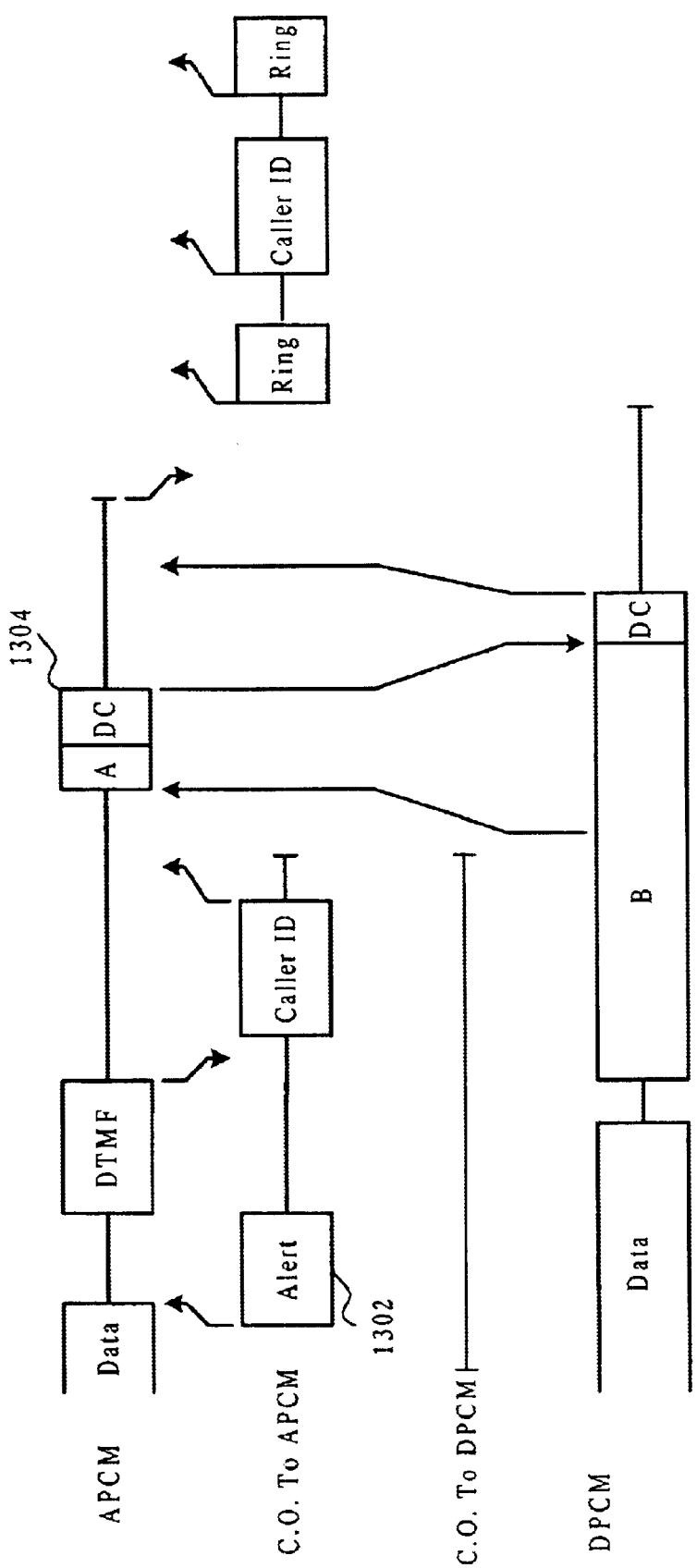

Under certain conditions, the end user may wish to immediately terminate the modem connection and accept an incoming call. FIG. 13 is a timing diagram that depicts a situation where, in response to an alert signal 1302, APCM 1604 transmits a disconnect signal 1304 rather than a modem hold request. FIG. 13 is applicable to a system that uses either serial answer device 1611 or parallel answer device 1610. APCM 1604 may generate disconnect signal 1304 in response to a user command or automatically in accordance with a predetermined protocol or setting. The progression of signals and operations associated with FIG. 13 is substantially similar to the progression associated with FIG. 12. However, unlike the process depicted in FIG. 12, APCM 1604 transmits disconnect signal 1304 to DPCM 1602.

Figure 14:
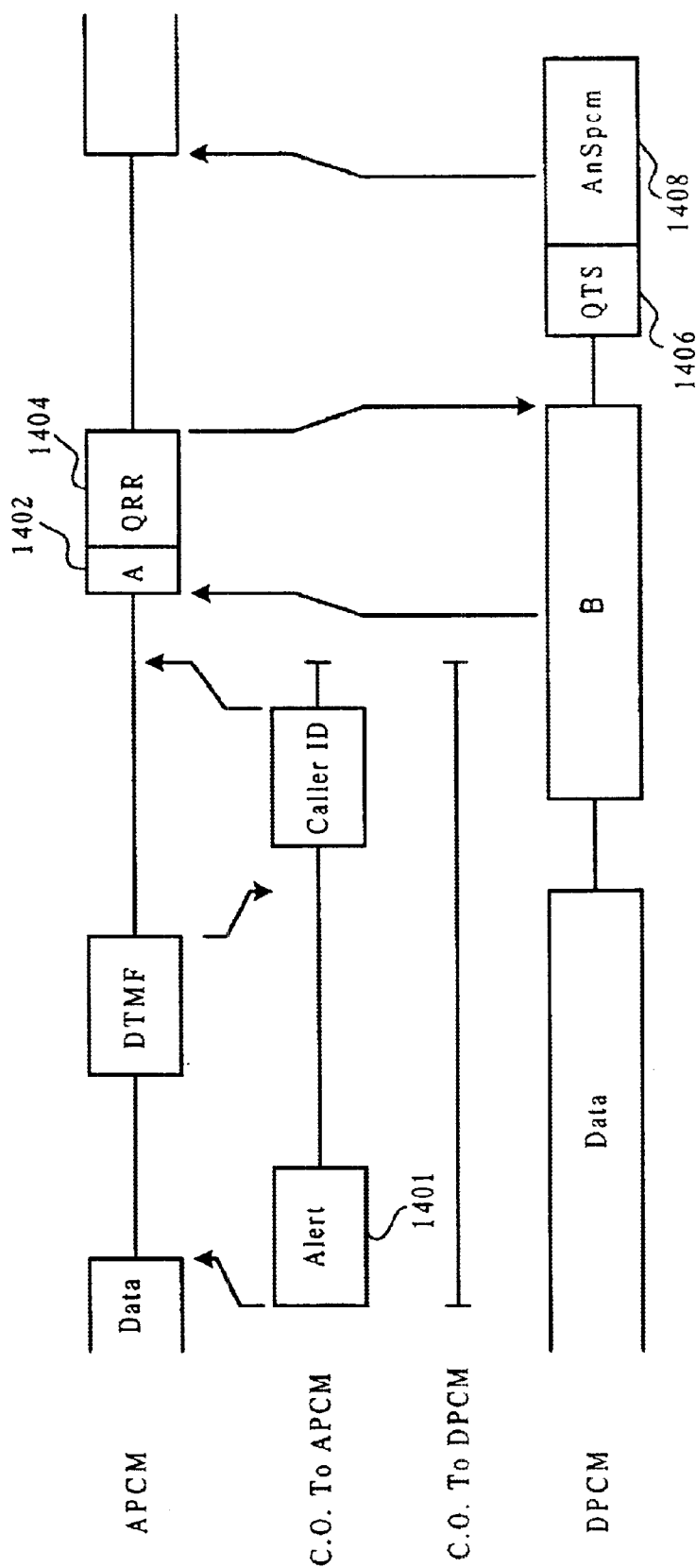

FIG. 14 is a timing diagram that depicts the scenario where, in response to an alert signal 1401, APCM 1604 prompts a quick reconnect procedure and ignores the incoming call. FIG. 14 is applicable to a system that uses either serial answer device 1611 or parallel answer device 1610. Such a situation may occur when the quality of the modem connection is important, when the end user does not want to be disturbed by incoming calls, and/or if the modem connection is severely affected by the alert signal 1401. Furthermore, such a situation may occur in response to the caller ID data, i.e., the answering party may choose to ignore incoming calls from certain calling parties. Up to the point where an "A" tone 1402 is transmitted, the procedure of FIG. 14 is similar to the procedure of FIG. 8. Following the transmission of "A" tone 1402, APCM 1604 generates a quick reconnect request 1404, which is eventually received by DPCM 1602. In response to quick reconnect request 1404, DPCM 1602 may transmit a QTS signal 1406 followed by an ANSpcm signal 1408 to facilitate the quick reconnect routine (as described above in connection with FIGS. 6 and 7). It should be noted that APCM 1604 may alternatively transmit a suitable modem status signal, e.g., a phase reversal, that indicates a full retrain procedure rather than a quick reconnect procedure. In such an embodiment, the retrain procedure would proceed in a conventional manner.

Figure 15:
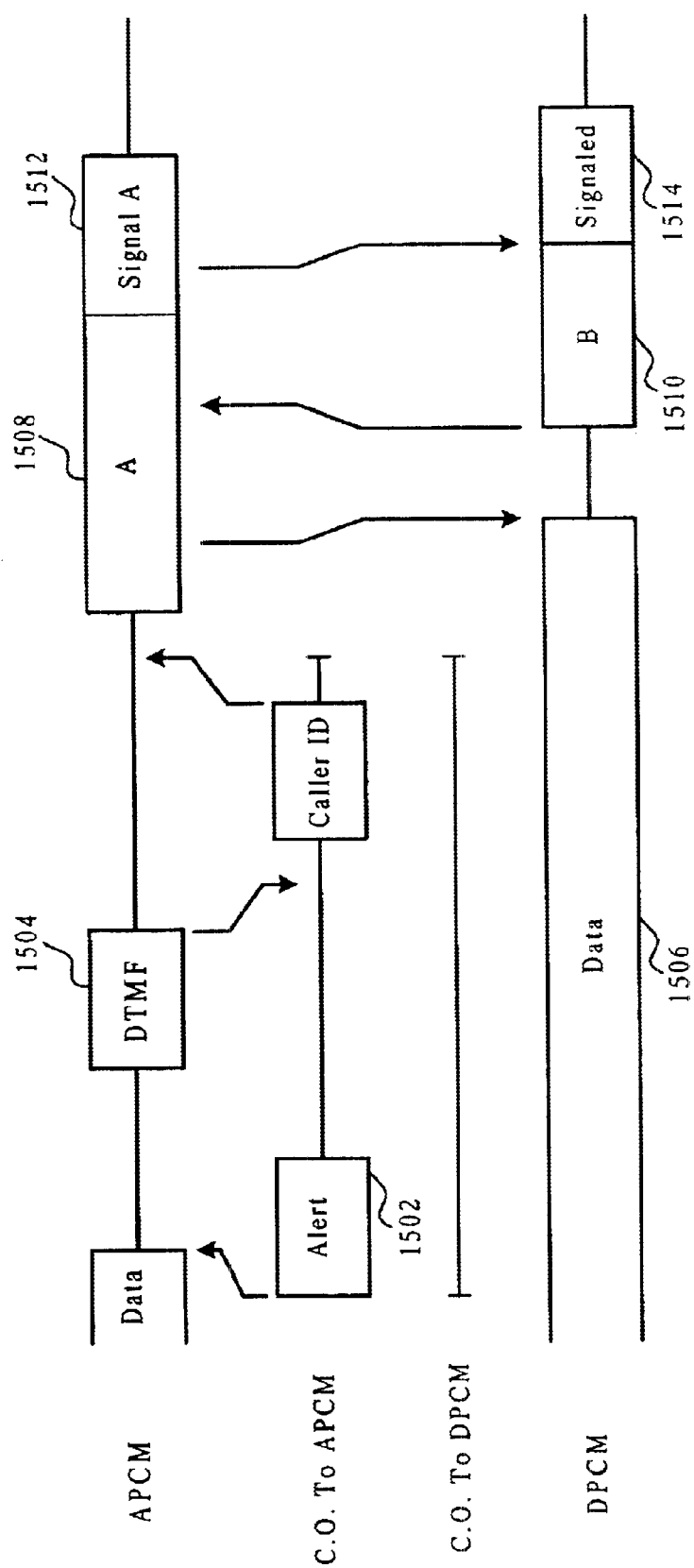

Under some conditions, DPCM 1602 may not "automatically" enter the initial retrain mode in response to an alert signal. In other words, DPCM 1602 may continue transmitting data as though no interruption has occurred. FIG. 15 is a timing diagram that illustrates this situation (FIG. 15 is applicable to a system that uses either serial answer device 1611 or parallel answer device 1610). As described above in connection with FIG. 8, APCM 1604 may respond to an alert signal 1502 by transmitting a DTMF "D" tone 1504 (associated with a caller ID request) during an interruption in the data mode. Unlike the situation of FIG. 8, where DPCM 1602 begins to transmit a "B" tone as a result of the interruption, DPCM 1602 continues to transmit data 1506 to APCM 1604. When APCM 1604 is reconnected by central office 1606, it preferably transmits an "A" tone 1508 for a suitable time period to allow DPCM 1602 to respond with a "B" tone 1510. When APCM 1604 detects the "B" tone 1510 from DPCM 1602, it then follows the "A" tone 1508 with a $SIGNAL_A$ 1512, where $SIGNAL_A$ 1512 may be a modem hold request, a quick reconnect request, or a disconnect signal. In response to $SIGNAL_A$ 1512, DPCM 1602 transmits a $SIGNAL_D$ 1514, where $SIGNAL_D$ may be a modem hold acknowledgment, a short period of silence followed by a QTS signal and an ANSpcm sequence, or a disconnect signal. In this manner, the different situations described above can be handled even though DPCM 1602 does not initially enter the retrain mode with the transmission of a "B" tone.

The signaling routines and procedures described above in connection with FIGS. 8–16 can be equivalently applied to accommodate various requests that originate at customer site 1670. For example, the user of APCM 1604 may desire to place a current modem connection on hold, to prompt a quick reconnect, or to prompt a full retrain in an independent manner. In one practical embodiment, the modem hold request and modem hold acknowledgment signals can be incorporated into the conventional Phase 4 CP and MP sequences. Accordingly, if either modem device wants to place the other modem device on hold (e.g., for three-way calling), then the requesting modem device can perform a rate renegotiation and transmit the hold signal in an appropriate manner. This technique may be performed in a similar manner as the conventional V.34 and V.90 clear down procedure, where a special code (data rate=0) is used to indicate a clear down. However, the modem hold signaling technique may utilize a different bit combination or leverage a number of reserved bits.

In response to such a user request, APCM 1604 may generate an "A" tone followed by an appropriate modem status signal (e.g., a modem hold request, a quick reconnect request, or the like) for receipt by DPCM 1602. As described above in connection with FIG. 15, DPCM 1602 may then respond with a "B" tone followed by an appropriate status signal reply (e.g., a modem hold acknowledgment, a QTS signal, or the like). In this manner, the techniques of the present invention can be applied in any number of situations unrelated to a call waiting alert, a line interruption, or a line corrupting event.

In one embodiment, the present invention provides techniques to reduce the initialization period and reconnect period normally associated with a V.90 modem system. The quick startup and quick reconnect techniques leverage the known channel characteristics of a previous connection to reduce the training time associated with subsequent attempts to establish the same connection. Although not limited to any specific modem application, the quick startup procedure may be used to eliminate portions of the initialization protocols or processes normally employed by a 56 kbps modem, e.g., V.8bis, V.8, digital impairment learning, initial training, probing and ranging, or the like. In addition, the quick startup technique may perform certain operations at a different time or in a different order in comparison to a conventional modem startup technique.

Referring back to FIG. 5, it is shown that during the phase 4 of the V.90 training process the APCM modem 590 and the DPCM modems 580 exchange various parameters via CP and MP frames 510 and 520, respectively. FIG. 17 shows various bits of information and parameters that may be included in an example MP sequence or frame 1700.

Referring to FIG. 17, it is seen that the NIP frame 1700 has a synchronous format and includes seventeen sync bits 1701 of "1"s (bits 0:16), followed by one start bit 1702 (bit 17) and ending with sixteen bits of CRC 1730 (bits 171:186). The CRC bits 1730 are utilized by the APCM modem 580 to verify the sanctity of the MP frame 1700. As shown, the MP frame 1700 also includes a reserved bit 1704 (bit 19) that is available for future use. The MP frame 1700 further includes an acknowledgement bit 1710 (bit 33). The acknowledgement bit 1710 is "0". Other bits of information in the MP frame 1700 include data signaling rates, trellis encoder select bit, nonlinear encoder parameter select bit, constellation select bit, data signaling rate capability mask, asymmetric data signaling rate enable and many bits of precoding information.

The acknowledgement bit 1710 is set to a "1" by the DPCM modem 590 to acknowledge the receipt of the CP frame 510 (see FIG. 5) transmitted by the APCM modem 580. The MP frame 1700 with the acknowledgement bit 1710 set to a "1" is denoted as the MP' frame 522 (see FIG. 5). It should be noted that both the MP frame 510 and the MP' frame 512 include the same number of bits and information with a single difference being the value of the acknowledge bit 1710.

With reference to FIG. 18, an example definition bits of a CP frame 1800 is shown. Similar to the MP frame 1700, the CP frame 1800 is a synchronous type frame with seventeen synchronous leading bits 1801 of "1"s (bits 0:16), followed by one start bit 1802 (bit 17) and ending with sixteen bits of CRC 1830 (bits 273+δ:288+δ). The CRC bits 1830 are utilized by the DPCM modem 590 to verify the sanctity of the CP frame 1800. As shown, the CP frame 1800 also includes a reserved bit 1804 (bit 18) that is available for future use. The CP frame 1800 further includes an acknowledgement bit 1810 (bit 33). The acknowledgement bit 1810 is "0". Other bits of information in the CP frame 1800 include data signaling rates, silent period bit, sign bits for spectral shaping parameters, constellation information and many other bits of information including variable length parameters that can lengthen the size of the CP frame 1800 even more.

The acknowledgement bit 1810 is set to a "1" by the APCM modem 580 to acknowledge the receipt of the MP frame 520 (see FIG. 5) transmitted by the DPCM modem 590. The CP frame 1800 with the acknowledgement bit 1810 set to a "1" is denoted as the CP' frame 522 (see FIG. 5). Both the CP frame 510 and the CP' frame 512 include the same number of bits and information with a single difference being the value of the acknowledge bit 1810.

Referring to FIG. 19, preliminary definition bits of a CPa frame 1900 for possible inclusion in the ITU V.92 Recommendation is shown. Similar to the MP and CP frames 1700 and 1800, the CPa frame 1900 is a synchronous type frame with seventeen synchronous leading bits 1901 of "1"s (bits 0:16), followed by one start bit 1902 (bit 17) and ending with sixteen bits of CRC 1930. The CRC bits 1930 are utilized by the APCM modem (see FIG. 24c) to verify the sanctity of the CPa frame 1900. As shown, the CPa frame 1900 also includes reserved bits 1904 (bits 21:23) that are yet to be defined. The CPa frame 1900 further includes an acknowledgement bit 1910 (bit 33). The acknowledgement bit 1910 for the CPa frame 1900 is "0". The acknowledgement bit 1910 is set to a "1" by the DPCM modem to acknowledge the receipt of the CP frame (see FIG. 24c) transmitted by the APCM modem. Other bits of information in the CPa frame 1900 include constellation information with high resolution as well as precoder and prefilter coefficients and many other bits of information including variable length parameters that can significantly increase the length of the CPs frame 1900.

If the acknowledgement mechanisms of the ITU Recommendations V.34 and V.90, as explained with reference to FIGS. 17 and 18, were to be used for the ITU Recommendation V.92, the CPa frame and the CPa' frame would include the same number of bits and information with a single difference being the value of the acknowledge bit 1910.

The parameter exchange and acknowledgement mechanisms used in the V.34 and V.90 Recommendations, however, have introduced a significant overhead and delay in the training process. As shown in FIG. 5, the modems 580 and 590 transmit CP and MP frames 510 and 520 continuously until an acknowledgement frame from the remote modem is received. Even the acknowledgement frames introduce a significant overhead and delay in the handshaking process, because the same previously transmitted information bits are unnecessarily retransmitted over and over again. These continuous transmissions and retransmissions of CP, MP, CP' and MP' frames are needless, since in most cases, the first transmission of the MP or CP frame is received correctly by the remote modem. Accordingly, it becomes unnecessary to retransmit all the information bits in the MP' or CP' frame, since the acknowledgement bit is in fact the most significant bit of information.

Figure 20:
FIG. 20 illustrates the definition of bits in an example short modulation parameter (MPs) frame.

To eliminate this enormous overhead and delay during the handshaking process, the present invention introduces short parameter frames, as shown in embodiments of FIGS. 20–22. Referring to FIG. 20, an example definition bits of a short MP frame (MPs) 2000 is shown. As shown, just like the MP frame 1700, the MPs frame 2000 is a synchronous type frame with seventeen synchronous leading bits 2001 of "1"s (bits 0:16), followed by one start bit 2002 (bit 17) and ending with sixteen bits of CRC 2030 (bits 35:50). The CRC bits 2030 are utilized by the APCM modem 580 to verify the sanctity of the MPs frame 2000. As further shown, the MPs frame 2000 also includes an MPs indicator bit 2004 (bit 19) to distinguish the MPs frame 2000 from the MP frame 1700. Referring back to FIG. 17, it is noted that the corresponding bit location is the reserved bit 1704. The MPs frame 2000 further includes an acknowledgement bit 2010 (bit 33). The acknowledgement bit 2010 is "0". The acknowledgement bit 2010 is set to "1" by the DPCM modem to acknowledge the receipt of the CP frame (see FIG. 24b) transmitted by the APCM modem. The MPs frame 2000 with the acknowledgement 2010 set to a "1" is denoted as the MPs' frame. Both the MPs frame and the MPs' frame include the same number of bits and information with a single difference being the value of the acknowledge bit 2010. However, the MPs and MPs' frames are substantially shorter than the MP and MP' frames, respectively.

Now, referring to FIG. 21, an example definition bits of a short CP frame (CPs) 2100 is shown. As shown, just like the CP frame 1800, the CPs frame 2100 is a synchronous type frame with seventeen synchronous leading bits 2101 of "1"s (bits 0:16), followed by one start bit 2102 (bit 17) and ending with sixteen bits of CRC 2130 (bits 35:50). The CRC bits 2130 are utilized by the DPCM modem 590 to verify the sanctity of the CPs frame 2100. As further shown, the CPs frame 2100 also includes a CPs indicator bit 2104 (bit 18) to distinguish the CPs frame 2100 from the CP frame 1800. Referring back to FIG. 18, it is noted that the corresponding bit location is the reserved bit 1804. The CPs frame 2100 further includes an acknowledgement bit 2110 (bit 33). The acknowledgement bit 2110 is "0". The acknowledgement bit 2110 is set to "1" by the APCM modem to acknowledge the receipt of the MP frame (see FIG. 24b) transmitted by the DPCM modem. The CPs frame 2100 with the acknowledgement 2110 set to a "1" is denoted as the CPs' frame. Both the CPs frame and the CPs' frame include the same number of bits and information with a single difference being the value of the acknowledge bit 2110. It should be noted, however, that the CPs and CPs' frames are substantially shorter than the CP and CP' frames, respectively.

With reference to FIG. 21, an example definition bits of a short CPa frame (CPas) 2200 is shown. As shown, just like the CPa frame 1900, the CPas frame 2200 is a synchronous type frame with seventeen synchronous leading bits 2201 of "1"s (bits 0:16), followed by one start bit 2202 (bit 17) and ending with sixteen bits of CRC 2230 (bits 35:50). The CRC bits 2230 are utilized by the APCM modem to verify the sanctity of the CPas frame 2200. As further shown, the CPas frame 2200 also includes CPas indicator bits 2104 (bits 18:20) to distinguish the CPas frame 2200 from the CPa frame 1900. Referring back to FIG. 19, it is noted that the corresponding bits are the reserved bits 1904. The CPas frame 2200 further includes an acknowledgement bit 2210 (bit 33). The acknowledgement bit 2210 is "0". The acknowledgement bit 2210 is set to "1" by the DPCM modem to acknowledge the receipt of the CP frame (see FIG. 24c) transmitted by the APCM modem. The CPas frame 2200 with the acknowledgement 2210 set to a "1" is denoted as the CPas' frame. Both the CPas frame and the CPas' frame include the same number of bits and information with a single difference being the value of the acknowledge bit 2210. It is also that the CPas and CPas' frames are substantially shorter than the CPa and CPa' frames, respectively.

Figure 23:
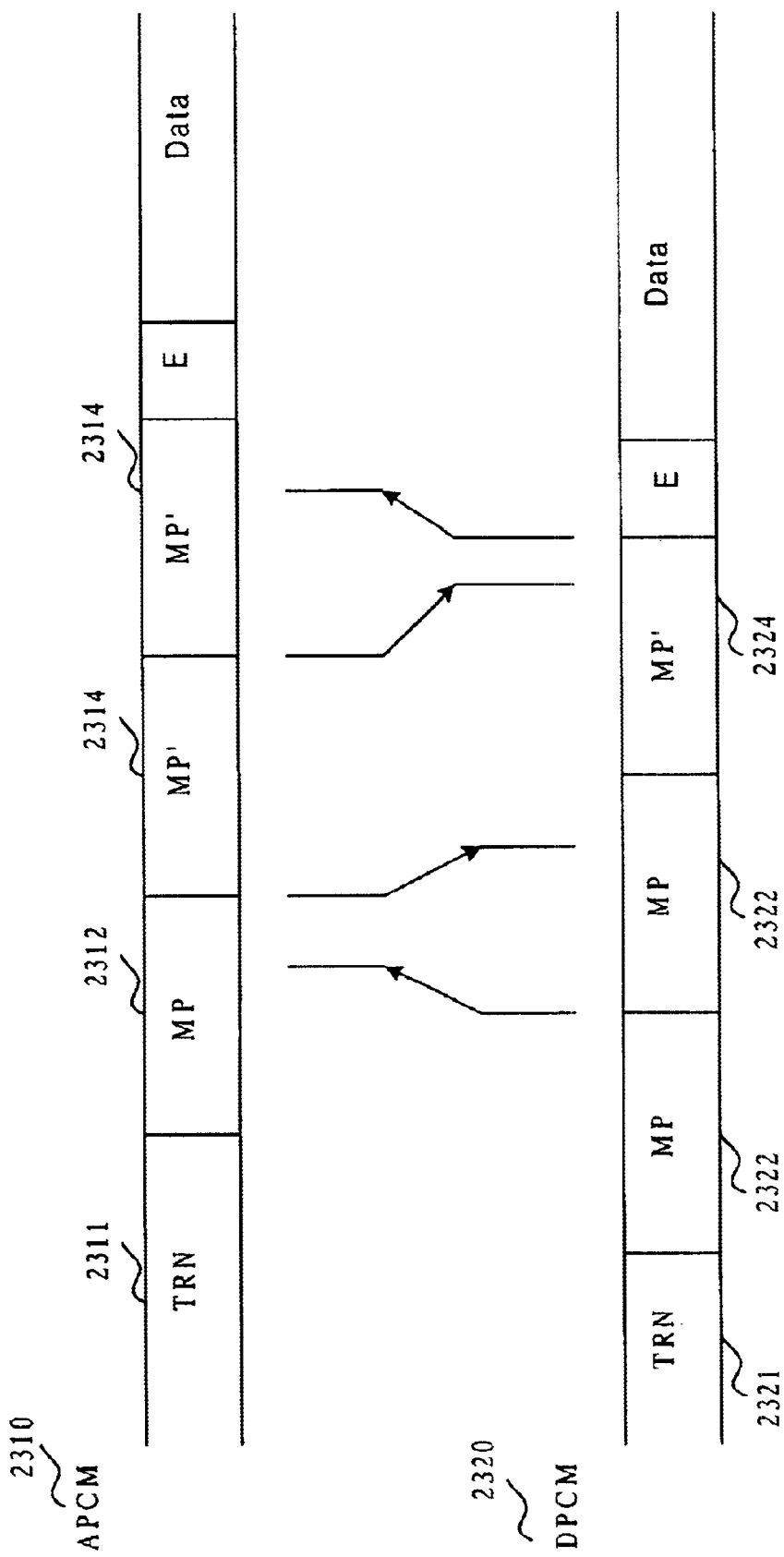
FIG. 23 illustrates an example of exchange of conventional modulation parameter (MP) frames according to the ITU V.34 Recommendation.

FIG. 23 illustrates a conventional exchange of parameters embedded in MP sequences or frames 2312 and 2322 between an APCM modem 2310 and a DPCM modem 2320, respectively, in accordance with the ITU Recommendation V.34. As shown, after the TRN portions 2311 and 2312 of the phase 4 or the final training of the handshaking process, the APCM and DPCM modems 2310 and 2320 exchange the MP frames 2312 and 2322, respectively. The MP frames 2312 and 2322 are in the form shown in the MP frame 1700 of FIG. 17. As shown, the DPCM modem 2320 starts transmitting the MP frame 2322 shortly before the APCM starts its transmission of the MP frame 2312. As a result, the APCM modem 2310 receives the MP frame 2322 prior to the DPCM modem 2320 receiving the MP frame 2312. In response, the APCM modem 2310 sets the acknowledgement bit in the MP frame, thus creating an MP' frame, and starts transmitting the MP' frame 2314, including each and every bit of information previously transmitted to the DPCM modem 2320 via the MP frame 2312. While the DPCM is awaiting an acknowledgement for its MP frame 2322 from the APCM modem 2310, another NP frame 2322 is transmitted by the DPCM modem 2320 to the APCM modem 2310 to provide the APCM modem 2310 with a second chance to receive the MP frame 2322. In the mean time, the APCM modem 2310 has already received the first MP frame 2322 and no acknowledgement for its MP frame 2312 or its MP' frame 2314, accordingly, the APCM modem 2310 generates a second MP' frame to give the DPCM a third chance to receive the parameters embedded in the MP or MP' frame 2312 or 2314, respectively. As shown, however, the DPCM modem 2320 had already started transmitting an MP' frame 2324. These long frames and their overlap in the transmission and reception time domains prevent the modems 2310 and 2320 to quickly exchange parameters. The delay is in fact cumulative. The transmission and reception of the long MP and MP' frames cause one modem to start transmitting a long MP frame while receiving an MP' frame from the remote modem; however, the MP' frame may not be sanctified until the CRC bits are received and verified. Therefore, the modem receiving the MP' frame starts transmitting another long MP frame needlessly.

Referring back to FIG. 5, it is also noted that long CP, CP', MP and MP' frames 510, 512, 520 and 522, respectively, are exchanged many times, not because of errors in transmission, but merely because of timing differences in transmission and reception of these frames. It is indeed clear that utilizing a similar mechanism for the ITU Recommendation V.92 will lead to even longer delays due to the fact that the CPa frames are considerably longer than the MP and CP frames.

Figure 24A:
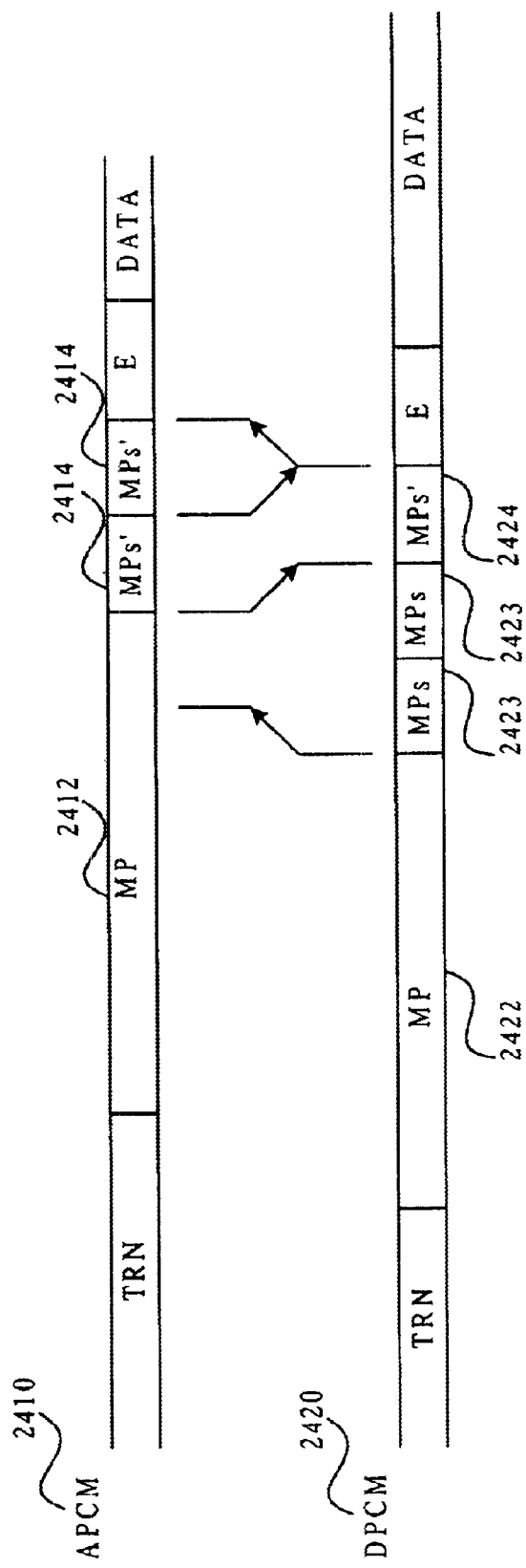
FIG. 24a illustrates an example of quick exchange of modulation parameter (MP) frames according to one embodiment of the present invention.

Accordingly, in one embodiment of the present invention, as shown in FIG. 24a, short MP and MP' frames (MPs and MPs') 2423 and 2424, respectively, similar to the MPs frame 2000 in FIG. 20, are utilized to substantially reduce the parameter exchange time and obtain a quicker connection between the modems. Referring to FIG. 24a, just as in FIG. 23, the two modems 2410 and 2420 exchange long MP frames 2412 and 2422, respectively. However, after such transmissions, both modems switch to short MP frame formats. As shown, the DPCM modem 2420 starts transmitting the MPs frames 2423 immediately after transmitting the MP frame 2422 and while waiting to receive the entire MP frame 2412 from the APCM modem 2410. Immediately after transmitting the MP frame 2412, the APCM modem 2410 acknowledges the receipt of the MP frame 2422 from the DPCM modem 2420 by sending a short MP' frame 2414 (MPs'). On the other hand, while sending the MPs frames 2423, the DPCM modem 2420 receives the MP frame 2412 and acknowledges that frame by sending an MPs' frame 2424. The transmission of the short frames causes a substantial reduction in the handshaking time and results in a quick connection between the two modems 2410 and 2420.

Figure 24B:
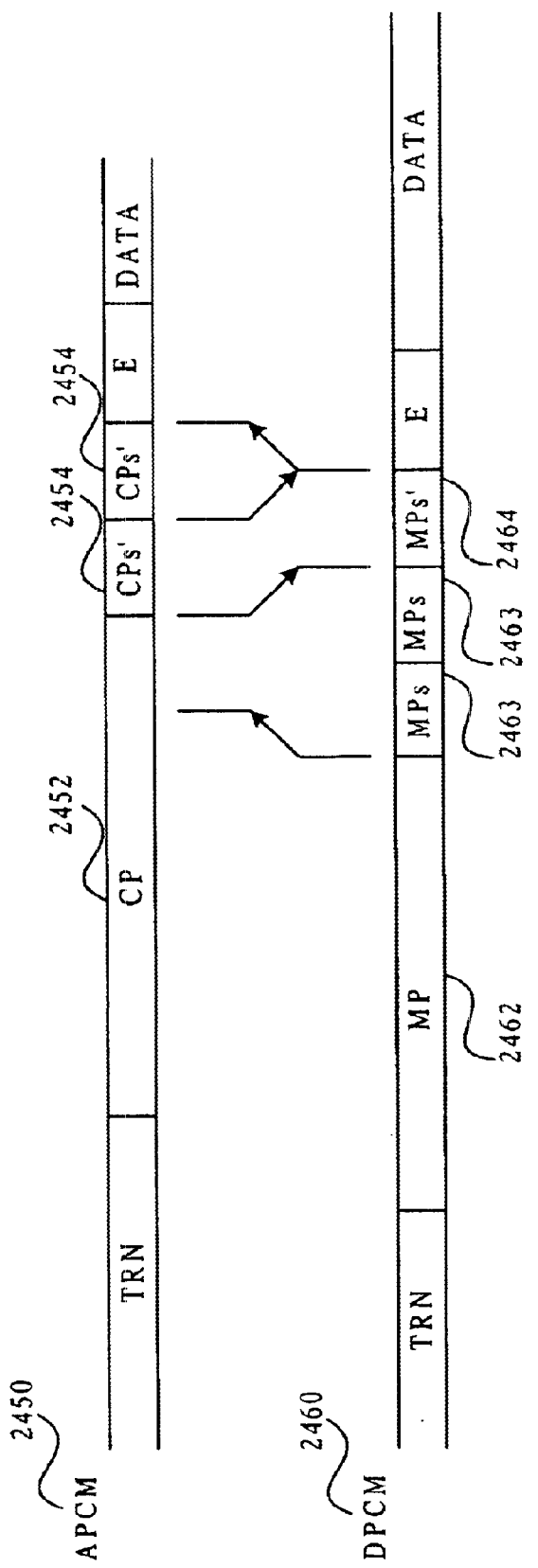
FIG. 24b illustrates an example of quick exchange of modulation parameter (MP) frames and constellation parameter (CP) frames according to one embodiment of the present invention.

By the same token, the exchange of short CP and MP frames in FIG. 24b will speed up the connection time for the V.90 compliant modems. As shown, short MP, MP', CP and CP' frames (MPs, MPs', CPs and CPs') 2463, 2464, (not shown) and 2454, respectively, similar to the MPs frame 2000 in FIG. 20 and the CPs frame 2100 in FIG. 21, respectively, may be utilized for the V.90 compliant modems. The use of these short frames substantially reduces the parameter exchange time and causes a quicker connection between the modems. Referring to FIG. 24b, the two modems 2450 and 2460 exchange long CP and MP frames 2452 and 2462, respectively. After the transmission of these long frames, the modems start transmitting the short CP and MP frame types. As shown, the DPCM modem 2460 starts transmitting the MPs frames 2463 immediately after transmitting the MP frame 2462 and while waiting to receive the entire CP frame 2452 from the APCM modem 2450. Immediately after transmitting the CP frame 2452, the APCM modem 2450 acknowledges the receipt of the MP frame 2462 from the DPCM modem 2460 by sending a short CP' frame 2454 (CPs'). At the other end, while sending the MPs frames 2463, the DPCM modem 2460 receives the CP frame 2452 and acknowledges that frame by sending an MPs' frame 2464.

Figure 24C:
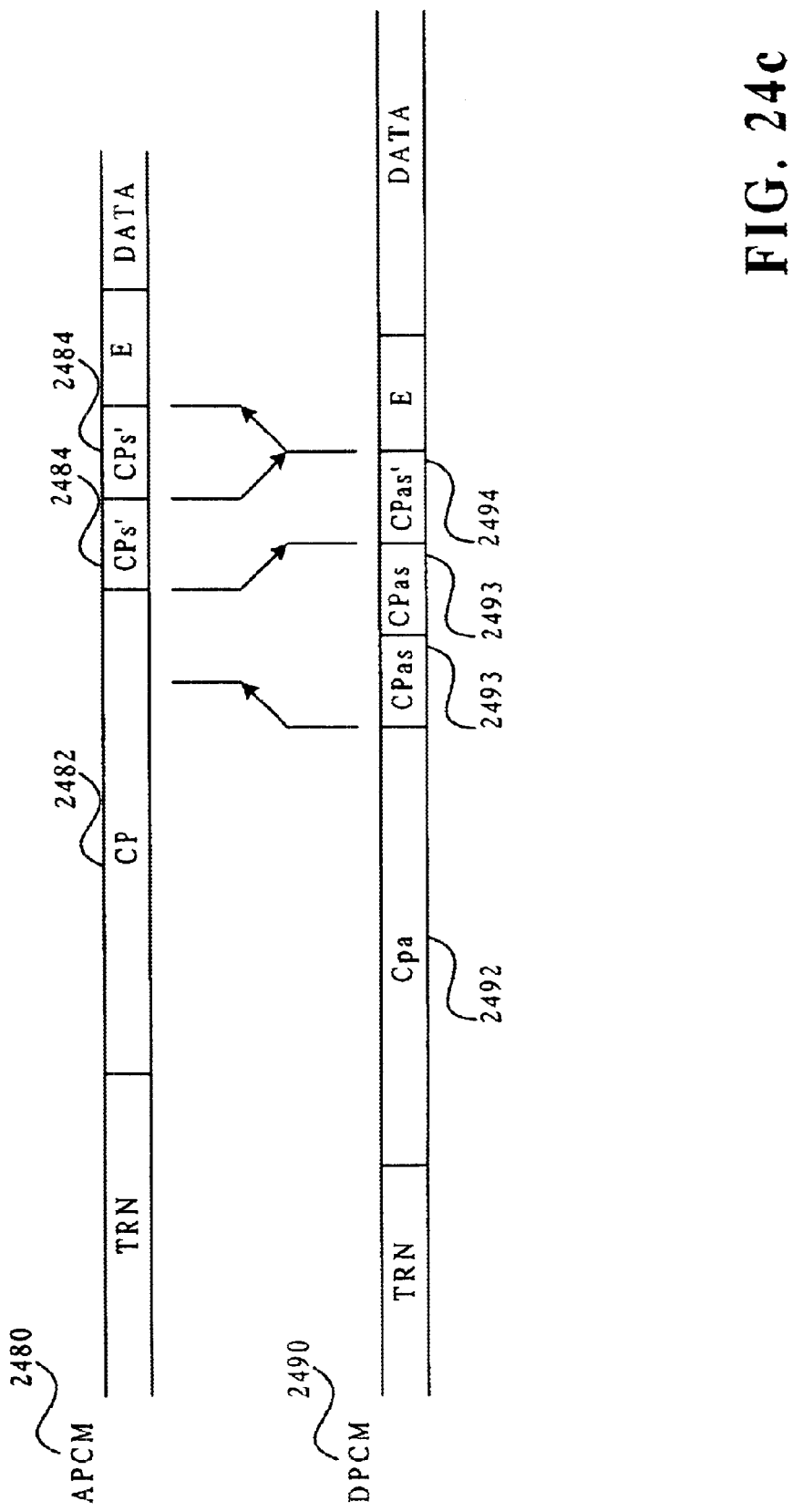
FIG. 24c illustrates an example of quick exchange of constellation parameter (CP) frames and constellation parameter frames for the analog modem (CPa) according to one embodiment of the present invention.

The transmission of short frames will result in a quick connection, in particular for the V.92 compliant modems, mainly because of the volume of the information and parameters embedded in the CPa frames 1900 (see FIG. 19). Referring to FIG. 24c, short CPa, CPas', CP and CP' frames (CPas, CPas', CPs and CPs') 2493, 2494, (not shown) and 2484, respectively, similar to the CPas frame 2200 in FIG. 22 and the CPs frame 2100 in FIG. 21, respectively, may be utilized for the V.92 compliant modems. The use of these short frames substantially reduces the parameter exchange time. As a result, the V.92 compatible modems can achieve a quick connection. Referring to FIG. 24c, the two modems 2480 and 2490 first exchange long CP and CPa frames 2482 and 2492, respectively. After the transmission of these long frames, the modems start transmitting the short CP and CPa frame types. As shown, the DPCM modem 2490 starts transmitting the CPas frames 2493 immediately after transmitting the CPa frame 2492 and while waiting to receive the entire CP frame 2482 from the APCM modem 2480. Immediately after transmitting the CP frame 2482, the APCM modem 2480 acknowledges the receipt of the CPa frame 2492 from the DPCM modem 2490 by sending a short CP' frame 2484 (CPs'). At the other end, while sending the CPas frames 2493, the DPCM modem 2490 receives the CP frame 2482 and acknowledges that frame by sending a CPas' frame 2494.

Figure 25A:
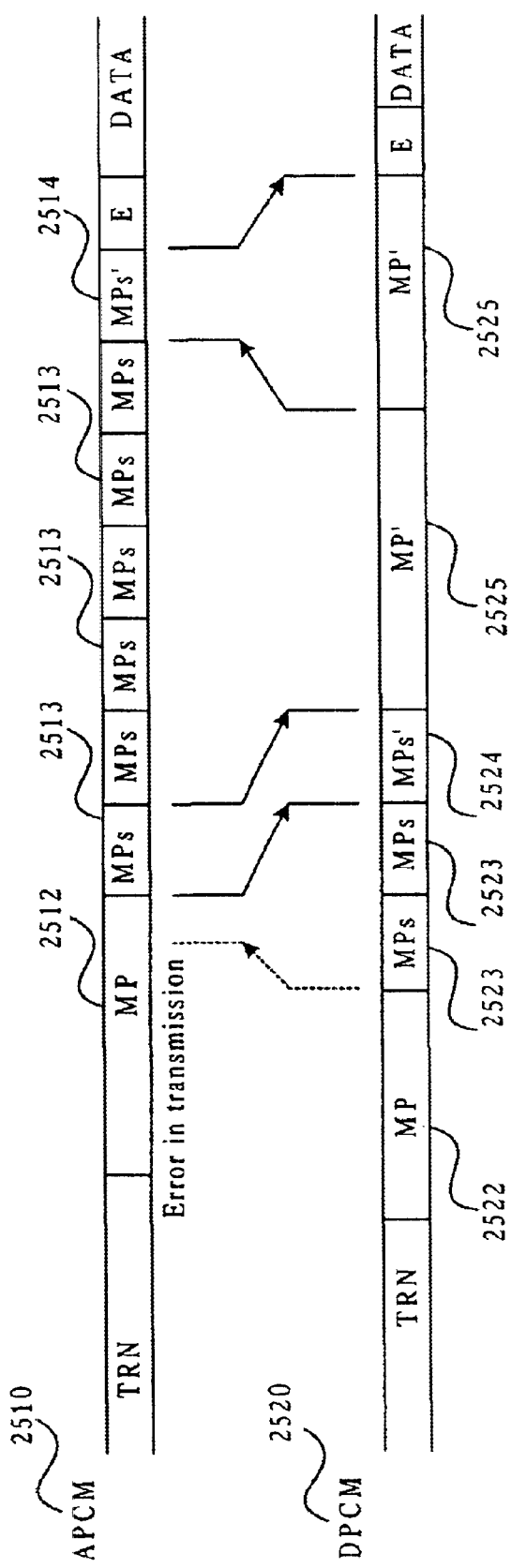
FIG. 25a illustrates an example of quick exchange of modulation parameter (MP) frames in case of an erroneous frame transmission according to one embodiment of the present invention.
Figure 25B:
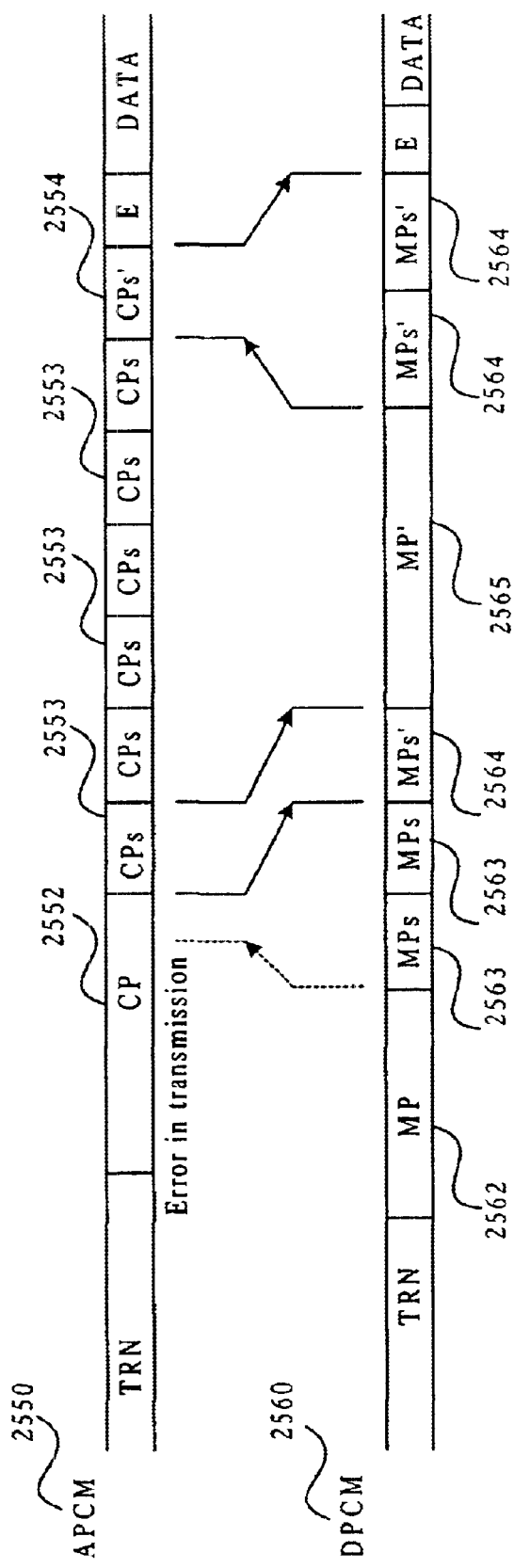
FIG. 25b illustrates an example of quick exchange of modulation parameter (MP) frame and constellation parameter (CP) frame in case of an erroneous frame transmission according to one embodiment of the present invention.
Figure 25C:
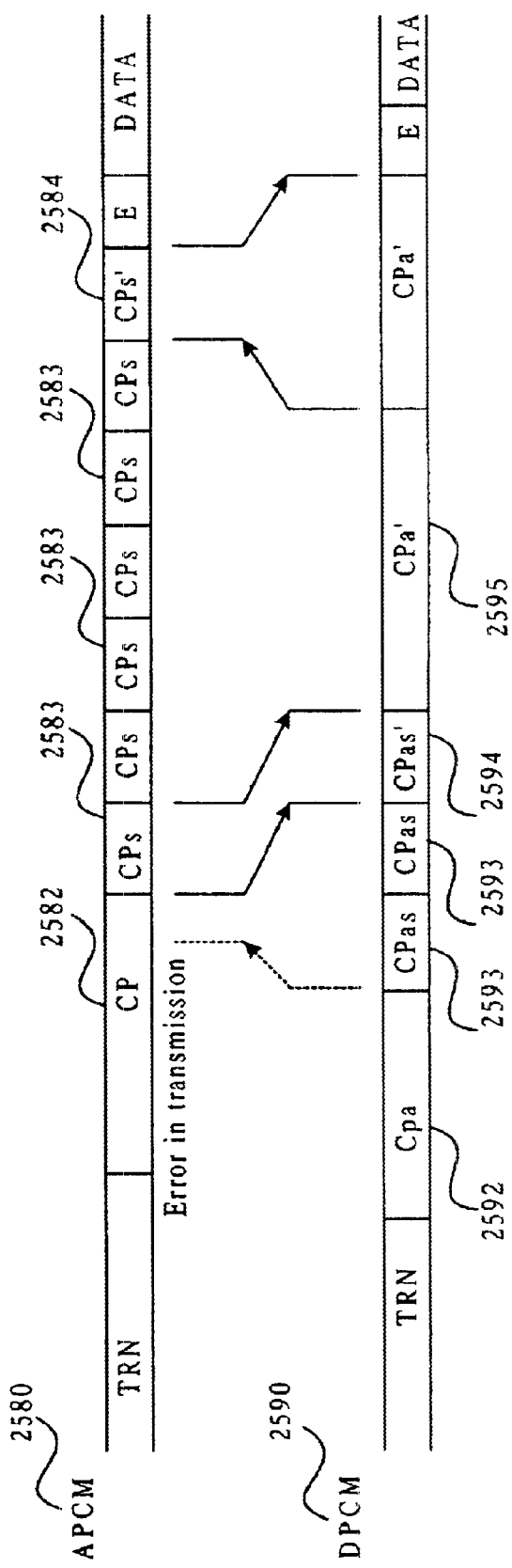
FIG. 25c illustrates an example of quick exchange of constellation parameter (CP) frame and constellation parameter frame for the analog modem (CPa) in case of an erroneous frame transmission according to one embodiment of the present invention.

FIGS. 25a, 25b and 25c illustrate a few examples of situations where the long frames, MP, CP and/or CPa are not received properly by a receiving modem. Referring to FIG. 25a, according to one embodiment of the present invention, the APCM and DPCM modems 2510 and 2520 exchange MP frames 2512 and 2522, respectively. Immediately after the transmission of the long MP frames 2512 and 2522, both modems 2510 and 2520 switch to transmissions of short MP frames 2513 and 2523, respectively. As shown, the DPCM modem 2520 receives the MP frame 2512 properly. Accordingly, in response, the DPCM modem 2520 acknowledges the MP frame 2512 with an MPs' frame 2524. At the other end, however, the APCM 2510 fails to receive the MP frame 2522. This failure may result from various reasons, such as a bad transmission, bad line conditions, wrong CRC, etc. As a result of this failure, the APCM modem 2510 continues transmitting MPs frames 2513 with the acknowledgement set to "0" indicating that the MP frame 2522 has not been received. In such situations, according to one embodiment of the present invention, the DPCM modem 2520 starts transmitting the long MP frames once again. Because the DPCM modem 2520 has already received the MP frame 2512, the new long MP frames 2525 transmitted by the DPCM modem 2520 will have their acknowledgement bits set to "1". In other words, the DPCM modem 2520 starts transmitting MP' frames, since the short frames do not include all the required parameters. In some embodiments, the DPCM modem 2520 may send only one MP' frame 2525 and then switch to sending MPs' frames 2524 (e.g., FIG. 25b).

The DPCM modem 2520 may use various conditions, events or methods in determining when to start retransmitting long MP frames after a period of transmitting short MP frames. In one embodiment, if the DPCM modem 2520 or the APCM modem 2510 receives the beginning of an MP or MPs frame more than a round-trip delay after the modem 2520 or 2510 has completed its own transmission of a long MP frame, then the modem 2520 or 2510 may start transmitting long MP frames once again. In another embodiment, extra time, for example 20–30 ms, may be added to the round-trip delay time to allow for detection delay, before long MP frames are transmitted once again. Those of ordinary in the art are familiar with the calculation of round-trip delays. In some embodiments, a fixed amount of time may be used as a time-out period in determining when the modem should send a long MP frame once again after sending short MP frames. In yet another embodiment, a predetermined event may be utilized, such as the number of short MP frames transmitted by the modem that is awaiting an acknowledgement. For example, if the APCM modem 2510 transmits three MPs frames, but does not receive an acknowledgement, then the APCM modem 2510 may transmit another MP frame.

Now, referring to FIG. 25b, according to another embodiment of the present invention, the APCM and DPCM modems 2550 and 2560 exchange CP and MP frames 2552 and 2562, respectively. Immediately after the transmission of the long CP and MP frames 2552 and 2562, both modems 2550 and 2560 switch to transmissions of short CP (CPs) and short MP (MPs) frames 2553 and 2563, respectively. As shown, the DPCM modem 2560 receives the CP frame 2552 properly. Accordingly, in response, the DPCM modem 2560 acknowledges the CP frame 2552 with an MPs' frame 2564. At the other end, however, the APCM modem 2550 fails to receive the MP frame 2562. Therefore, the APCM modem 2550 continues transmitting CPs frames 2553 with the acknowledgement set to "0" indicating that the MP frame 2562 has not been received. As shown, the DPCM modem 2560 stops transmitting MPs' frames 2564 and transmits only one long MP, having the acknowledgement bit set (because CP has been received), i.e., MP'. In some embodiments, the DPCM modem 2560, may continue sending more MP' frames. In the embodiment of FIG. 25b, however, the DPCM modem 2560 starts sending MPs' frames 2564 after sending only one MP' frame. In the mean time, the APCM modem 2550 continues sending short CP frames 2553, since it has received the MPs' frame 2564 as acknowledgement. Eventually, the APCM modem 2550 receives the long MP frame 2565 from the DPCM modem 2560 and the modems move to the data phase. As stated with reference to FIG. 25a, various methods or predetermined conditions, such as those mentioned above, may be utilized by either the APCM or DPCM modems 2550 or 2560 to determine when to retransmit a long frame after transmitting a short frame.

FIG. 25c illustrates one embodiment of the present invention that may be incorporated or be used in conjunction with the ITU Recommendation V.92. According to FIG. 25c, the APCM and DPCM modems 2580 and 2590 exchange CP and CPa frames 2582 and 2592, respectively. Immediately after the transmission of the long CP and CPa frames 2582 and 2592, both modems 2580 and 2590 start transmitting short CP (CPs) and short CPa (CPas) frames 2583 and 2593, respectively. As shown, the DPCM modem 2590 receives the CP frame 2582 properly. In response, the DPCM modem 2590 acknowledges the CP frame 2582 with a CPas' frame 2594. At the other end, however, the APCM 2580 fails to receive the CPa frame 2592. Therefore, the APCM modem 2580 continues transmitting CPs frames 2583 with the acknowledgement set to "0" indicating that the CPa frame 2592 has not been received. As shown, the DPCM modem 2590 stops transmitting CPas' frames 2594 and instead starts transmitting long CPa frames 2595 having the acknowledgement bit set (because CP has been received), i.e., CPa'. As shown in this embodiment, the DPCM modem 2590 may send more than one CPa'. However, in other embodiment only a single CPa' may be sent and the DPCM modem 2590 may switch back to sending CPas'. In the mean time, the APCM modem 2580 continues sending short CP frames 2583, since it has received the CPas' frame 2594 as acknowledgement. Eventually, the APCM modem 2580 receives the long CPa frame 2595 from the DPCM modem 2590 and the modems move to the data phase. The above-mentioned triggering events or conditions may also be used here in determining when to retransmit a long frame after transmitting a short frame.

Figure 26:
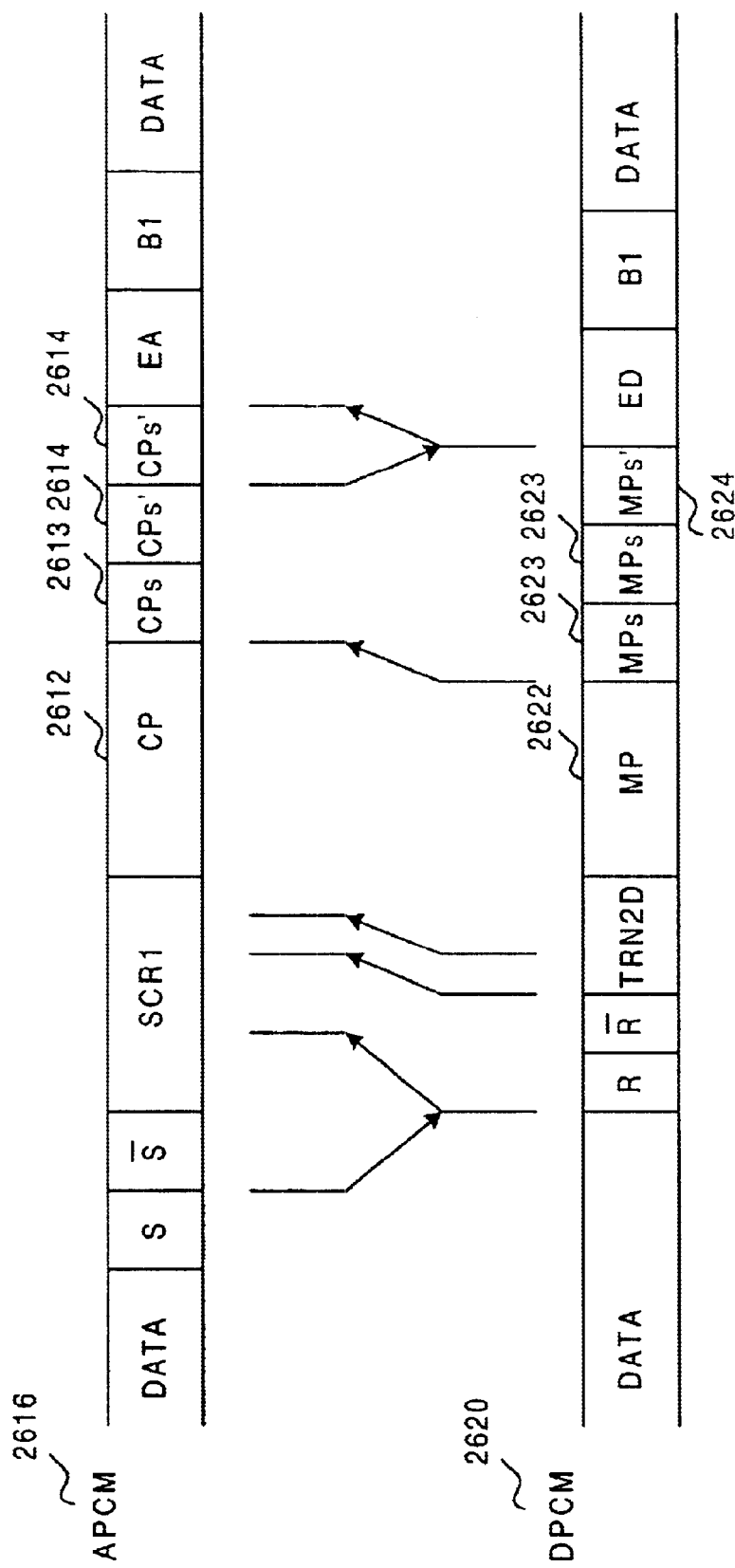
FIG. 26 illustrates an example of a rate renegotiation process occurring between the APCM and DPCM modems according to one embodiment of the present invention.

FIG. 26 illustrates another embodiment of the present invention according to which rate negotiations between modems can be made substantially quicker. FIG. 26 shows a rate renegotiation exchange process between an APCM modem 2610 and a DPCM modem 2620. As shown, a similar parameter exchange process used during the modem start up training can be used for exchanging MP, CP and CPa. The example of FIG. 26 shows a rate renegotiation process according to the ITU Recommendation V.90. However, the same concept is applicable to V.34 and V.92 rate renegotiations. FIG. 26 shows a rate renegotiation initiated by the APCM modem 2610. As shown, the modems 2610 and 2620 exchange long CP and MP frames 2612 and 2622, respectively. Afterwards, both modems 2610 and 2612 start transmitting short CP (CPs) and short MP (MPs) frames 2613 and 2623, respectively. According to this example, the APCM modem 2610 receives the MP frame 2622 first and, in response, transmits a CPs' frame 2614 to the DPCM modem 2620 in acknowledgement. At the other end, the DPCM modem 2620 receives the CP frame 2612 and in acknowledgement transmits an MPs' frame 2624. At this stage, both modems 2610 and 2620 quickly continue to the data phase. As a result of transmitting short CP and MP frames, the modems 2610 and 2620 are able to conclude the rate renegotiation much quicker.

Figure 27:
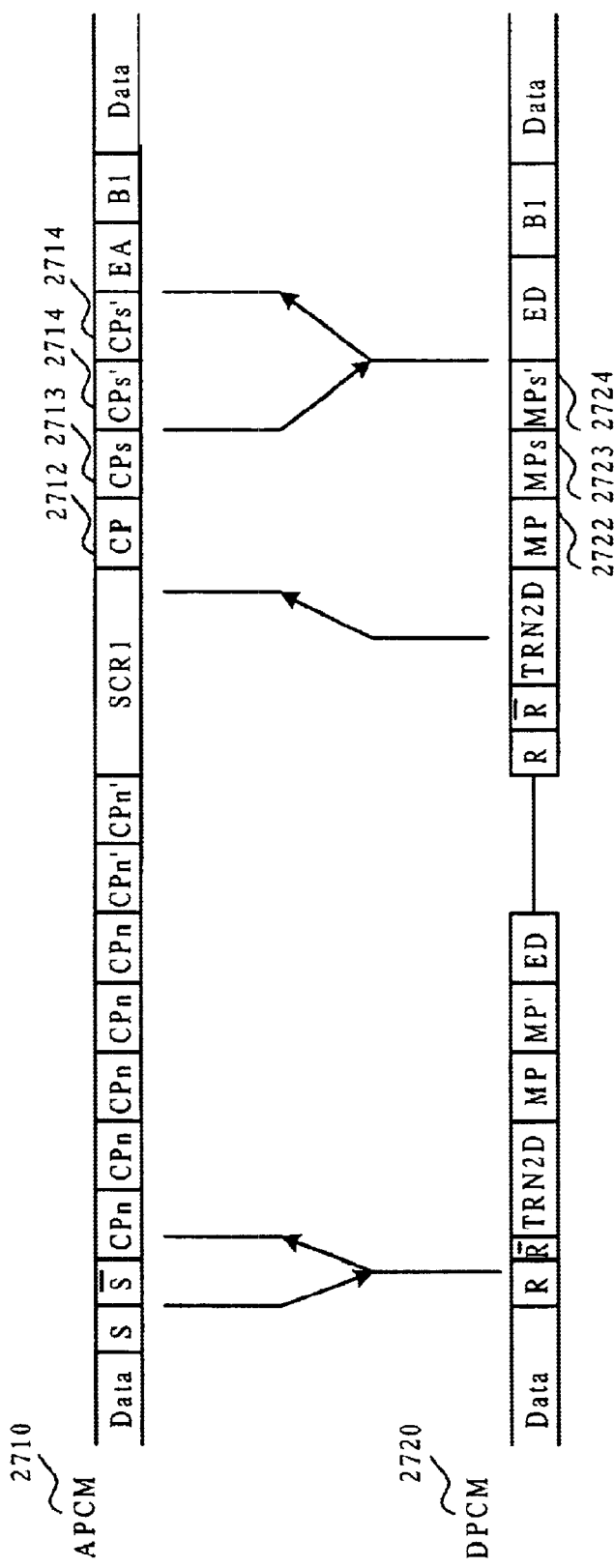
FIG. 27 illustrates an example of a fast train process occurring between the APCM and DPCM modems according to one embodiment of the present invention.

FIG. 27 is another embodiment of the present invention for improving the fast train speed. FIG. 27 shows a fast train process between an APCM modem 2710 and a DPCM modem 2720. During a fast train process, a parameter exchange is also used for exchanging MP, CP and CPa. The example of FIG. 27 shows a fast train process according to the ITU Recommendation V.90. However, the same may be applied to V.34 and V.92 fast trains. FIG. 27 shows a fast train process initiated by the APCM modem 2710. As shown, the modems 2710 and 2720 exchange long CP and MP frames 2712 and 2722, respectively. Immediately thereafter, both modems 2710 and 2712 start transmitting short CP (CPs) and short MP (MPs) frames 2713 and 2723, respectively. In response to receiving the MP frame 2722, the APCM modem 2710 transmits a CPs' frame 2714 to the DPCM modem 2720 to acknowledge the receipt. At the other end, the DPCM modem 2720 receives the CP frame 2712 and in acknowledgement transmits an MPs' frame 2724. After a successful quick parameter exchange, both modems 2710 and 2720 continue to the data phase. As a result of transmitting short CP and MP frames, the fast train may be achieved in less time and more efficiently.

Figure 28:
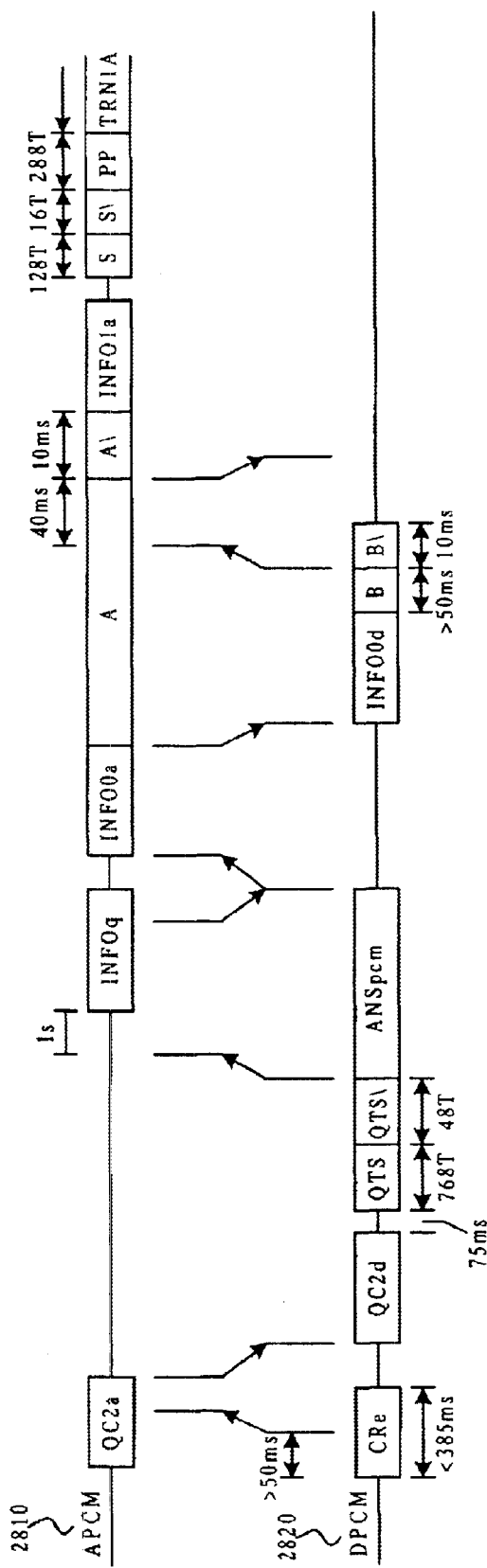
FIG. 28 illustrates an example of a quick connect training process occurring between the APCM and DPCM modems according to one embodiment of the present invention.
Figure 28:
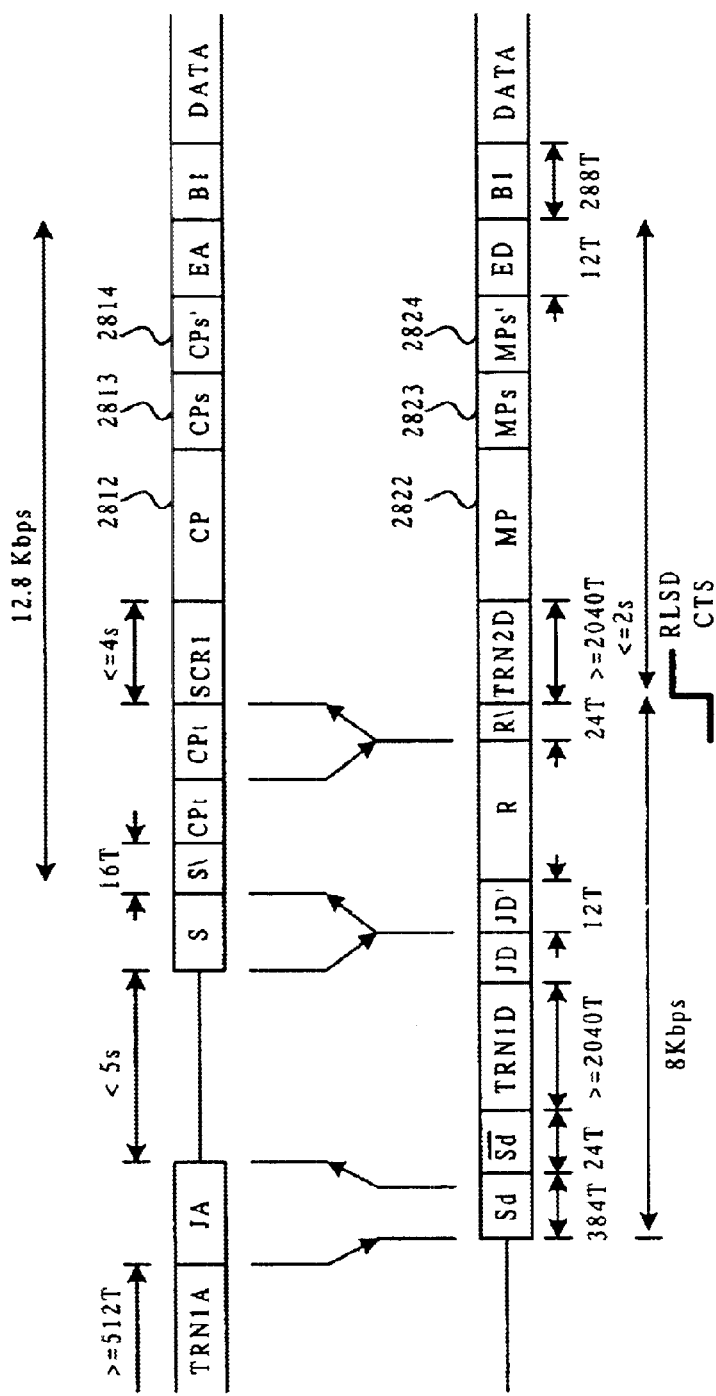

FIG. 28 illustrates that the short parameter frames of the present invention may be combined with various other aspects of the present invention, such as the quick connect process. FIG. 28 shows the quick connect process according to one aspect of the present invention. The quick connect process, as shown, includes the use of short CP and MP frames of the present invention. FIG. 28 shows a quick connect process between an APCM modem 2810 and a DPCM modem 2820. During the quick connect, MP, CP and CPa frames may be exchanged between the modems, depending upon the modem standard used for such exchange. The example of FIG. 28 shows the quick connect according to the ITU Recommendation V.90. However, the same exchange may be applied to V.34 and V.92 quick connect schemes. As shown, the modems 2810 and 2820 exchange long CP and MP frames 2812 and 2822, respectively. Immediately thereafter, both modems 2810 and 2812 start transmitting short CP (CPs) and short MP (MPs) frames 2813 and 2823, respectively. In response to receiving the MP frame 2822, the APCM modem 2810 transmits a CPs' frame 2814 to the DPCM modem 2820 to acknowledge such receipt. At the other end, the DPCM modem 2820 receives the CP frame 2812 and in acknowledgement transmits an MPs' frame 2824. After a successful quick parameter exchange, both modems 2710 and 2720 continue to the data phase. As a result, the quick connect time of the present invention may be reduced even more by employing the quick parameter exchange between the two modems.

When implemented in software, at least some elements of the present invention can be in the form of computer data, including, but not limited to, any bits of information, code, etc. The data may be arranged in group of bits or data segments and may be stored in a processor readable medium or transmitted by a data signal embodied in a carrier wave over a transmission medium or communication link. For example, bits of information in a CPa frame may form various data segments that can be transmitted by a data signal embodied in a carrier wave. The communication link may include, but is not limited to, a telephone line, a modem connection, an Internet connection, an Integrated Services Digital Network ("ISDN") connection, an Asynchronous Transfer Mode (ATM) connection, a frame relay connection, an Ethernet connection, a coaxial connection, a fiber optic connection, satellite connections (e.g. Digital Satellite Services, etc.), wireless connections, radio frequency (RF) links, electromagnetic links, two way paging connections, etc., and combinations thereof. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

The present invention has been described above with reference to a preferred embodiment. However, those skilled in the art will recognize that changes and modifications may be made to the preferred embodiment without departing from the scope of the present invention. These and other changes or modifications are intended to be included within the scope of the present invention, as expressed in the following claims.

What is claimed is:

1. A training method for use by a first modem to train with a second modem for reducing training time during exchange of training parameters between said first modem and said second modem, said training method comprising the steps of:

transmitting a first information sequence of a first length and a first definition by said first modem, said first information sequence including a plurality of first training parameters;

receiving a second information sequence of a second length and a second definition from said second modem, said second information sequence including a plurality of second training parameters;

transmitting a third information sequence of a third length and a third definition by said first modem; and receiving a fourth information sequence of a fourth length and a fourth definition from said second modem;

wherein said third definition includes a third acknowledgement indicator and said fourth definition includes a fourth acknowledgement indicator, wherein said third acknowledgment indicator is adjusted by said first device to indicate receipt of said second information sequence, and wherein said fourth acknowledgement indicator is examined by said first modem to determine if said second modem received said first information sequence, and wherein said third length is less than said first length and said fourth length is less than said second length; and wherein said training method further comprising: repeatedly transmitting said third information sequence for a predetermined period of time until said fourth acknowledgement indicator indicates receipt of said first information sequence by said second modem and transmitting said first information sequence after expiration of said predetermined period of time if said fourth acknowledgement indicator does not indicate receipt of said first information sequence by said second modem.

2. The method of claim 1, wherein said first definition is the same as said second definition and said third definition is the same as said fourth definition.

3. The method of claim 1, wherein said first length is the same as said second length and said third length is the same as said fourth length.

4. The method of claim 1, wherein each of said first and third information sequences includes a type portion, and wherein said type portions distinguish said first and said third information sequences.

5. The method of claim 1, wherein said first information sequence is an MP frame and said third information sequence is an MPs frame.

6. The method of claim 5, wherein said second information sequence is an MP frame and said fourth information sequence is an MPs frame.

7. The method of claim 5, wherein said second information sequence is a CP frame and said fourth information sequence is a CPs frame.

8. The method of claim 1, wherein said first information sequence is a CP frame and said third information sequence is a CPs frame.

9. The method of claim 8, wherein said second information sequence is a CPa frame and said fourth information sequence is a CPas frame.

10. The method of claim 1, wherein said method is utilized as a part of a fast train handshake between said first modem and said second modem.

11. The method of claim 1, wherein said method is utilized as a part of a quick connect handshake between said first modem and said second modem.

12. The method of claim 1, wherein said method is utilized as a part of a rate renegotiation handshake between said first modem and said second modem.

13. The method of claim 1, wherein said method is utilized as a part of a startup handshake between said devices.

14. The method of claim 1, wherein said first information sequence includes a plurality of constellation parameters.

15. The method of claim 1, wherein said first information sequence includes a plurality of modulation parameters.

16. A training method for use by a first modem to train with a second modem for reducing training time during exchange of training parameters between said first modem and said second modem, said training method comprising the steps of:
    transmitting a long information sequence having first and second information definition portions from said first modem to said second modem, said second information definition portion including a plurality of training parameters; and
    transmitting a short information sequence having said first information definition portion from said first modem to said second modem;
    wherein said first information definition portion includes a type portion distinguishing said first and second information sequences, said first information definition portion further includes an acknowledgment indicator capable of being used to acknowledge receipt of an information sequence from said second modem by said first modem; and wherein said training method further comprising: repeatedly transmitting said short information sequence for a predetermined period of time until an acknowledgment from said second modem indicates receipt of said long information sequence and transmitting said long information sequence after expiration of said predetermined period of time if said acknowledgement is not received from said second modem.

17. The method of claim 16, wherein said long information sequence is an MP frame and said short information sequence is an MPs.

18. The method of claim 16, wherein said long information sequence is a CP frame and said short information sequence is a CPs.

19. The method of claim 16, wherein said long information sequence is a CPa frame and said short information sequence is a CPas.

20. A training method for use by a first modem to train with a second modem for reducing training time during exchange of training parameters between said first modem and said second modem, said training method comprising the steps of:
    receiving a long information sequence having first and second information definition portions by said first modem from said second modem, said second information definition portion including a plurality of training parameters; and
    receiving a short information sequence having said first information definition portion by said first modem from said second modem;
    wherein said first information definition portion includes a type portion distinguishing said first and second information sequences, said first information definition portion further includes an acknowledgment indicator capable of being used to determine receipt of an information sequence by said second modem from said first modem; and wherein said training method further comprising: repeatedly receiving said short information sequence for a predetermined period of time until an acknowledgment to said second modem indicates receipt of said long information sequence by said first modem and receiving said long information sequence after expiration of said predetermined period of time if said acknowledgement is not transmitted to said second modem.

21. The method of claim 20, wherein said long information sequence is an MP frame and said short information sequence is an MPs.

22. The method of claim 20, wherein said long information sequence is a CP frame and said short information sequence is a CPs.

23. The method of claim 20, wherein said long information sequence is a CPa frame and said short information sequence is a CPas.

24. A first modem configured to reduce training time during exchange of training parameters during training with a second modem, said first modem comprising:
    a receiver capable of receiving, from said second modem, a first information sequence of a first length and a first definition followed by a second information sequence of a second length and a second definition, said first information sequence including a plurality of first training parameters; and
    a transmitter capable of transmitting, to said second modem, a third information sequence of a third length and a third definition followed by a fourth information sequence of a fourth length and a fourth definition, said second information sequence including a plurality of second training parameters;
    wherein each said definition includes an acknowledgement indicator, wherein said transmitter adjusts said acknowledgment indicator of said fourth information sequence to indicate receipt of said first information sequence when said receiver receives said first information sequence from said second modem, and wherein said receiver examines said acknowledgement indicator of said second information sequence to determine receipt of said third information sequence by said second modem from said transmitter, and wherein said second length is less than said first length and said fourth length is less than said third length; and
    wherein said transmitter repeatedly transmits said fourth information sequence for a predetermined period of time until said second acknowledgement indicator indicates receipt of said third information sequence by said second modem and transmits said third information sequence after expiration of said predetermined period of time if said second acknowledgement indicator does not indicate receipt of said third information sequence by said second modem.

25. The first modem of claim 24, wherein said first length is the same as said third length and said second length is the same as said fourth length.

26. The first modem of claim 24, wherein said first definition is the same as said third definition and said second definition is the same as said fourth definition.

27. The first modem of claim 24, wherein said receiver receives a fifth information sequence of a fifth length and a fifth definition within a predetermined time.

28. The first modem of claim 27, wherein said fifth length is equal to said second length and said fifth definition is the same as said second definition.

29. The first modem of claim 27, wherein said fifth definition includes an acknowledgement indicator indicating receipt of said third information sequence.

30. The first modem of claim 29, wherein said fifth information sequence is an MPs'.

31. The first modem of claim 29, wherein said fifth information sequence is a CPs'.

32. The first modem of claim 29, wherein said fifth information sequence is a CPas'.

33. The first modem of claim 24, wherein said receiver fails to receive an acknowledgement for said third information sequence within a predetermined time, and said transmitter transmits a fifth information sequence of a fifth length and a fifth definition.

34. The first modem of claim 33, wherein said fifth length is equal to said third length and said fifth definition is the same as said third definition.

35. The first modem of claim 33, wherein said transmitter further transmits a sixth information sequence of said fourth length and said fourth definition.

36. The first modem of claim 33, wherein said transmitter further transmits a sixth information sequence of said third length and said third definition.

37. The first modem of claim 24, wherein said third information sequence is an MP.

38. The first modem of claim 24, wherein said fourth information sequence is an MPs.

39. The first modem of claim 24, wherein said third information sequence is a CP.

40. The first modem of claim 24, wherein said fourth information sequence is a CPs.

41. The first modem of claim 24, wherein said third information sequence is a CPa.

42. The first modem of claim 24, wherein said fourth information sequence is a CPas.

43. The device of claim 24, wherein said receiver fails to receive an acknowledgement for said third information sequence within a predetermined event or condition, and said transmitter transmits a fifth information sequence of a fifth length and a fifth definition.

44. A first modem configured to reduce training time during exchange of training parameters during training with a second modem, said first modem comprising:
   a receiver capable of receiving, from said second modem, a first information sequence of a first length and a first definition followed by a second information sequence of a second length and a second definition, said first information sequence including a plurality of first training parameters;
   wherein said first length is longer than said second length, and each said definition includes an acknowledgement indicator, wherein each said acknowledgment indicator is capable of being examined to determine receipt of an information sequence by said second modem from said first modem;
   wherein said receiver repeatedly receives said second information sequence for a predetermined period of time until said first modem transmits an acknowledgement to indicate receipt of said first information sequence and receives said first information sequence after expiration of said predetermined period of time if said first modem does not transmit said acknowledgment.

45. The first modem of claim 44 further comprising:
   a transmitter capable of transmitting a third information sequence of a third length and a third definition followed by a fourth information sequence of a fourth length and a fourth definition;
   wherein said third length is longer than said fourth length.

46. The first modem of claim 44, wherein said first information sequence is a CPa and said second information sequence is a CPas.

47. The first modem of claim 44, wherein said first information sequence is a CPas and said second information sequence is a CPa.

48. A training method for use by a first modem to train with a second modem for reducing training time during exchange of training parameters between said first modem and said second modem, said training method comprising:
   transmitting a first information sequence by said first modem to said second modem, said first information sequence having a first type indicator and a plurality of first training parameters;
   receiving a second information sequence by said first modem from said second modem, said second information sequence having a second type indicator and a plurality of second training parameters;
   transmitting a third information sequence by said first modem to said second modem, said third information sequence having a third type indicator, a third acknowledgement indicator, wherein said third information sequence is shorter than said first information sequence; and
   receiving a fourth information sequence by said first modem from said second modem, said fourth information sequence having a fourth type indicator, a fourth acknowledgement indicator, wherein said fourth information sequence is shorter than said second information sequence;
   wherein said third acknowledgment indicator is adjusted by said first modem to indicate receipt of said second information sequence when said first modem receives said second information sequence, and wherein said fourth acknowledgement indicator is examined by said first modem to determine if said second modem received said first information sequence, and wherein said training method further comprising: repeatedly transmitting said third information sequence for a predetermined period of time until said fourth acknowledgement indicator indicates receipt of said first information sequence by said second modem and transmitting said first information sequence after expiration of said predetermined period of time if said fourth acknowledgement indicator does not indicate receipt of said first information sequence by said second modem.

49. The method of claim 48 further comprising: repeatedly receiving said fourth information sequence for a predetermined period of time until said third acknowledgement indicator indicates receipt of said second information sequence by said first modem.

50. The method of claim 49 further comprising: receiving said second information sequence after expiration of said predetermined period of time if said second acknowledgement indicator does not indicate receipt of said second information sequence by said first modem.

51. The method of claim 50 further comprising: repeatedly receiving said fourth information sequence for said predetermined period of time until said third acknowledgement indicator indicates receipt of said second information sequence by said first modem.

52. The method of claim 48, wherein said first type indicator identifies said first information sequence to be longer than said third information sequence as identified by said third type indicator.

53. The method of claim 48, wherein said second type indicator identifies said second information sequence to be longer than said fourth information sequence as identified by said fourth type indicator.

54. The method of claim 48, wherein said first information sequence is an MP frame, and wherein said third information sequence is an MPs frame.

55. The method of claim 48, wherein said first information sequence is a CP frame, and wherein said third information sequence is a CPs frame.

56. The method of claim 48, wherein said first information sequence is a CPa frame, and wherein said third information sequence is a CPas frame.

57. The method of claim 48, wherein said second information sequence is an MP frame, and wherein said fourth information sequence is an MPs frame.

58. The method of claim 48, wherein said second information sequence is a CP frame, and wherein said fourth information sequence is a CPs frame.

59. The method of claim 48, wherein said second information sequence is a CPa frame, and wherein said fourth information sequence is a CPas frame.

60. The method of claim 48, wherein said first information sequence includes a plurality of constellation parameters.

61. The method of claim 48, wherein said first information sequence includes a plurality of modulation parameters.

62. The method of claim 48, wherein said predetermined time is calculated based upon a round-trip delay.

63. A first modem capable of supporting a training phase with reduced training time during exchange of training parameters to connect to a second modem and further capable of supporting a data phase for communication with said second modem, said first modem comprising:

a transmitter capable of transmitting a first information sequence during said training phase, said first information sequence having a first type indicator and a plurality of first training parameters, said transmitter further capable of transmitting a third information sequence during said training phase, said third information sequence having a third type indicator, a third acknowledgement indicator, wherein said third information sequence is shorter than said first information sequence;

a receiver capable of receiving a second information sequence during said training phase, said second information sequence having a second type indicator and a plurality of second training parameters, said receiver further capable of receiving a fourth information sequence by said first device from said second device, said fourth information sequence having a fourth type indicator, a fourth acknowledgement indicator, wherein said fourth information sequence is shorter than said second information sequence; and a processor capable of adjusting said third acknowledgment indicator to indicate receipt of said second information sequence to said second modem, and said processor further capable of examining said fourth acknowledgement indicator to determine if said second modem received said first information sequence;

wherein said transmitter repeatedly transmits said third information sequence for a predetermined period of time until said fourth acknowledgement indicator indicates receipt of said first information sequence by said second modem and transmits said first information sequence after expiration of said predetermined period of time if said fourth acknowledgement indicator does not indicate receipt of said first information sequence by said second modem.

64. The first modem of claim 63, wherein said transmitter repeatedly transmits said third information sequence for said predetermined period of time until said fourth acknowledgement indicator indicates receipt of said first information sequence by said remote device.

65. The first modem of claim 63, wherein said receiver repeatedly receives said fourth information sequence for a predetermined period of time until said third acknowledgement indicator indicates receipt of said second information sequence by said processor.

66. The first modem of claim 65, wherein said receiver receives said second information sequence after expiration of said predetermined period of time if said second acknowledgement indicator does not indicate receipt of said second information sequence by said processor.

67. The first modem of claim 66, wherein said receiver repeatedly receives said fourth information sequence for said predetermined period of time until said third acknowledgement indicator indicates receipt of said second information sequence by said processor.

68. The first modem of claim 63, wherein said first type indicator identifies said first information sequence to be longer than said third information sequence as identified by said third type indicator.

69. The first modem of claim 63, wherein said second type indicator identifies said second information sequence to be longer than said fourth information sequence as identified by said fourth type indicator.

70. The first modem of claim 63, wherein said first information sequence is an MP frame, and wherein said third information sequence is an MPs frame.

71. The first modem of claim 63, wherein said first information sequence is a CP frame, and wherein said third information sequence is a CPs frame.

72. The first modem of claim 63, wherein said first information sequence is a CPa frame, and wherein said third information sequence is a CPas frame.

73. The first modem of claim 63, wherein said second information sequence is an MP frame, and wherein said fourth information sequence is an MPs frame.

74. The first modem of claim 63, wherein said second information sequence is a CP frame, and wherein said fourth information sequence is a CPs frame.

75. The first modem of claim 63, wherein said second information sequence is a CPa frame, and wherein said fourth information sequence is a CPas frame.

76. The first modem of claim 63, wherein said first information sequence includes a plurality of constellation parameters.

77. The first modem of claim 63, wherein said first information sequence includes a plurality of modulation parameters.

78. The first modem of claim 63, wherein said predetermined time is calculated based upon a round-trip delay.

79. A training method for use by a first modem to train with a second modem for reducing training time during exchange of training parameters between said first modem and said second modem, said training method including a capability phase, a probing phase, an impairment learning phase and a constellation phase, said constellation phase comprising:
- transmitting a first information sequence to said second modem, said first information sequence including a first type indicator, a first acknowledgment indicator and a plurality of first constellation parameters;
- receiving a second information sequence from said second modem, said second information sequence including a second type indicator, a second acknowledgment indicator and a plurality of second constellation parameters;
- transmitting a third information sequence to said second modem, said third information sequence including a third type indicator and a third acknowledgment indicator; and
- receiving a fourth information sequence from said second modem, said fourth information sequence including a fourth type indicator and a fourth acknowledgment indicator;
- wherein said third acknowledgment indicator is adjusted by said first modem to indicate receipt of said second information sequence, and wherein said fourth acknowledgement indicator is examined by said first modem to determine if said second modem received said first information sequence, and wherein only said first information sequence and said second information sequence include constellation parameters; and
- wherein said constellation phase further comprising: repeatedly transmitting said third information sequence for a predetermined period of time until said fourth acknowledgement indicator indicates receipt of said first information sequence by said second modem and transmitting said first information sequence after expiration of said predetermined period of time if said fourth acknowledgement indicator does not indicate receipt of said first information sequence by said second modem.

80. The method of claim 79, wherein said constellation phase further comprising: repeatedly receiving said fourth information sequence for a predetermined period of time until said third acknowledgement indicator indicates receipt of said second information sequence by said first modem.

81. The method of claim 80, wherein said constellation phase further comprising: receiving said second information sequence after expiration of said predetermined period of time if said second acknowledgement indicator does not indicate receipt of said second information sequence by said first modem.

82. The method of claim 81, wherein said constellation phase further comprising: repeatedly receiving said fourth information sequence for said predetermined period of time until said third acknowledgement indicator indicates receipt of said second information sequence by said first modem.

83. The method of claim 79, wherein said first type indicator identifies said first information sequence to be longer than said third information sequence as identified by said third type indicator.

84. The method of claim 79, wherein said second type indicator identifies said second information sequence to be longer than said fourth information sequence as identified by said fourth type indicator.

85. The method of claim 79, wherein said first information sequence is an MP frame, and wherein said third information sequence is an MPs frame.

86. The method of claim 79, wherein said first information sequence is a CP frame, and wherein said third information sequence is a CPs frame.

87. The method of claim 79, wherein said first information sequence is a CPa frame, and wherein said third information sequence is a CPas frame.

88. The method of claim 79, wherein said second information sequence is an MP frame, and wherein said fourth information sequence is an MPs frame.

89. The method of claim 79, wherein said second information sequence is a CP frame, and wherein said fourth information sequence is a CPs frame.

90. The method of claim 79, wherein said second information sequence is a CPa frame, and wherein said fourth information sequence is a CPas frame.

* * * * *